(12) United States Patent
Liu et al.

(10) Patent No.: US 12,058,740 B2
(45) Date of Patent: Aug. 6, 2024

(54) METHOD AND DEVICE IN COMMUNICATION NODE USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 423 days.

(21) Appl. No.: 17/536,128

(22) Filed: Nov. 29, 2021

(65) Prior Publication Data

US 2022/0086918 A1 Mar. 17, 2022

Related U.S. Application Data

(63) Continuation of application No. PCT/CN2020/094131, filed on Jun. 3, 2020, and a (Continued)

(30) Foreign Application Priority Data

Jun. 6, 2019 (CN) .......................... 201910491866.X
Jun. 19, 2019 (CN) .......................... 201910531097.1

(51) Int. Cl.
*H04W 74/0833* (2024.01)
*H04W 24/10* (2009.01)
(Continued)

(52) U.S. Cl.
CPC ....... *H04W 74/0833* (2013.01); *H04W 24/10* (2013.01); *H04W 72/0446* (2013.01); *H04L 5/0005* (2013.01)

(58) Field of Classification Search
CPC ............. H04W 74/0833; H04W 24/10; H04W 72/0446; H04W 24/08; H04W 48/12; H04L 5/0005
See application file for complete search history.

(56) References Cited

U.S. PATENT DOCUMENTS

2010/0208674 A1* 8/2010 Lee .................. H04W 36/0088
370/329
2011/0243261 A1 10/2011 Bienas
(Continued)

FOREIGN PATENT DOCUMENTS

CN 101448325 A 6/2009
CN 101931456 A 12/2010
(Continued)

OTHER PUBLICATIONS

ISR received in application No. PCT/CN2020/091147 dated Aug. 21, 2020.
(Continued)

*Primary Examiner* — Nishant Divecha

(57) ABSTRACT

The present disclosure provides a method and a device in a communication node for wireless communications. A communication node receives first information; determines a target measurement interval, the target measurement interval is one of X candidate measurement intervals; transmits a first signal, the first signal occupies a target time-frequency resource block; monitors a first-type signaling in a target time window; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measure-
(Continued)

ment interval in the X time interval lengths. The present disclosure improves random access performance.

20 Claims, 11 Drawing Sheets

Related U.S. Application Data continuation of application No. PCT/CN2020/091147, filed on May 20, 2020.

(51) Int. Cl.
   *H04W 72/0446* (2023.01)
   *H04L 5/00* (2006.01)

(56) References Cited

U.S. PATENT DOCUMENTS

| | | |
|---|---|---|
| 2018/0220468 A1 | 8/2018 | Lin |
| 2019/0052334 A1 | 2/2019 | Jeon |
| 2019/0053193 A1 | 2/2019 | Park |
| 2020/0029238 A1* | 1/2020 | Si ............................ H04W 24/10 |
| 2021/0385879 A1* | 12/2021 | Mahalingam ..... H04W 72/1263 |
| 2022/0015120 A1* | 1/2022 | Qiu .................... H04W 72/1268 |
| 2022/0150972 A1* | 5/2022 | Turtinen ............ H04B 7/18558 |

FOREIGN PATENT DOCUMENTS

| | | |
|---|---|---|
| CN | 107204837 A | 9/2017 |
| CN | 107404369 A | 11/2017 |
| CN | 107623649 A | 1/2018 |
| CN | 107801247 A | 3/2018 |
| CN | 108112030 A | 6/2018 |
| CN | 109391300 A | 2/2019 |
| CN | 109392125 A | 2/2019 |
| CN | 109429354 A | 3/2019 |
| CN | 110098892 A | 8/2019 |
| EP | 2408253 A1 | 1/2012 |
| EP | 2827660 A1 | 1/2015 |

OTHER PUBLICATIONS

ISR received in application No. PCT/CN2020/094131 dated Sep. 2, 2020.
CN201910491866.X Notification to Grant Patent Right for Invention dated Sep. 1, 2021.
CN201910491866.X First Office Action dated Mar. 23, 2021.
CN201910491866.X First Search Report dated Mar. 16, 2021.
CN201910491866.X Second Office Action dated Jun. 9, 2021.
Thales. On Timing Advance in NTN'3GPP TSG RA1 WG1 Meeting #96bis, RI-1905180. Mar. 29, 2019 (Mar. 29, 2019).
Nokia et aL Doppler Compensation, Uplink Timing Advance and Random Access in NTN'3GPP TSG RAN WGI Meeting #97 RI-1906087, May 3, 2019 (May 3, 2019).
3GPP TSG RAN. "Solutions for NR to support non-terrestrial networks (NTN) (Release 16)" 3GPP TR 38.821 VO.5.0, Apr. 30, 2019 (Apr. 30, 2019).

* cited by examiner

METHOD AND DEVICE IN COMMUNICATION NODE USED FOR WIRELESS COMMUNICATION

CROSS REFERENCE TO RELATED APPLICATIONS

This application is a continuation of International Application No. PCT/CN2020/091147, filed May 20, 2020, which is claims the priority benefit of Chinese Patent Application No. 201910491866.X, filed on Jun. 6, 2019, and is a continuation of International Application No. PCT/CN2020/094131, filed Jun. 3, 2020, which is claim the priority benefit of Chinese Patent Application No. 201910531097.1, filed on Jun. 19, 2019, the full disclosure of which is incorporated herein by reference.

BACKGROUND

Technical Field

The present disclosure relates to transmission methods and devices in wireless communication systems, and in particular to a transmission scheme and device related to large delay differences.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The work item of NR was approved at the 3GPP RAN #75th plenary to standardize NR.

To ensure better adaptability to various application scenarios and requirements, 3GPP RAN #75th plenary also approved a study item of NR-backed Non-Terrestrial Networks (NTN) starting with R15 version. It was decided to start studying solutions in NTN networks at 3GPP RAN #79 plenary and then started a WI to standardize relevant techniques in R16 or R17 version.

SUMMARY

In Non-Terrestrial Networks (NTN), a User Equipment (UE) is in communications with a satellite or an aircraft through 5G networks. Since a distance from the satellite or the aircraft to the UE is much longer than a distance from a terrestrial base station to the UE, there will be a longer propagation delay in communications between the satellite or the aircraft and the UE. Besides, when a satellite is used as relay equipment for a terrestrial base station, a delay of a feeder link between the satellite and the terrestrial base station will lead to a longer propagation delay between the UE and the base station. On the other hand, since a coverage of the satellite and the aircraft is larger than terrestrial networks and tilt angles from terrestrial devices to the satellite or the aircraft are different, delays in NTNs are very different. In the existing Long Term Evolution (LTE) or 5G NR systems, a maximum delay difference is only a few or tens of microseconds, while in NTNs, a maximum delay difference can reach a few or even tens of milliseconds. Due to random access in the existing LTE or NR is designed for traditional terrestrial communications, which cannot be directly applied to NTN networks, so a new design is needed to support networks with large-delay differences, especially for NTN communications.

The present disclosure provides a solution to the problem of random access in networks with large delay differences, especially in NTN communications. It should be noted that the embodiments of a base station and the characteristics of the embodiments in the present disclosure may be applied to a UE if no conflict is incurred, and vice versa. Further, the embodiments and the characteristics of the embodiments in the present disclosure may be mutually combined if no conflict is incurred.

The present disclosure provides a method in a first communication node for wireless communications, comprising:
  receiving first information;
  determining a target measurement interval, the target measurement interval being one of X candidate measurement intervals;
  transmitting a first signal, a first sequence being used to generate the first signal, and the first signal occupying a target time-frequency resource block in time-frequency domain; and
  monitoring a first-type signaling in a target time window;
  herein, any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

In one embodiment, by means of the X candidate measurement intervals respectively corresponding to X time interval lengths and the first information configuring a corresponding time interval length for each candidate measurement interval, UEs in networks with large delay differences are grouped according to a measurement result, so that the existing preamble design can be reused as much as possible in networks with large delay differences or the preamble design occupying fewer time-domain resources is supported, so as to reduce resource overhead in random access.

In one embodiment, by grouping UEs in networks with large delay differences, and respectively configuring an RAR (or MsgB in 2-step random access) time window for each group of UEs, the problem of ambiguity in RAR (or MsgB in 2-step random access) reception and uplink timing incurred by large delay differences is solved.

According to one aspect of the present disclosure, the above method is characterized in also comprising:
  receiving second information and third information;
  herein, the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

In one embodiment, the reference time is determined according to a position of the characteristic time-frequency resource block in time domain, and a configuration for an RAR time window or a MsgB time window of each UE group in 2-step random access and 4-step random access is supported.

According to one aspect of the present disclosure, the above method is characterized in also comprising:
executing a first measurement;
herein, the first measurement is used to determine a target measurement value, the target measurement value belongs to the target measurement interval, and the target measurement value comprises at least one of a first distance, a first delay or a first tilt angle; the first communication node assumes that the first distance is equal to a distance between the first communication node and a second communication node in the present disclosure, the first communication node assumes that the first delay is equal to a propagation delay between the first communication node and the second communication node in the present disclosure, and the first communication node assumes that the first tilt angle is equal to a tilt angle between the first communication node and the second communication node in the present disclosure.

According to one aspect of the present disclosure, the above method is characterized in also comprising:
receiving fourth information; herein, the fourth information is used to determine the X candidate measurement intervals.

According to one aspect of the present disclosure, the above method is characterized in that the first communication node assumes that there at most exists one first-type signaling being detected in the target time window; or when there exist two first-type signalings being detected by the first communication node in the target time window and the two first-type signalings are used to schedule two different signals respectively, the first communication node assumes that only one of the two different signals carries an identity of the first sequence.

In one embodiment, by limiting a detection on a first-type signaling or a detection on a first sequence, the flexibility of network side configuration is improved while ensuring that an RAR (or MsgB in 2-step random access) and uplink timing information can be correctly received at the same time.

According to one aspect of the present disclosure, the above method is characterized in also comprising:
receiving fifth information;
herein, the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set.

In one embodiment, corresponding random access resources are configured independently for each candidate measurement interval, which achieves the effect of grouping UEs according to distance, delay or tilt angle and reduces the demand for preamble length, thus reducing overhead and improving resource utilization and random access capacity.

According to one aspect of the present disclosure, the above method is characterized in also comprising:
when there exists a first-type signaling being detected in the target time window, the second receiver receiving a second signal;
herein, a first-type signaling detected in the target time window is used to determine time-frequency resources occupied by the second signal; the second signal carries a target sequence index and a first Timing Advance (TA), when the target sequence index corresponds to an index of the first sequence in the target sequence set, the first TA is used to determine a transmission timing of the first communication node.

The present disclosure provides a method in a second communication node for wireless communications, comprising:
transmitting first information;
receiving a first signal, a first sequence being used to generate the first signal, and the first signal occupying a target time-frequency resource block in time-frequency domain; and
transmitting a first-type signaling in a target time window;
herein, any two of X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to a target measurement interval among the X time interval lengths, and a position of the target time-frequency resource block in time-frequency domain is used to determine the reference time; the target measurement interval is one of X candidate measurement intervals; the first-type signaling carries a target characteristic identity, and a position of the target time-frequency resource block in time-frequency domain is used to determine the target characteristic identity.

According to one aspect of the present disclosure, the above method is characterized in also comprising:
transmitting second information and third information;
herein, the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

According to one aspect of the present disclosure, the above method is characterized in that a target measurement value belongs to the target measurement interval, and the target measurement value comprises at least one of a first distance, a first delay or a first tilt angle; the first communication node in the present disclosure assumes that the first distance is equal to a distance between the first communication node and a second communication node in the present disclosure, the first communication node in the present disclosure assumes that the first delay is equal to a propagation delay between the first communication node and the second communication node in the present disclosure, and the first communication node in the present disclosure assumes that the first tilt angle is equal to a tilt angle between the first communication node and the second communication node in the present disclosure.

According to one aspect of the present disclosure, the above method is characterized in also comprising:

transmitting fourth information; herein, the fourth information is used to determine the X candidate measurement intervals.

According to one aspect of the present disclosure, the above method is characterized in that there at most exists one first-type signaling being transmitted in the target time window; or when there exist two first-type signalings in the target time window being transmitted and the two first-type signalings are used to schedule two different signals respectively, only one of the two different signals carries an identity of the first sequence.

According to one aspect of the present disclosure, the above method is characterized in also comprising:

transmitting fifth information;

herein, the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set.

According to one aspect of the present disclosure, the above method is characterized in also comprising:

transmitting a second signal;

herein, a first-type signaling transmitted in the target time window is used to determine time-frequency resources occupied by the second signal; the second signal carries a target sequence index and a first TA, when the target sequence index corresponds to an index of the first sequence in the target sequence set, the first TA is used to indicate a transmission timing of the first communication node.

The present disclosure provides a first communication node device for wireless communications, comprising:

a first receiver, receiving first information;

a first processor, determining a target measurement interval, the target measurement interval being one of X candidate measurement intervals;

a first transmitter, transmitting a first signal, a first sequence being used to generate the first signal, and the first signal occupying a target time-frequency resource block in time-frequency domain; and a second receiver, monitoring a first-type signaling in a target time window;

herein, any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

The present disclosure provides a second communication node for wireless communications, comprising:

a second transmitter, transmitting first information;

a third receiver, receiving a first signal, a first sequence being used to generate the first signal, and the first signal occupying a target time-frequency resource block in time-frequency domain; and a third transmitter, transmitting a first-type signaling in a target time window;

herein, any two of X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to a target measurement interval among the X time interval lengths, and a position of the target time-frequency resource block in time-frequency domain is used to determine the reference time; the target measurement interval is one of X candidate measurement intervals; the first-type signaling carries a target characteristic identity, and a position of the target time-frequency resource block in time-frequency domain is used to determine the target characteristic identity.

In one embodiment, compared with the methods of random access in the existing terrestrial networks, the present disclosure has the following main technical advantages:

by using the methods in the present disclosure, the UEs in networks with large delay differences are grouped according to a measurement result, so that the existing preamble design can be reused as much as possible in networks with large delay differences or the preamble design occupying fewer time-domain resources is supported, so as to reduce resource overhead in random access.

by using the methods in the present disclosure, the problem of ambiguity in RAR (or MsgB in 2-step random access) reception and uplink timing incurred by large delay differences is solved.

the methods in the present disclosure support configuration for an RAR time window or a MsgB time window of each UE group in 2-step random access and 4-step random access at the same time.

The present disclosure provides a method in a first communication node for wireless communications, comprising:
  transmitting a first signal, the first signal occupying a target time-frequency resource block in time-frequency domain;
  receiving a first signaling; and
  receiving a second signal, the first signaling being used to determine time-frequency resources occupied by the second signal;
  herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node.

In one embodiment, by introducing the first information, the problem of ambiguity in uplink timing incurred by large delay differences is solved.

In one embodiment, the target sequence index and the first information are used together to determine whether adjustment information of transmission timing received by the first communication node is for the first communication node, and the existing preamble design can be reused in networks with large delay differences or preamble design occupying fewer time-domain resources is supported, so as to reduce resource overhead of random access.

According to one aspect of the present disclosure, the above method is characterized in also comprising:
  receiving second information and third information;
  herein, the second information is used to determine the W candidate sequences, and the first communication node randomly selects the first sequence out of the W candidate sequences; and the third information is used to determine that the second signal carries the first information.

In one embodiment, whether the second signal carries the first information is on-off switched by the third information, so that the network side can flexibly configure an information format of the second signal according to resource configuration requirement and implementation requirement.

According to one aspect of the present disclosure, the above method is characterized in that the first information is used to determine a first time length, and a length of a time interval between a time for transmitting the first signal and a time for receiving the second signal is equal to a second time length; a sum of the first time length and the first TA multiplied by two is equal to a target time length, a relation between the second time length and the target time length is used to determine whether the first TA is used to determine a transmission timing of the first communication node.

In one embodiment, by comparing the second time length and the target time length, the UE can accurately judge whether the first TA can be used to determine a transmission timing, which provides an accurate and effective solution for solving timing ambiguity.

According to one aspect of the present disclosure, the above method is characterized in also comprising:
  determining a target measurement value;
  herein, the target measurement value belongs to a target measurement interval, the target measurement interval is one of X candidate measurement intervals, and any two of the X candidate measurement intervals are different, X being a positive integer greater than 1.

According to one aspect of the present disclosure, the above method is characterized in also comprising:
  receiving fourth information;
  herein, the fourth information is used to determine X candidate time-frequency resource pools, the X candidate time-frequency resource pools respectively correspond to the X candidate measurement intervals, the target time-frequency resource block belongs to a target time-frequency resource pool, and the target time-frequency resource pool is one of the X candidate time-frequency resource pool corresponding to the target measurement interval.

In one embodiment, corresponding random access resources are configured independently for each candidate measurement interval, which achieves the effect of grouping UEs according to distance or delay and reduces the demand for preamble length, so as to reduce overhead and improve resource utilization and random access capacity.

According to one aspect of the present disclosure, the above method is characterized in that the first information is used to determine a first measurement interval, and the first measurement interval is one of the X candidate measurement intervals; whether the first measurement interval is the same as the target measurement interval is used to determine whether the first TA can be used to determine a transmission timing of the first communication node.

According to one aspect of the present disclosure, the above method is characterized in that when the first communication node can acquire positioning information of the first communication node, the target measurement value comprises a distance between the first communication node and a second communication node in the present disclosure; otherwise, the target measurement value comprises tilt angle information between the first communication node and a second communication node in the present disclosure.

The present disclosure provides a method in a second communication node for wireless communications, comprising:
  receiving a first signal, the first signal occupying a target time-frequency resource block in time-frequency domain;
  transmitting a first signaling; and
  transmitting a second signal, the first signaling being used to determine time-frequency resources occupied by the second signal;
  herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to indicate whether the first TA is used to determine a transmission timing of a transmitter of the first signal.

According to one aspect of the present disclosure, the above method is characterized in also comprising:

transmitting second information and third information;

herein, the second information is used to determine the W candidate sequences, and the first communication node randomly selects the first sequence out of the W candidate sequences; and the third information is used to determine that the second signal carries the first information.

According to one aspect of the present disclosure, the above method is characterized in that the first information is used to determine a first time length, and a length of a time interval between a time for transmitting the first signal and a time for receiving the second signal is equal to a second time length; a sum of the first time length and the first TA multiplied by two is equal to a target time length, a relation between the second time length and the target time length is used to determine whether the first TA is used to determine a transmission timing of a transmitter of the first signal.

According to one aspect of the present disclosure, the above method is characterized in also comprising:

transmitting fourth information;

herein, the fourth information is used to determine X candidate time-frequency resource pools, the X candidate time-frequency resource pools respectively correspond to X candidate measurement intervals, and any two of the X candidate measurement intervals are different, X being a positive integer greater than 1; the target time-frequency resource block belongs to a target time-frequency resource pool.

According to one aspect of the present disclosure, the above method is characterized in that the first information is used to determine a first measurement interval, and the first measurement interval is one of the X candidate measurement intervals.

According to one aspect of the present disclosure, the above method is characterized in that when a transmitter of the first node can acquire positioning information of a transmitter of the first signal, one of the X candidate measurement intervals comprises a distance between a transmitter of the first signal and a receiver of the first signal; otherwise, one of the X candidate measurement intervals comprises tilt angle information between a transmitter of the first signal and a receiver of the first signal.

The present disclosure provides a first communication node device for wireless communications, comprising:

a first transmitter, transmitting a first signal, the first signal occupying a target time-frequency resource block in time-frequency domain;

a first receiver, receiving a first signaling; and a second receiver, receiving a second signal, the first signaling being used to determine time-frequency resources occupied by the second signal;

herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node.

The present disclosure provides a second communication node for wireless communications, comprising:

a third receiver, receiving a first signal, the first signal occupying a target time-frequency resource block in time-frequency domain;

a second transmitter, transmitting a first signaling; and a third transmitter, transmitting a second signal, the first signaling being used to determine time-frequency resources occupied by the second signal;

herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to indicate whether the first TA is used to determine a transmission timing of a transmitter of the first signal.

In one embodiment, compared with the methods of random access in the existing terrestrial network, the present disclosure has the following main technical advantages:

by adopting the method in the present disclosure, the problem of ambiguity in uplink timing incurred by large delay differences is solved.

by adopting the method in the present disclosure, the existing preamble design can be reused as much as possible in networks with large delay differences or the preamble design occupying fewer time-domain resources is supported, thus reducing resource overhead in random access.

by adopting the method in the present disclosure, the network side can flexibly configure an information format in an RAR according to resource configuration requirement and implementation requirement, so as to improve configuration flexibility and support optimized random access design.

by adopting the method in the present disclosure, the network side indicate delay information between receiving a preamble and transmitting an RAR in the RAR, so that the problem of timing ambiguity can be solved accurately and effectively.

by adopting the method in the present disclosure, the effect of grouping UEs according to distance or delay is achieved and the demand for preamble length is reduced, so as to reduce overhead and improve resource utilization and random access capacity.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
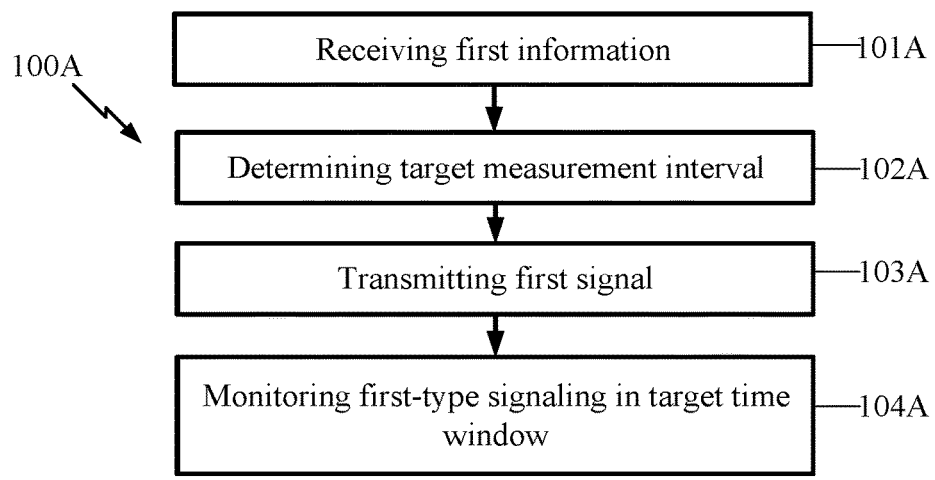
FIG. 1A illustrates a flowchart of first information, a target measurement interval, a first signal and a first-type signaling according to one embodiment of the present disclosure.

Embodiment 1A illustrates a flowchart of transmission of first information, a target measurement interval, a first signal and a first-type signaling according to one embodiment of the present disclosure, as shown in FIG. 1A.

In FIG. 1A, each box represents a step. It should be noted particularly that the order in which the boxes are arranged does not imply a chronological sequence of each step respectively marked.

In Embodiment 1A, a first communication node in the present disclosure receives first information in step 101A; determines a target measurement interval in step 102A; transmits a first signal in step 103A; monitors a first-type signaling in a target time window in step 104A; the target measurement interval is one of X candidate measurement intervals; a first sequence is used to generate the first signal, and the first signal occupies a target time-frequency resource block in time-frequency domain; and any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

In one embodiment, the first communication node is in a Radio Resource Control (RRC)_IDLE state.

In one embodiment, the first communication node is in an RRC_CONNECTED state.

In one embodiment, the first communication node is in an RRC_INACTIVE state.

In one embodiment, the first information is transmitted via an air interface.

In one embodiment, the first information is transmitted via a radio interface.

In one embodiment, the first information is transmitted by a higher-layer signaling.

In one embodiment, the first information is transmitted by a physical-layer signaling.

In one embodiment, the first information comprises all or part of a higher-layer signaling.

In one embodiment, the first information comprises all or part of a physical-layer signaling.

In one embodiment, the first information comprises all or partial Information Elements (IE) in an RRC signaling.

In one embodiment, the first information comprises all or partial fields in an IE in an RRC signaling.

In one embodiment, the first information comprises all or partial fields in a Medium Access Control (MAC) layer signaling.

In one embodiment, the first information comprises all or part of a System Information Block (SIB).

In one embodiment, the first information comprises all or part of a MAC Control Element (CE).

In one embodiment, the first information comprises all or part of a MAC Header.

In one embodiment, the first information is transmitted through a Downlink Shared Channel (DL-SCH).

In one embodiment, the first information is transmitted through a Physical Downlink Shared Channel (PDSCH).

In one embodiment, the first information is broadcast.

In one embodiment, the first information is cell-specific.

In one embodiment, the first information is UE-specific.

In one embodiment, the first information is UE group-specific.

In one embodiment, the first signal is geographic region-specific.

In one embodiment, the first information comprises all or partial fields of a Downlink Control Information (DCI) signaling.

In one embodiment, the above phrase of "the first information being used to determine a time interval length corresponding to each of the X candidate measurement intervals" includes: the first information is used by the first communication node in the present disclosure to determine a time interval length corresponding to each of the X candidate measurement intervals.

In one embodiment, the above phrase of "the first information being used to determine a time interval length corresponding to each of the X candidate measurement intervals" includes: the first information is used to directly indicate a time interval length corresponding to each of the X candidate measurement intervals.

In one embodiment, the above phrase of "the first information being used to determine a time interval length corresponding to each of the X candidate measurement intervals" includes: the first information is used to indirectly indicate a time interval length corresponding to each of the X candidate measurement intervals.

In one embodiment, the above phrase of "the first information being used to determine a time interval length corresponding to each of the X candidate measurement intervals" includes: the first information is used to explicitly indicate a time interval length corresponding to each of the X candidate measurement intervals.

In one embodiment, the above phrase of "the first information being used to determine a time interval length corresponding to each of the X candidate measurement intervals" includes: the first information is used to implicitly indicate a time interval length corresponding to each of the X candidate measurement intervals.

In one embodiment, the above phrase of "the first information being used to determine a time interval length corresponding to each of the X candidate measurement intervals" includes: the first information comprises X pieces of sub-information, the X pieces of sub-information are respectively used to indicate time interval lengths respectively corresponding to the X candidate measurement intervals.

In one embodiment, the above phrase of "the first information being used to determine a time interval length corresponding to each of the X candidate measurement intervals" includes: the first information is used to determine a one-to-one corresponding relation between the X candidate measurement intervals and the X time interval lengths.

In one embodiment, any of the X candidate measurement intervals is a value range.

In one embodiment, any of the X candidate measurement intervals is a possible value range of a measurement value.

In one embodiment, any of the X candidate measurement intervals is a possible value range of a target measurement value in the present disclosure.

In one embodiment, the X candidate measurement intervals are predefined.

In one embodiment, the X candidate measurement intervals are configurable.

In one embodiment, the X candidate measurement intervals are related to an altitude of the second communication node in the present disclosure.

In one embodiment, the X candidate measurement intervals are related to a type (such as geostationary satellite, low earth orbit satellite, medium earth orbit satellite, flying platform, etc.) of the second communication node in the present disclosure.

In one embodiment, for a given type of the second communication node in the present disclosure, the X candidate measurement intervals are predefined.

In one embodiment, for a given altitude of the second communication node in the present disclosure, the X candidate measurement intervals are predefined.

In one embodiment, any two of the X candidate measurement intervals are non-overlapped.

In one embodiment, there does not exist an overlapped part in any two of the X candidate measurement intervals.

In one embodiment, there exists an overlapped part in two of the X candidate measurement intervals.

In one embodiment, the first signal is a baseband signal.

In one embodiment, the first signal is a radio-frequency signal.

In one embodiment, the first signal is transmitted via an air interface.

In one embodiment, the first signal is transmitted via a radio interface.

In one embodiment, the first signal is used for random access.

In one embodiment, the first signal is transmitted through a Physical Random Access Channel (PRACH).

In one embodiment, the first signal is used to carry Msg1 in 4-step random access.

In one embodiment, the first signal is used to carry MsgA in 2-step random access.

In one embodiment, the first signal carries a preamble sequence.

In one embodiment, the first signal comprises a Cyclic Prefix (CP), a preamble and a Guard Period (GP).

In one embodiment, the target time-frequency resource block is time-frequency resources mapped when the first sequence is mapped to physical resources.

In one embodiment, the target time-frequency resource block is time-frequency resources occupied by a PRACH Occasion.

In one embodiment, the target time-frequency resource block comprises consecutive time-domain resources.

In one embodiment, the target time-frequency resource block comprises consecutive frequency-domain resources.

In one embodiment, the target time-frequency resource block comprises time-domain resources occupied by a CP, time-domain resources occupied by a preamble and time-domain resources occupied by a GP in time domain.

In one embodiment, the target time-frequency resource block comprises idle time-domain resources in time domain.

In one embodiment, the target time-frequency resource block comprises at least one Resource Element (RE).

In one embodiment, the first sequence is a Random-Access Preamble.

In one embodiment, the first sequence is used for random access.

In one embodiment, the first sequence is a pseudo-random sequence.

In one embodiment, the first sequence is a Zadoff-Chu (ZC) sequence.

In one embodiment, the first sequence comprises all of elements of a ZC sequence.

In one embodiment, the first sequence only comprises partial elements of a ZC sequence.

In one embodiment, the first sequence is a ZC sequence with a length of 839.

In one embodiment, the first sequence is a ZC sequence with a length of 139.

In one embodiment, all of elements in the first sequence are the same.

In one embodiment, there exist two elements in the first sequence being different.

In one embodiment, all of elements in the first sequence are 1.

In one embodiment, the first sequence comprises a CP.

In one embodiment, the first sequence is transmitted through a PRACH.

In one embodiment, the first sequence is a Random-Access Preamble in 2-step random access.

In one embodiment, the first sequence is a Random-Access Preamble in 4-step random access.

In one embodiment, the first sequence is a Random-Access Preamble in MsgA in 2-step random access.

In one embodiment, the first sequence is acquired by repeating a ZC sequence M times, M being a positive integer greater than 1.

In one embodiment, the first sequence is acquired by repeating a ZC sequence M times in time domain, M being a positive integer greater than 1.

In one embodiment, the first sequence is a Random-Access Preamble of a given PRACH Preamble Format.

In one embodiment, the above phrase of "a first sequence being used to generate the first signal" includes the following meaning: the first sequence acquires the first signal after sequentially through Mapping to Physical Resources and Orthogonal Frequency Division Multiplexing (OFDM) Baseband Signal Generation.

In one embodiment, the above phrase of "a first sequence being used to generate the first signal" includes the following meaning: the first sequence acquires the first signal after sequentially through Mapping to Physical Resources, OFDM Baseband Signal Generation, and Modulation and Upconversion In one embodiment, the above phrase of "a first sequence being used to generate the first signal" includes the following meaning: the first sequence acquires the first signal after sequentially through time-domain repetition, CP Insertion, Mapping to Physical Resources and OFDM Baseband Signal Generation.

In one embodiment, the above phrase of "a first sequence being used to generate the first signal" includes the following meaning: the first sequence acquires the first signal after sequentially through time-domain repetition, CP Insertion, Mapping to Physical Resources, OFDM Baseband Signal Generation, and Modulation and Upconversion In one embodiment, the target time window comprises at least one consecutive slot in the case of a given Subcarrier Spacing (SCS).

In one embodiment, the target time window comprises at least one consecutive multicarrier symbol in the case of a given SCS.

In one embodiment, the target time window comprises at least one consecutive subframe.

In one embodiment, a start time and an end time of the target time window are aligned with boundaries of a downlink multicarrier symbol.

In one embodiment, a start time and an end time of the target time window are aligned with boundaries of a downlink slot in the case of a given SCS.

In one embodiment, the target time window is a Random Access Response (RAR) window.

In one embodiment, the target time window is used for a monitoring on Msg2 in 4-step random access procedure.

In one embodiment, the target time window is used for a monitoring on MsgB in 2-step random access procedure.

In one embodiment, the monitoring performed on the first-type signaling is implemented by a decoding performed on the first-type signaling.

In one embodiment, the monitoring performed on the first-type signaling is implemented by a blind decoding performed on the first-type signaling.

In one embodiment, the monitoring performed on the first-type signaling is implemented by a decoding and CRC check performed on the first-type signaling.

In one embodiment, the monitoring performed on the first-type signaling is implemented by a decoding and CRC check scrambled by the target characteristic identity performed on the first-type signaling.

In one embodiment, the monitoring performed on the first-type signaling is implemented by a decoding performed on the first-type signaling based on a format of the first-type signaling.

In one embodiment, the first-type signaling is transmitted via an air interface.

In one embodiment, the first-type signaling is transmitted via a radio interface.

In one embodiment, the first-type signaling is transmitted via a Uu interface.

In one embodiment, the first-type signaling is a physical-layer signaling.

In one embodiment, the first-type signaling is transmitted through a Physical Downlink Control Channel (PDCCH).

In one embodiment, the first-type signaling comprises all or partial fields of DCI.

In one embodiment, the first-type signaling comprises all or partial fields in DCI of a given DCI format.

In one embodiment, the first-type signaling comprises all or partial fields in DCI with DCI format 1-0.

In one embodiment, the monitoring performed on the first-type signaling is carried out in a Common Search Space (CSS).

In one embodiment, the monitoring performed on the first-type signaling is carried out in UE-specific Search Space (USS).

In one embodiment, the first-type signaling is DCI scheduling a PDSCH carrying an RAR.

In one embodiment, the first-type signaling is a PDCCH scheduling a PDSCH carrying an RAR.

In one embodiment, the first-type signaling is DCI scheduling a PDSCH carrying a MsgB.

In one embodiment, the first-type signaling is a PDCCH scheduling a PDSCH carrying a MsgB.

In one embodiment, in the procedure of carrying out a monitoring on the first-type signaling in the target time window, only one first-type signaling is detected.

In one embodiment, in the procedure of carrying out a monitoring on the first-type signaling in the target time window, more than one first-type signaling is detected.

In one embodiment, in the procedure of carrying out a monitoring on the first-type signaling in the target time window, no the first-type signaling is detected.

In one embodiment, in the procedure of carrying out a monitoring on the first-type signaling in the target time window, only one first-type signaling passes the CRC check scrambled by the target characteristic identity after channel decoding.

In one embodiment, in the procedure of carrying out a monitoring on the first-type signaling in the target time window, more than one first-type signaling passes a CRC check scrambled by the target characteristic identity after channel decoding.

In one embodiment, in the procedure of carrying out a monitoring on the first-type signaling in the target time window, no the first-type signaling is passes a CRC check scrambled by the target characteristic identity after channel decoding.

In one embodiment, any two of the X time interval lengths are unequal.

In one embodiment, there exist two of the X time interval lengths being equal.

In one embodiment, each of the X time interval lengths is measured by second.

In one embodiment, each of the X time interval lengths is measured by millisecond.

In one embodiment, each of the X time interval lengths is greater than 0.

In one embodiment, there exists one of the X time interval lengths being equal to 0.

In one embodiment, each of the X time interval lengths is not less than 0.

In one embodiment, in the case of a given SCS, each of the X time interval lengths is equal to a time length of at least one slot.

In one embodiment, in the case of a given SCS, each of the X time interval lengths is equal to a time length of at least one OFDM symbol.

In one embodiment, in the case of a given SCS, each of the X time interval lengths is equal to a monitoring period of a positive integral multiple of PDCCH(s).

In one embodiment, in the case of a given SCS, each of the X time interval lengths is equal to a positive integral multiple of monitoring period(s) for the first-type signaling.

In one embodiment, in the case of a given SCS, each of the X time interval lengths is equal to a positive integral multiple of monitoring period(s) of a PDCCH in a Type-1 PDCCH CSS set.

In one embodiment, the above phrase of "the X candidate measurement intervals respectively corresponding to X time interval lengths" includes the following meaning: the X candidate measurement intervals are respectively associated with the X time interval lengths.

In one embodiment, the above phrase of "the X candidate measurement intervals respectively corresponding to X time interval lengths" includes the following meaning: each of the X candidate measurement intervals and a corresponding time interval length in the X time interval lengths are configured via a same IE in a same signaling.

In one embodiment, the above phrase of "the X candidate measurement intervals respectively corresponding to X time interval lengths" includes the following meaning: the X time interval lengths are respectively configured for the X candidate measurement intervals.

In one embodiment, the above phrase of "the X candidate measurement intervals respectively corresponding to X time interval lengths" includes the following meaning: for each of the X candidate measurement intervals, there exists only one time interval length in the X time interval lengths.

In one embodiment, the reference time is later than an end time for transmitting the first signal.

In one embodiment, the reference time is an end time for transmitting the first signal.

In one embodiment, the reference time is a start time of a PDCCH occasion.

In one embodiment, the reference time is a start time of a PDCCH occasion identified by a Random Access-Radio Network Temporary Identity (RA-RNTI).

In one embodiment, the start time of the target time window is not earlier than the reference time.

In one embodiment, the start time of the target time window is later than the reference time.

In one embodiment, the start time of the target time window is equal to the reference time.

In one embodiment, the above phrase of "a position of the target time-frequency resource block in time-frequency domain being used to determine the reference time" includes the following meaning: a position of the target time-frequency resource block in time-frequency domain is used by the first communication node in the present disclosure to determine the reference time.

In one embodiment, the above phrase of "a position of the target time-frequency resource block in time-frequency domain being used to determine the reference time" includes the following meaning: a position of the target time-frequency resource block in time-frequency domain is used to determine the reference time based on a mapping relation.

In one embodiment, the above phrase of "a position of the target time-frequency resource block in time-frequency domain being used to determine the reference time" includes the following meaning: an end time of the target time-frequency resource block in time domain is used to determine the reference time.

In one embodiment, the above phrase of "a position of the target time-frequency resource block in time-frequency domain being used to determine the reference time" includes the following meaning: an end time of the target time-frequency resource block in time domain is not later than the reference time.

In one embodiment, the above phrase of "a position of the target time-frequency resource block in time-frequency domain being used to determine the reference time" includes the following meaning: an end time of the target time-frequency resource block in time domain is equal to the reference time.

In one embodiment, the above phrase of "a position of the target time-frequency resource block in time-frequency domain being used to determine the reference time" includes the following meaning: a time interval length between an end time of the target time-frequency resource block in time domain and the reference time is predefined.

In one embodiment, the above phrase of "a position of the target time-frequency resource block in time-frequency domain being used to determine the reference time" includes the following meaning: a time interval length between an end time of the target time-frequency resource block in time domain and the reference time is configurable.

In one embodiment, the target characteristic identity is a non-negative integer.

In one embodiment, the target characteristic identity is a Radio Network Temporary Identity (RNTI).

In one embodiment, the target characteristic identity is an RA-RNTI.

In one embodiment, the target characteristic identity is equal to a hexadecimal integer from FFF0 to FFFD.

In one embodiment, the above phrase of "a position of the target time-frequency resource block in time-frequency domain being used to determine the target characteristic identity" includes the following meaning: a position of the target time-frequency resource block in time-frequency domain is used by the first communication node in the present disclosure to determine the target characteristic identity.

In one embodiment, the above phrase of "a position of the target time-frequency resource block in time-frequency domain being used to determine the target characteristic identity" includes the following meaning: an index of an earliest OFDM symbol comprised in the target time-frequency resource block in time domain in a slot to which it belongs is used to determine the target characteristic identity.

In one embodiment, the above phrase of "a position of the target time-frequency resource block in time-frequency domain being used to determine the target characteristic identity" includes the following meaning: an index of a slot to which an earliest OFDM symbol comprised in the target time-frequency resource block in time domain belongs in a system frame is used to determine the target characteristic identity.

In one embodiment, the above phrase of "a position of the target time-frequency resource block in time-frequency domain being used to determine the target characteristic identity" includes the following meaning: an index of an earliest OFDM symbol comprised in the target time-frequency resource block in time domain in a slot to which it belongs is used to determine the target characteristic identity, and an index of an earliest OFDM symbol comprised in the target time-frequency resource block in time domain in a system frame is used to determine the target characteristic identity.

In one embodiment, the above phrase of "a position of the target time-frequency resource block in time-frequency domain being used to determine the target characteristic identity" includes the following meaning: an index of a PRB comprised in the target time-frequency resource block in frequency domain is used to determine the target characteristic identity.

In one embodiment, the above phrase of "a position of the target time-frequency resource block in time-frequency domain being used to determine the target characteristic identity" includes the following meaning: an index of a PRB with a lowest frequency comprised in the target time-frequency resource block in frequency domain is used to determine the target characteristic identity.

In one embodiment, the above phrase of "a position of the target time-frequency resource block in time-frequency domain being used to determine the target characteristic identity" includes the following meaning: an index of a PRB with a highest frequency comprised in the target time-frequency resource block in frequency domain is used to determine the target characteristic identity.

In one embodiment, the above phrase of "a position of the target time-frequency resource block in time-frequency domain being used to determine the target characteristic identity" includes the following meaning: an index of a PRB group comprised in the target time-frequency resource block in frequency domain is used to determine the target characteristic identity.

In one embodiment, the above phrase of "a position of the target time-frequency resource block in time-frequency domain being used to determine the target characteristic identity" is implemented through the following formula:

$$RA\text{-}RNTI = 1 + s\_id + 14 \times t\_id + 14 \times 80 \times f\_id + 14 \times 80 \times 8 \times ul\_carrier\_id$$

herein, RA-RNTI represents the target characteristic identity, s_id represents an index ($0 \leq s\_id < 14$) of an earliest multicarrier symbol (OFDM symbol) in time domain comprised in the target time-frequency resource block, t_id represents an index ($0 \leq t\_id < 80$) of a slot to which an earliest multicarrier symbol in time domain comprised in the target time-frequency resource block belongs in a system frame, f_id represents an index ($0 \leq f\_id < 8$) of frequency-domain resources in the target time-frequency resource block, and ul_carrier_id represents an identity of a carrier to which the target time-frequency resource block belongs in frequency domain.

In one embodiment, the above phrase of "the first-type signaling carrying a target characteristic identity" includes the following meaning: a CRC comprised in the first-type signaling carries the target characteristic identity.

In one embodiment, the above phrase of "the first-type signaling carrying a target characteristic identity" includes the following meaning: a payload of the first-type signaling carries the target characteristic identity.

In one embodiment, the above phrase of "the first-type signaling carrying a target characteristic identity" includes the following meaning: a check bit of the first-type signaling carries the target characteristic identity.

In one embodiment, the above phrase of "the first-type signaling carrying a target characteristic identity" includes the following meaning: a CRC of the first-type signaling is scrambled by the target characteristic identity.

Embodiment 1B

Figure 1B:
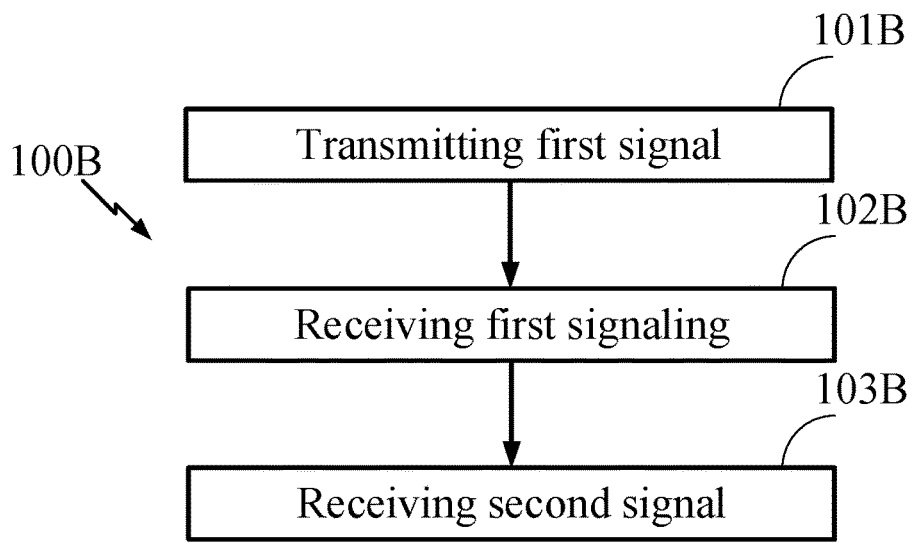
FIG. 1B illustrates a flowchart of a first signal, a first signaling and a second signal according to one embodiment of the present disclosure.

Embodiment 1B illustrates a flowchart of transmission of a first signal, a first signaling and a second signal according to one embodiment of the present disclosure, as shown in FIG. 1B. In FIG. 1B, each box represents a step. It should be noted particularly that the order in which the boxes are arranged does not imply a chronological sequence of each step respectively marked.

In embodiment 1B, a first communication node in the present disclosure transmits a first signal in step 101B; receives a first signaling in step 102B; and receives a second signal in step 103B; the first signal occupies a target time-frequency resource block in time-frequency domain; the first signaling is used to determine time-frequency resources occupied by the second signal, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node.

In one embodiment, the first communication node is in an RRC_IDLE state.

In one embodiment, the first communication node is in an RRC_CONNECTED state.

In one embodiment, the first communication node is in an RRC_INACTIVE state.

In one embodiment, the first signal is a baseband signal.

In one embodiment, the first signal is a radio-frequency signal.

In one embodiment, the first information is transmitted via an air interface.

In one embodiment, the first signal is transmitted via a radio interface.

In one embodiment, the first signal is used for random access.

In one embodiment, the first signal is transmitted through a PRACH.

In one embodiment, the first signal carries Msg1 in 4-step random access.

In one embodiment, the first signal carries MsgA in 2-step random access.

In one embodiment, the first signal carries a preamble sequence.

In one embodiment, the first signal comprises a CP, a preamble and a GP.

In one embodiment, the target time-frequency resource block is time-frequency resources mapped when the first sequence is mapped to physical resources.

In one embodiment, the target time-frequency resource block is time-frequency resources occupied by a PRACH Occasion.

In one embodiment, the target time-frequency resource block comprises consecutive time-domain resources.

In one embodiment, the target time-frequency resource block comprises consecutive frequency-domain resources.

In one embodiment, the target time-frequency resource block comprises time-domain resources occupied by a CP, time-domain resources occupied by a preamble and time-domain resources occupied by a GP.

In one embodiment, the target time-frequency resource block comprises idle time-domain resources in time domain.

In one embodiment, the target time-frequency resource block comprises at least one RE.

In one embodiment, the first sequence is a Random-Access Preamble.

In one embodiment, the first sequence is used for random access.

In one embodiment, the first sequence is a pseudo-random sequence.

In one embodiment, the first sequence is a ZC sequence.

In one embodiment, the first sequence comprises all of elements of a ZC sequence.

In one embodiment, the first sequence only comprises partial elements of a ZC sequence.

In one embodiment, the first sequence is a ZC sequence with a length of 839.

In one embodiment, the first sequence is a ZC sequence with a length of 139.

In one embodiment, all of elements in the first sequence are the same.

In one embodiment, there exist two elements in the first sequence being different.

In one embodiment, all of elements in the first sequence are 1.

In one embodiment, the first sequence comprises a CP.

In one embodiment, the first sequence is transmitted through a PRACH.

In one embodiment, the first sequence is a Random-Access Preamble in 2-step random access.

In one embodiment, the first sequence is a Random-Access Preamble in 4-step random access.

In one embodiment, the first sequence is a Random-Access Preamble in MsgA in 2-step random access.

In one embodiment, the first sequence is acquired by repeating a ZC sequence M times, M being a positive integer greater than 1.

In one embodiment, the first sequence is acquired by repeating a ZC sequence M times in time domain, M being a positive integer greater than 1.

In one embodiment, the first sequence is a Random-Access Preamble of a given PRACH Preamble Format.

In one embodiment, the above phrase of "a first sequence being used to generate the first signal" includes the following meaning: the first sequence acquires the first signal after sequentially through Mapping to Physical Resources and OFDM Baseband Signal Generation.

In one embodiment, the above phrase of "a first sequence being used to generate the first signal" includes the following meaning: the first sequence acquires the first signal after sequentially through Mapping to Physical Resources, OFDM Baseband Signal Generation, and Modulation and Upconversion In one embodiment, the above phrase of "a first sequence being used to generate the first signal" includes the following meaning: the first sequence acquires the first signal after sequentially through time-domain repetition, CP Insertion, Mapping to Physical Resources and OFDM Baseband Signal Generation.

In one embodiment, the above phrase of "a first sequence being used to generate the first signal" includes the following meaning: the first sequence acquires the first signal after sequentially through time-domain repetition, CP Insertion, Mapping to Physical Resources, OFDM Baseband Signal Generation, and Modulation and Upconversion In one embodiment, the first signaling is transmitted via an air interface.

In one embodiment, the first signaling is transmitted via a radio interface.

In one embodiment, the first signaling is transmitted via a Uu interface.

In one embodiment, the first signaling is a physical-layer signaling.

In one embodiment, the first signaling is transmitted through a PDCCH.

In one embodiment, the first signaling comprises all or partial fields of DCI.

In one embodiment, the first signaling comprises all or partial fields in DCI with a given DCI format.

In one embodiment, the first signaling comprises all or partial fields in DCI with DCI format 1-0.

In one embodiment, the first signaling is transmitted in a CSS.

In one embodiment, the first signaling is DCI scheduling a PDSCH carrying an RAR.

In one embodiment, the first signaling is a PDCCH scheduling a PDSCH carrying an RAR.

In one embodiment, the first signaling is DCI scheduling a PDSCH carrying a MsgB.

In one embodiment, the first signaling is a PDCCH scheduling a PDSCH carrying a MsgB.

In one embodiment, the above phrase of "the first signaling being used to determine time-frequency resources occupied by the second signal" includes the following meaning: the first signaling is used by the first communication node in the present disclosure to determine time-frequency resources occupied by the second signal.

In one embodiment, the above phrase of "the first signaling being used to determine time-frequency resources occupied by the second signal" includes the following meaning: the first signaling is used to directly indicate time-frequency resources occupied by the second signal.

In one embodiment, the above phrase of "the first signaling being used to determine time-frequency resources occupied by the second signal" includes the following meaning: the first signaling is used to indirectly indicate time-frequency resources occupied by the second signal.

In one embodiment, the above phrase of "the first signaling being used to determine time-frequency resources occupied by the second signal" includes the following meaning: the first signaling is used to explicitly indicate time-frequency resources occupied by the second signal.

In one embodiment, the above phrase of "the first signaling being used to determine time-frequency resources occupied by the second signal" includes the following meaning: the first signaling is used to implicitly indicate time-frequency resources occupied by the second signal.

In one embodiment, the first signaling is also used to determine a MCS adopted by the second signal.

In one embodiment, the target characteristic identity is a non-negative integer.

In one embodiment, the target characteristic identity is an RNTI.

In one embodiment, the target characteristic identity is an RA-RNTI.

In one embodiment, the target characteristic identity is equal to a hexadecimal integer from FFF0 to FFFD.

In one embodiment, the above phrase of "a position of the target time-frequency resource block in time-frequency domain being used to determine the target characteristic identity" includes the following meaning: a position of the target time-frequency resource block in time-frequency domain is used by the first communication node in the present disclosure to determine the target characteristic identity.

In one embodiment, the above phrase of "a position of the target time-frequency resource block in time-frequency domain being used to determine the target characteristic identity" includes the following meaning: an index of an earliest OFDM symbol comprised in the target time-frequency resource block in time domain in a slot to which it belongs is used to determine the target characteristic identity.

In one embodiment, the above phrase of "a position of the target time-frequency resource block in time-frequency domain being used to determine the target characteristic identity" includes the following meaning: an index of a slot to which an earliest OFDM symbol comprised in the target time-frequency resource block in time domain belongs in a system frame is used to determine the target characteristic identity.

In one embodiment, the above phrase of "a position of the target time-frequency resource block in time-frequency domain being used to determine the target characteristic identity" includes the following meaning: an index of an earliest OFDM symbol comprised in the target time-frequency resource block in time domain in a slot to which it belongs is used to determine the target characteristic identity, and an index of an earliest OFDM symbol comprised in the target time-frequency resource block in time domain in a system frame is used to determine the target characteristic identity.

In one embodiment, the above phrase of "a position of the target time-frequency resource block in time-frequency domain being used to determine the target characteristic identity" includes the following meaning: an index of a PRB comprised in the target time-frequency resource block in frequency domain is used to determine the target characteristic identity.

In one embodiment, the above phrase of "a position of the target time-frequency resource block in time-frequency domain being used to determine the target characteristic identity" includes the following meaning: an index of a PRB with a lowest frequency comprised in the target time-frequency resource block in frequency domain is used to determine the target characteristic identity.

In one embodiment, the above phrase of "a position of the target time-frequency resource block in time-frequency domain being used to determine the target characteristic identity" includes the following meaning: an index of a PRB with a highest frequency comprised in the target time-frequency resource block in frequency domain is used to determine the target characteristic identity.

In one embodiment, the above phrase of "a position of the target time-frequency resource block in time-frequency domain being used to determine the target characteristic identity" includes the following meaning: an index of a PRB group comprised in the target time-frequency resource block in frequency domain is used to determine the target characteristic identity.

In one embodiment, the above phrase of "a position of the target time-frequency resource block in time-frequency domain being used to determine the target characteristic identity" is implemented through the following formula:

$$RA\text{-}RNTI = 1 + s\_id + 14 \times t\_id + 14 \times 80 \times f\_id + 14 \times 80 \times 8 \times ul\_carrier\_id$$

herein, RA-RNTI represents the target characteristic identity, $s\_id$ represents an index ($0 \leq s\_id < 14$) of an earliest multicarrier symbol (OFDM symbol) in time domain comprised in the target time-frequency resource block, $t\_id$ represents an index ($0 \leq t\_id < 80$) of a slot to which an earliest multicarrier symbol in time domain comprised in the target time-frequency resource block belongs in a system frame, $f\_id$ represents an index ($0 \leq f\_id < 8$) of frequency-domain resources in the target time-frequency resource block, and $ul\_carrier\_id$ represents an identity of a carrier to which the target time-frequency resource block belongs in frequency domain.

In one embodiment, the above phrase of "the first signaling carrying a target characteristic identity" includes the following meaning: a CRC comprised in the first signaling carries the target characteristic identity.

In one embodiment, the above phrase of "the first signaling carrying a target characteristic identity" includes the following meaning: a payload of the first signaling carries the target characteristic identity.

In one embodiment, the above phrase of "the first signaling carrying a target characteristic identity" includes the following meaning: a check bit of the first-type signaling carries the target characteristic identity.

In one embodiment, the above phrase of "the first signaling carrying a target characteristic identity" includes the following meaning: a CRC of the first-type signaling is scrambled by the target characteristic identity.

In one embodiment, the W is equal to 64.

In one embodiment, W is equal to 32.

In one embodiment, the W is greater than 64.

In one embodiment, the W is less than 64.

In one embodiment, any of the W candidate sequences is a Random-Access Preamble.

In one embodiment, any of the W candidate sequences is used for random access.

In one embodiment, any of the W candidate sequences is a pseudorandom sequence.

In one embodiment, any of the W candidate sequences is ZC sequence.

In one embodiment, any of the W candidate sequences comprises all elements in a ZC sequence.

In one embodiment, any of the W candidate sequences only comprises partial elements in a ZC sequence.

In one embodiment, any of the W candidate sequences is ZC sequence with a length of 839.

In one embodiment, any of the W candidate sequences is ZC sequence with a length of 139.

In one embodiment, any of the W candidate sequences comprises a CP.

In one embodiment, any of the W candidate sequences is transmitted through a PRACH.

In one embodiment, any of the W candidate sequences is a Random-Access Preamble in 2-step random access.

In one embodiment, any of the W candidate sequences is a Random-Access Preamble in 4-step random access.

In one embodiment, any of the W candidate sequences is a Random-Access Preamble in MsgA in 2-step random access.

In one embodiment, any of the W candidate sequences is acquired by repeating a ZC sequence M times, and M is a positive integer greater than 1.

In one embodiment, any of the W candidate sequences is acquired by repeating a ZC sequence M times in time domain, and M is a positive integer greater than 1.

In one embodiment, any of the W candidate sequences is a Random-Access Preamble of a given PRACH Preamble Format.

In one embodiment, the second signal is a baseband signal.

In one embodiment, the second signal is a radio-frequency signal.

In one embodiment, the second information is transmitted via an air interface.

In one embodiment, the second signal is transmitted via a radio interface.

In one embodiment, the second signal is used for random access.

In one embodiment, the second signal carries Msg2 (random access information 2).

In one embodiment, the second signal carries MsgB (random access information B).

In one embodiment, the second signal carries an RAR.

In one embodiment, the second signal is transmitted through a DL-SCH.

In one embodiment, the second signal is transmitted through a PDSCH.

In one embodiment, the target sequence index is a Random Access Preamble Identity (RAPID).

In one embodiment, the target sequence index is a "ra-PreambleIndex".

In one embodiment, the target sequence index is a "PREAMBLE_INDEX".

In one embodiment, the target sequence index is an index represented by 6 bits.

In one embodiment, the target sequence index is a non-negative integer less than 64.

In one embodiment, the above phrase of "the second signal carrying a target sequence index" includes the following meaning: a MAC subheader in a MAC subPDU in a MAC Protocol Data Units (PDU) carried by the second signal comprises the target sequence index.

In one embodiment, the above phrase of "the second signal carrying a target sequence index" includes the following meaning: a MAC header in a MAC PDU carried by the second signal comprises the target sequence index.

In one embodiment, the above phrase of "the second signal carrying a target sequence index" includes the following meaning: a MAC CE in a MAC subPDU in a MAC PDU carried by the second signal comprises the target sequence index.

In one embodiment, the above phrase of "the second signal carrying a target sequence index" includes the following meaning: a MAC payload in a MAC subPDU in a MAC PDU carried by the second signal comprises the target sequence index.

In one embodiment, the first information is higher-layer information.

In one embodiment, the first information is all or part of MAC layer information.

In one embodiment, the first information is all or part of a field in a MAC header.

In one embodiment, the first information is all or part of a field in a MAC subheader.

In one embodiment, the first information is all or part of a field in a MAC CE.

In one embodiment, the first information is all or part of a field in a MAC payload.

In one embodiment, the above phrase of "the second signal carrying first information" includes the following meaning: a MAC subheader in a MAC subPDU in a MAC PDU carried by the second signal comprises the first information.

In one embodiment, the above phrase of "the second signal carrying first information" includes the following meaning: a MAC header in a MAC PDU carried by the second signal comprises the first information.

In one embodiment, the above phrase of "the second signal carrying first information" includes the following meaning: a MAC CE in a MAC subPDU in a MAC PDU carried by the second signal comprises the first information.

In one embodiment, the above phrase of "the second signal carrying first information" includes the following meaning: a MAC payload in a MAC subPDU in a MAC PDU carried by the second signal comprises the first information.

In one embodiment, the first TA belongs to higher-layer information.

In one embodiment, the first TA belongs to all or part in MAC layer information.

In one embodiment, the first TA belongs to all or part of a field in a MAC header.

In one embodiment, the first TA belongs to all or part of a field in a MAC subheader.

In one embodiment, the first TA belongs to all or part of a field in a MAC CE.

In one embodiment, the first TA belongs to all or part of a field in a MAC Payload.

In one embodiment, the first TA is a non-negative real number.

In one embodiment, the first TA is measured by μs.

In one embodiment, the first TA is measured by s.

In one embodiment, the first TA is equal to a TA value of a signal transmitted later than the first signal by the first communication node.

In one embodiment, the first TA is equal to a TA of a start time that the first communication node transmits a signal later than the first signal relative to a downlink slot boundary.

In one embodiment, the first TA is equal to a non-negative integer number of Tc.

In one embodiment, the first TA is greater than 0, and the first TA is related to a type of the second communication node in the present disclosure.

In one embodiment, the first TA is greater than 0, and the first TA is related to an altitude of the second communication node in the present disclosure.

In one embodiment, the first TA is greater than 0, and the first TA is related to a type of a satellite to which the second communication node belongs in the present disclosure.

In one embodiment, the above phrase of "the second signal carrying a first TA" includes the following meaning: a MAC subheader in a MAC subPDU in a MAC PDU carried by the second signal comprises the first TA.

In one embodiment, the above phrase of "the second signal carrying a first TA" includes the following meaning: a MAC header in a MAC PDU carried by the second signal comprises the first TA.

In one embodiment, the above phrase of "the second signal carrying a first TA" includes the following meaning: a MAC CE in a MAC subPDU in a MAC PDU carried by the second signal comprises the first TA.

In one embodiment, the above phrase of "the second signal carrying a first TA" includes the following meaning: a MAC payload in a MAC subPDU in a MAC PDU carried by the second signal comprises the first TA.

In one embodiment, the first information and the first TA are both associated with the target sequence index.

In one embodiment, the first information and the first TA are both for the target sequence index.

In one embodiment, the target sequence index, the first information and the first TA all belong to a MAC subPDU.

In one embodiment, the target sequence index belongs to a MAC subheader in a target MAC subPDU, the first information belongs to a MAC CE in the target MAC subPDU, the first TA belongs to a MAC payload in the target MAC subPDU, and the target MAC subPDU is a MAC subPDU in a MAC PDU.

In one embodiment, the target sequence index belongs to a MAC subheader in a target MAC subPDU, the first information belongs to a MAC payload in the target MAC subPDU, the first TA belongs to a MAC payload in the target MAC subPDU, and the target MAC subPDU is a MAC subPDU in a MAC PDU.

In one embodiment, the target sequence index is transmitted through a MAC subheader in a target MAC subPDU, the first information is transmitted through a MAC CE in the target MAC subPDU, the first TA is transmitted through a MAC payload in the target MAC subPDU, and the target MAC subPDU is a MAC subPDU in a MAC PDU.

In one embodiment, the target sequence index is transmitted through a MAC subheader in a target MAC subPDU, the first information is transmitted through a MAC payload in the target MAC subPDU, the first TA is transmitted through a MAC payload in the target MAC subPDU, and the target MAC subPDU is a MAC subPDU in a MAC PDU.

In one embodiment, the above phrase of "the target sequence index corresponding to an index of the first sequence in the W candidate sequences" includes the following meaning: the target sequence index is equal to an index of the first sequence in the W candidate sequences.

In one embodiment, the above phrase of "the target sequence index corresponding to an index of the first sequence in the W candidate sequences" includes the following meaning: the target sequence index is the same as an index of the first sequence in the W candidate sequences.

In one embodiment, the above phrase of "the target sequence index corresponding to an index of the first sequence in the W candidate sequences" includes the following meaning: a sequence identified by the target sequence index is the same as the first sequence.

In one embodiment, the above phrase of "the target sequence index corresponding to an index of the first sequence in the W candidate sequences" includes the following meaning: the target sequence index and an index of the first sequence in the W candidate sequences have a unique corresponding relation.

In one embodiment, the above phrase of "the first information being used to determine whether the first TA can be used to determine a transmission timing of the first communication node" includes the following meaning: the first information is used by the first communication node in the present disclosure to determine whether the first TA can be used to determine a transmission timing of the first communication node.

In one embodiment, the above phrase of "the first information being used to determine whether the first TA can be used to determine a transmission timing of the first communication node" includes the following meaning: the first information is used to directly indicate whether the first TA can be used to determine a transmission timing of the first communication node.

In one embodiment, the above phrase of "the first information being used to determine whether the first TA can be used to determine a transmission timing of the first communication node" includes the following meaning: the first information is used to implicitly indicate whether the first TA can be used to determine a transmission timing of the first communication node.

In one embodiment, the above phrase of "the first information being used to determine whether the first TA can be used to determine a transmission timing of the first communication node" includes the following meaning: the first information is used to determine whether the first communication node belongs to a target receiver of the second signal; when the first communication node belongs to the target receiver of the second signal, the first TA is used to determine a transmission timing of the first communication node.

In one embodiment, when the target sequence index does not correspond to an index of the first sequence in the W candidate sequences, the first timing TA is not used to determine a transmission timing of the first communication node.

In one embodiment, when the first TA is used to determine a transmission timing of the first communication node, the first TA is equal to a TA of the first communication node during transmission.

In one embodiment, when the first TA is used to determine a transmission timing of the first communication node, a sum of the first TA and a first timing offset is equal to a TA of the first communication node during transmission, and the first timing offset is configurable.

In one embodiment, also comprising:
receiving sixth information;
herein, the sixth information is used to determine a first timing offset, when the first TA is used to determine a transmission timing of the first communication node, a sum of the first TA and the first timing offset is equal to a TA of the first communication node during transmission.

In one embodiment, when the first TA is used to determine a transmission timing of the first communication node, a sum of the first TA and a first timing offset is equal to a TA of the first communication node during transmission, and the first timing offset is related to an altitude of the second communication node in the present disclosure.

In one embodiment, when the first TA is used to determine a transmission timing of the first communication node, a sum of the first TA and a first timing offset is equal to a TA of the first communication node during transmission, and the first timing offset is related to a type (geostationary satellite, low earth orbit satellite, medium earth orbit satellite, etc.) of the second communication node in the present disclosure.

Embodiment 2

Figure 2:
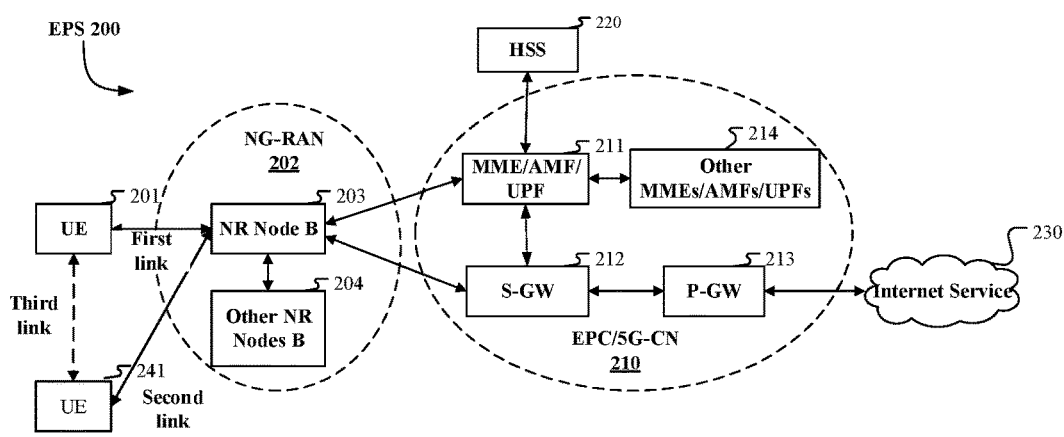
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LIE), and Long-Term Evolution Advanced (LIE-A) systems. The 5G NR or LIE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may also be referred as a base station, a base transceiver, a radio base station, a radio transceiver, a transceiver function, a Basic Service Set (BSS), an Extended Service Set (ESS), a Transmission and Reception Point (TRP), or some other suitable terms. In a NTN network, gNB 203 may be a satellite or a territorial base station relayed through a satellite. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet and IP Multimedia Subsystem (IMS).

In one embodiment, the UE 201 corresponds to the first communication node in the present disclosure.

In one embodiment, the UE 201 supports NTN communications.

In one embodiment, the UE 201 supports communications within networks with large delay differences.

In one embodiment, the gNB 203 corresponds to the second communication node in the present disclosure.

In one embodiment, the gNB 203 supports communications within NTNs.

In one embodiment, the gNB 203 supports communications within networks with large delay differences.

Embodiment 3

Figure 3:
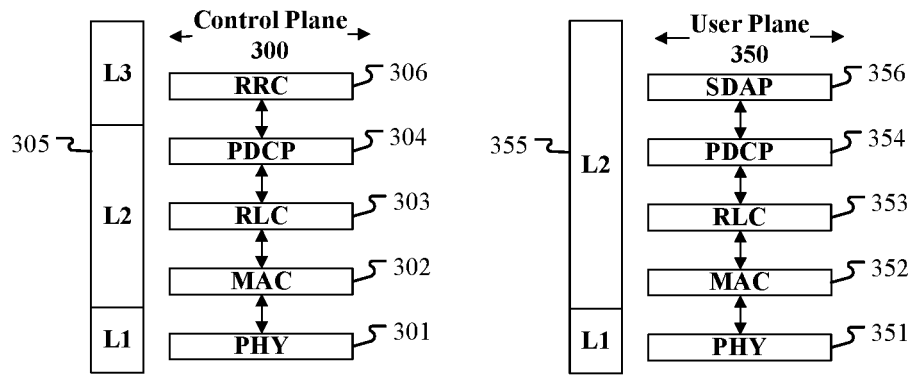
FIG. 3 illustrates a schematic diagram of a protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or satellite or aircraft in NTN) and a second communication node (gNB, UE or satellite or aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a MAC sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the first-type signaling in the present disclosure is generated by the RRC 306.

In one embodiment, the first-type signaling in the present disclosure is generated by the MAC 302 or the MAC 352.

In one embodiment, the first-type signaling in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

In one embodiment, the target measurement value in the present disclosure is generated by the RRC 306.

In one embodiment, the target measurement value in the present disclosure is generated by the MAC 302 or the MAC 352.

In one embodiment, the target measurement value in the present disclosure is generated by the PHY 301 or the PHY 351.

In one embodiment, the fourth information in the present disclosure is generated by the RRC 306.

In one embodiment, the fourth information in the present disclosure is generated by the MAC 302 or the MAC 352.

In one embodiment, the fourth information in the present disclosure is generated by the PHY 301 or the PHY 351.

In one embodiment, the fifth information in the present disclosure is generated by the RRC 306.

In one embodiment, the fifth information in the present disclosure is generated by the MAC 302 or the MAC 352.

In one embodiment, the fifth information in the present disclosure is generated by the PHY 301 or the PHY 351.

In one embodiment, the second signal in the present disclosure is generated by the RRC 306.

In one embodiment, the second signal in the present disclosure is generated by the MAC 302 or the MAC 352.

In one embodiment, the second signal in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

Embodiment 4

Figure 4:
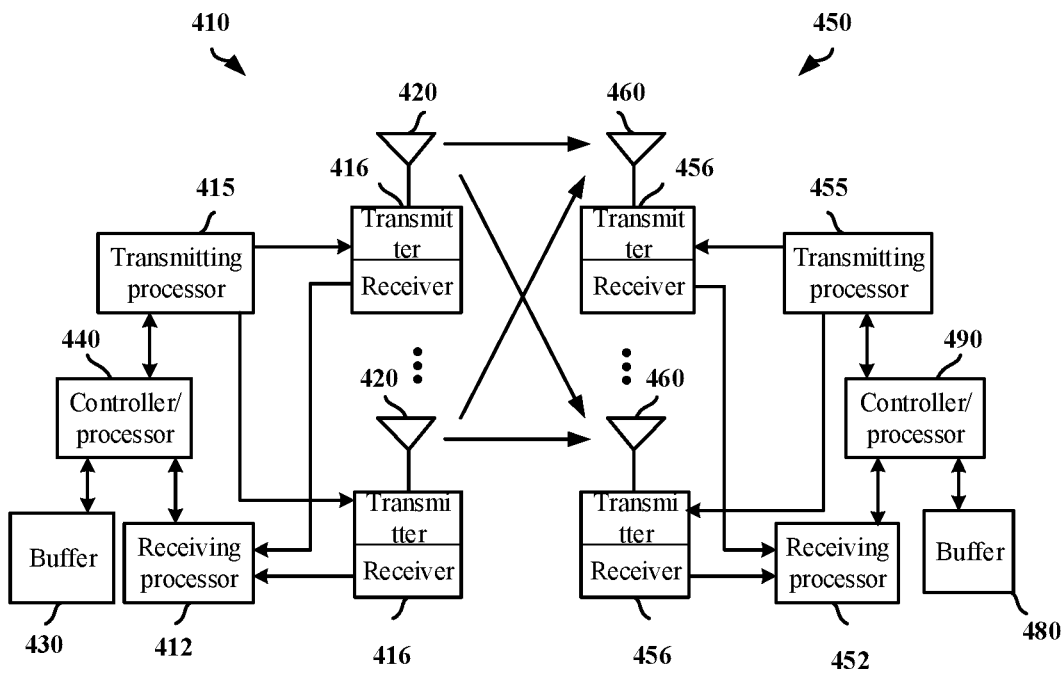
FIG. 4 illustrates a schematic diagram of a first communication node and a second communication node according to one embodiment of the present disclosure.

Embodiment 4 illustrates a schematic diagram of a first communication node and a second communication node in the present disclosure, as shown in FIG. 4.

The first communication node (450) may comprise a controller/processor 490, a data source/buffer 480, a receiving processor 452, a transmitter/receiver 456 and a transmitting processor 455, wherein the transmitter/receiver 456 comprises an antenna 460. The data source/buffer 480 provides a higher-layer packet to the controller/processor 490, the controller/processor 490 provides header compression and decompression, encryption and decryption, packet segmentation and reordering and multiplexing and demultiplexing between a logical channel and a transport channel so as to implement protocols of the L2 layer and above layers used for the user plane and the control plane. The higher layer packet may comprise data or control information, such as DL-SCH, UL-SCH or SL-SCH. The transmitting processor 455 performs various signal transmitting processing functions used for the L1 layer (that is, PHY), including coding, interleaving, scrambling, modulation, power control/allocation and generation of physical layer control signaling. the receiving processor 452 performs various signal receiving processing functions used for the L1 layer (that is, PHY), including decoding, deinterleaving, descrambling, demodulation, deprecoding and extraction of physical layer control signaling. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The second communication node (410) may comprise a controller/processor 440, a data source/buffer 430, a receiving processor 412, a transmitter/receiver 416 and a transmitting processor 415, wherein the transmitter/receiver 416 comprises an antenna 420. The data source/buffer 430 provides a higher layer packet to the controller/processor 440, the controller/processor 440 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH or SL-SCH. The transmitting processor 415 provides various signal transmitting processing functions used for the L1 layer (that is, PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, deinterleaving, descrambling, demodulation, deprecoding and extraction of physical layer signaling. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink, a higher-layer packet, such as high-layer information comprised in the first information, the second information, the third information, the fourth information, the fifth information, the first-type signaling (if higher-layer information is comprised in the first-type signaling) and the second signal in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first communication node 450 based on varied priorities. The controller/processor 440 is also in charge of HARQ operation, retransmission of a lost packet, and a signaling to the first communication node 450, for instance, the first information, the second information, the third information, the fourth information, the fifth information, the first-type signaling (if higher-layer information is comprised in the first-type signaling) and the second signaling in the present disclosure are all generated in the controller/processor 440. The transmitting processor 415 implements various signal processing functions on the L1 layer (i.e., physical layer), including coding, interleaving, scrambling, modulation, power control/allocation, precoding, and generation of a physical-layer control signaling, etc. The generation of physical-layer signals carrying the first information, the second information, the third information, the fourth information, the fifth information, the first-type signaling and the second signal in the present disclosure are completed by the transmitting processor 415, and the transmitting processor 415 divides the generated modulation symbols into parallel streams and maps each stream to a corresponding multi-carrier subcarrier and/or a multi-carrier symbol, which are then transmitted in the form of a radio-frequency signal by the transmitting processor 415 mapping to the antenna 420 via the transmitter 416. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals carrying the first information, the second information, the third information, the fourth information, the fifth information, the first-type signaling (if the higher-layer information is comprised in the first-type signaling) and the second signal in the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second communication node 410 on a physical channel, and the data or control signals are later provided to the controller/processor 490. The controller/processor 490 implements the functions of L2 layer and above layers, and the controller/processor 490 interprets the first information, the second information, the third information, the fourth information, the fifth information, the first-type signaling (if higher-layer information is comprised in the first-type signaling) and the second signal in the present disclosure. The controller/processor can be connected to a memory 480 that stores program code and data. The memory 480 may be called a computer readable medium.

In UL transmission, the data source/memory 480 provides higher-layer data to the controller/processor 490. The data source/buffer 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second communication node 410. The controller/processor 490 is also in charge of HARQ operation, retransmission of a lost packet, and a signaling to the second communication node 410. The first signal in the present disclosure is generated at the data source/buffer 480 or at the controller/processor 490. The transmitting processor 455 provides various signal transmitting processing functions for the L1 layer (that is, PHY). The generation of a physical layer signal carrying the first signal in the present disclosure is completed in the transmitting processor 415. The signal transmission processing functions include coding and interleaving so as to facilitate Forward Error Correction (FEC) at the UE 450 as well as modulation of baseband signals based on various modulation schemes (i.e., BPSK, QPSK). The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing a physical layer signal carrying the first signal in the present disclosure, the signal receiving and processing function includes acquisition of multi-carrier symbol streams, demodulation based on each modulation scheme (i.e., BPSK, QPSK), then the decoding and de-interleaving to recover data and/or control signals originally transmitted by the first communication node 450 on the PHY. The data and the control signal are then provided to the controller/processor 440. The controller/processor 440 performs functions of L2 layer, including interpreting information carried by the first signal in the present disclosure. The controller/processor can be connected to a buffer 430 that stores program code and data. The buffer 430 may be called a computer readable medium.

In one embodiment, the first communication node 450 comprises at least one processor and at least one memory. The at least one memory comprises computer program codes; the at least one memory and the computer program codes are configured to be used in collaboration with the at least one processor, the first communication node 450 at least receives first information; determines a target measurement interval, the target measurement interval is one of X candidate measurement intervals; transmits a first signal, a first sequence is used to generate the first signal, and the first signal occupies a target time-frequency resource block in time-frequency domain; and monitors a first-type signaling in a target time window; any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

In one embodiment, the first communication node 450 comprises a memory that stores a computer readable instruction program. The computer readable instruction program generates an action when carried out by at least one processor. The action includes: receiving first information; determining a target measurement interval, the target measurement interval being one of X candidate measurement intervals; transmitting a first signal, a first sequence being used to generate the first signal, and the first signal occupying a target time-frequency resource block in time-frequency domain; and monitoring a first-type signaling in a target time window; any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

In one embodiment, the second communication node 410 comprises at least one processor and at least one memory. The at least one memory comprises computer program codes; the at least one memory and the computer program codes are configured to be used in collaboration with the at least one processor. The second communication node 410 at least: transmits first information; and receives a first signal, a first sequence is used to generate the first signal, and the first signal occupies a target time-frequency resource block in time-frequency domain; and transmits a first-type signaling in a target time window; any two of X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to a target measurement interval among the X time interval lengths, and a position of the target time-frequency resource block in time-frequency domain is used to determine the reference time; the target measurement interval is one of X candidate measurement intervals; the first-type signaling carries a target characteristic identity, and a position of the target time-frequency resource block in time-frequency domain is used to determine the target characteristic identity.

In one embodiment, the second communication node 410 comprises a memory that stores a computer readable instruction program. The computer readable instruction program generates an action when carried out by at least one processor. The action includes: transmitting first information; and receiving a first signal, a first sequence being used to generate the first signal, and the first signal occupying a target time-frequency resource block in time-frequency domain; and transmitting a first-type signaling in a target time window; any two of X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to a target measurement interval among the X time interval lengths, and a position of the target time-frequency resource block in time-frequency domain is used to determine the reference time; the target measurement interval is one of X candidate measurement intervals; the first-type signaling carries a target characteristic identity, and a position of the target time-frequency resource block in time-frequency domain is used to determine the target characteristic identity.

In one embodiment, the first communication node 450 comprises at least one processor and at least one memory. The at least one memory comprises computer program codes; the at least one memory and the computer program codes are configured to be used in collaboration with the at least one processor, the first communication node 450 at least transmits a first signal, the first signal occupies a target time-frequency resource block in time-frequency domain; receives a first signaling; receives a second signal, the first signaling is used to determine time-frequency resources occupied by the second signal; herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node.

In one embodiment, the first communication node 450 comprises a memory that stores a computer readable instruction program. The computer readable instruction program generates an action when carried out by at least one processor. The action includes: transmitting a first signal, the first signal occupying a target time-frequency resource block in time-frequency domain; receiving a first signaling; receiving a second signal, the first signaling being used to determine time-frequency resources occupied by the second signal; herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node.

In one embodiment, the second communication node 410 comprises at least one processor and at least one memory. The at least one memory comprises computer program codes; the at least one memory and the computer program codes are configured to be used in collaboration with the at least one processor. The second communication node 410 at least: receives a first signal, the first signal occupies a target time-frequency resource block in time-frequency domain; transmits a first signaling; and transmits a second signal, the first signaling is used to determine time-frequency resources occupied by the second signal; herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to indicate whether the first TA is used to determine a transmission timing of a transmitter of the first signal.

In one embodiment, the second communication node 410 comprises a memory that stores a computer readable instruction program. The computer readable instruction program generates an action when carried out by at least one processor. The action includes: receiving a first signal, the first signal occupying a target time-frequency resource block in time-frequency domain; transmitting a first signaling; and transmitting a second signal, the first signaling being used to determine time-frequency resources occupied by the second signal; herein, the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to indicate whether the first TA is used to determine a transmission timing of a transmitter of the first signal.

In one embodiment, the first communication node 450 is a UE.

In one embodiment, the first communication node 450 is a UE that supports large delay differences.

In one embodiment, the first communication node 450 is a UE that supports NTNs.

In one embodiment, the first communication node 450 is an aircraft device.

In one embodiment, the second communication node 410 is a base station (gNB/eNB).

In one embodiment, the second communication node 410 is a base station that supports large delay differences.

In one embodiment, the second communication node 410 is a base station that supports NTNs.

In one embodiment, the second communication node 410 is a satellite equipment.

In one embodiment, the second communication node 410 is flying platform equipment.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to determine a target measurement interval in the present disclosure.

In one embodiment, the transmitter 456 (including the antenna 460), the transmitting processor 455 and the controller/processor 490 are to transmit the first signal in the present disclosure.

In one embodiment, the receiver 456 (including the antenna 460), the receiving processor 452 and the controller/processor 490 are used to receive the first-type signaling in the present disclosure.

In one embodiment, the receiver 456 (including the antenna 460), the receiving processor 452 and the controller/processor 490 are used to receive the second information in the present disclosure.

In one embodiment, the receiver 456 (including the antenna 460), the receiving processor 452 and the controller/processor 490 are used to receive the third information in the present disclosure.

In one embodiment, the receiver 456 (including the antenna 460), the receiving processor 452 and the controller/processor 490 are used to receive the fourth information in the present disclosure.

In one embodiment, the receiver 456 (including the antenna 460), the receiving processor 452 and the controller/processor 490 are used to receive the fifth information in the present disclosure.

In one embodiment, the transmitter 416 (including the antenna 420), the transmitting processor 415 and the controller/processor 440 are used to transmit the first information in the present disclosure.

In one embodiment, the receiver 416 (including the antenna 420), the receiving processor 412 and the controller/processor 440 are used to receive the first signal in the present disclosure.

In one embodiment, the transmitter 416 (including the antenna 420), the transmitting processor 415 and the controller/processor 440 are used to transmit the first-type signaling in the present disclosure.

In one embodiment, the transmitter 416 (including the antenna 420), the transmitting processor 415 and the controller/processor 440 are used to transmit the second information in the present disclosure.

In one embodiment, the transmitter 416 (including the antenna 420), the transmitting processor 415 and the controller/processor 440 are used to transmit the third information in the present disclosure.

In one embodiment, the transmitter 416 (including the antenna 420), the transmitting processor 415 and the controller/processor 440 are used to transmit the fourth information in the present disclosure.

In one embodiment, the transmitter 416 (including the antenna 420), the transmitting processor 415 and the controller/processor 440 are used to transmit the fifth information in the present disclosure.

In one embodiment, the transmitter 416 (including the antenna 420), the transmitting processor 415 and the controller/processor 440 are used to transmit the second signal in the present disclosure.

In one embodiment, the receiver 456 (including the antenna 460), the receiving processor 452 and the controller/processor 490 are used to receive the first signaling in the present disclosure.

In one embodiment, the transmitter 416 (including the antenna 420), the transmitting processor 415 and the controller/processor 440 are used to transmit the first signaling in the present disclosure.

Embodiment 5A

Figure 5A:
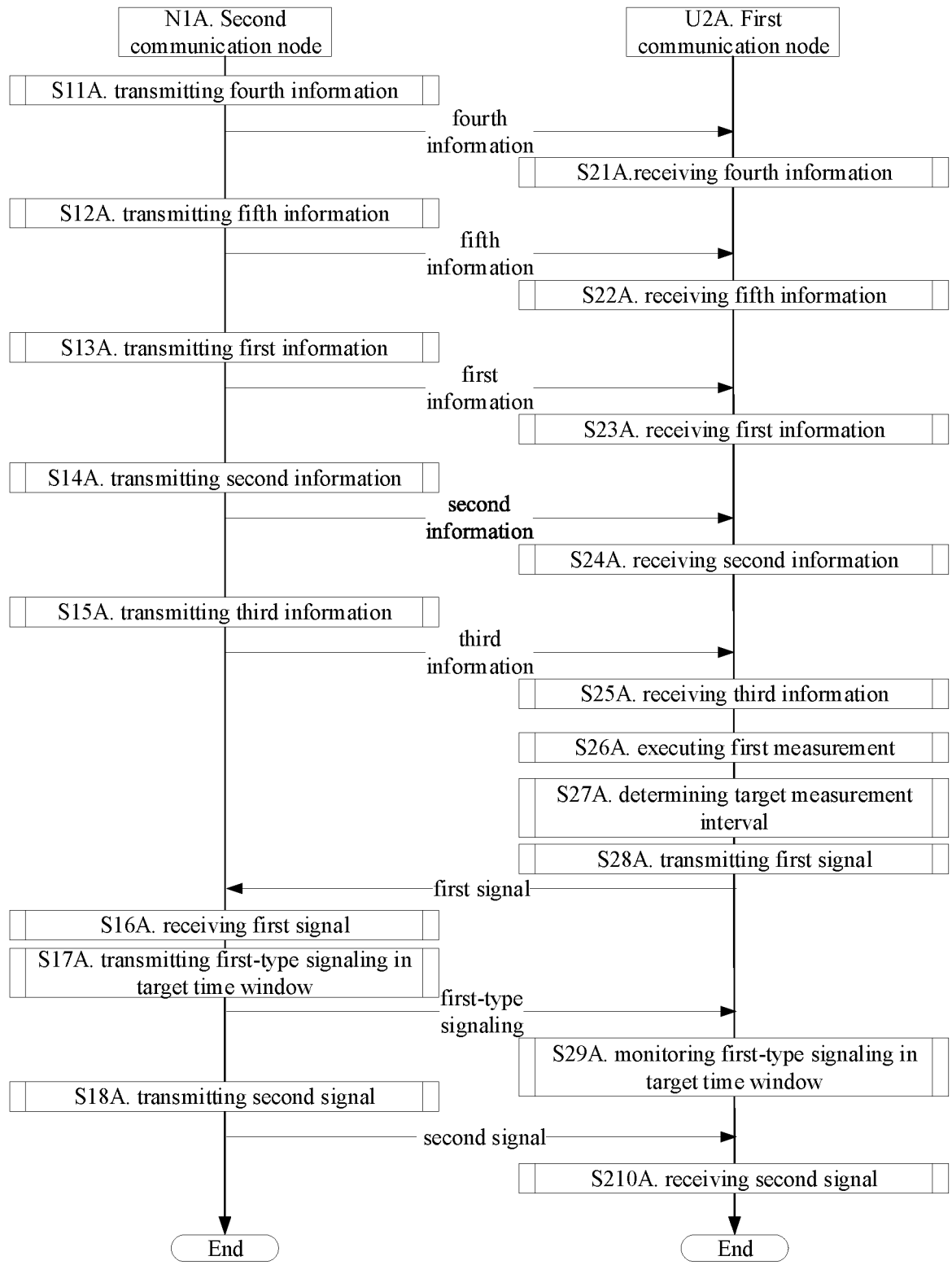
FIG. 5A illustrates a flowchart of signal transmission according to one embodiment of the present disclosure.

Embodiment 5A illustrates a flowchart of signal transmission according to one embodiment in the present disclosure, as shown in FIG. 5A. In FIG. 5A, a second communication node N1A is a maintenance base station of a serving cell of a first communication node U2A. It is particularly underlined that the order illustrated in the embodiment does not put constraints over sequences of signal transmissions and implementations.

The second communication node N1A transmits fourth information in step S11A, transmits fifth information in step S12A, transmits first information in step S13A, transmits second information in step S14A, transmits third information in step S15A, receives a first signal in step S16A, transmits a first-type signaling in a target window in step S17A, and transmits a second signal in step S28A.

The first communication node U2A receives fourth information in step S21A, receives fifth information in step S22A, receives first information in step S23A, receives second information in step S24A, receives third information in step S25A, executes a first measurement in step S26A, determines a target measurement interval in step S27A, transmits a first signal in step S28A, monitors a first-type signaling in a target time window in step S29A, and receives a second signal in step S210A.

In embodiment 5A, the target measurement interval in the present disclosure is one of X candidate measurement intervals; a first sequence is used to generate the first signal in the present disclosure, and the first signal occupies a target time-frequency resource block in time-frequency domain; and any two of the X candidate measurement intervals are different, X being a positive integer greater than 1; the X candidate measurement intervals respectively correspond to X time interval lengths, and the first information in the present disclosure is used to determine a time interval length corresponding to each of the X candidate measurement intervals; a time interval length between a start time of the target time window in the present disclosure and a reference time is equal to a target time interval length, the target time interval length is a time interval length corresponding to the target measurement interval among the X time interval lengths, and a position of the target time-frequency resource block in time-frequency domain is used to determine the reference time; the first-type signaling in the present disclosure carries a target characteristic identity, and a position of the target time-frequency resource block in time-frequency domain is used to determine the target characteristic identity; the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain; the first measurement is used to determine a target measurement value, the target measurement value belongs to the target measurement interval, and the target measurement value comprises at least one of a first distance, a first delay or a first tilt angle; the first communication node assumes that the first distance is equal to a distance between the first communication node and a second communication node in the present disclosure, the first communication node assumes that the first delay is equal to a propagation delay between the first communication node and the second communication node in the present disclosure, and the first communication node assumes that the first tilt angle is equal to a tilt angle between the first communication node and the second communication node in the present disclosure; the fourth information is used to determine the X candidate measurement intervals; the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set; a first-type signaling detected in the target time window is used to determine time-frequency resources occupied by the second signal; the second signal carries a target sequence index and a first TA, when the target sequence index corresponds to an index of the first sequence in the target sequence set, the first TA is used to determine a transmission timing of the first communication node.

In one embodiment, the second information and the first information in the present disclosure are two pieces of independent information.

In one embodiment, the second information and the first information in the present disclosure are through joint coding.

In one embodiment, the second information and the first information in the present disclosure are two pieces of sub-information in one piece of information.

In one embodiment, the second information and the first information in the present disclosure are carried via a same signaling.

In one embodiment, the second information and the first information in the present disclosure are carried via two different signalings.

In one embodiment, the second information is the first information in the present disclosure.

In one embodiment, the second information and the first information in the present disclosure are two different fields in a same signaling.

In one embodiment, the second information and the first information in the present disclosure are two different IEs in a same signaling.

In one embodiment, the second information and the first information in the present disclosure are carried through a PDSCH.

In one embodiment, the second information and the first information in the present disclosure are carried through two different PDSCHs.

In one embodiment, the second information is transmitted via a higher-layer signaling.

In one embodiment, the second information is transmitted via a physical-layer signaling.

In one embodiment, the second information comprises all or part of a higher-layer signaling.

In one embodiment, the second information comprises all or part of a physical-layer signaling.

In one embodiment, the second information comprises all or partial IEs in an RRC signaling.

In one embodiment, the second information comprises all or partial fields in an IE in an RRC signaling.

In one embodiment, the second information comprises all or partial fields in a MAC layer signaling.

In one embodiment, the second information comprises all or part of an SIB.

In one embodiment, the second information comprises all or part of a MAC CE.

In one embodiment, the second information comprises all or part of a MAC header.

In one embodiment, the second information is transmitted through a DL-SCH.

In one embodiment, the second information is transmitted through a PDSCH.

In one embodiment, the second information is broadcast.

In one embodiment, the second information is cell-specific.

In one embodiment, the second information is UE-specific.

In one embodiment, the second information is UE group-specific.

In one embodiment, the second signal is geographic region-specific.

In one embodiment, the second information comprises all or partial fields of a DCI signaling.

In one embodiment, the phrase of "the second information being used to determine a duration of the target time window in time domain" includes the following meaning: the second information is used by the first communication node in the present disclosure to determine a duration of the target time window in time domain.

In one embodiment, the phrase of "the second information being used to determine a duration of the target time window in time domain" includes the following meaning: the second information is used to directly indicate a duration of the target time window in time domain.

In one embodiment, the phrase of "the second information being used to determine a duration of the target time window in time domain" includes the following meaning: the second information is used to indirectly indicate a duration of the target time window in time domain.

In one embodiment, the phrase of "the second information being used to determine a duration of the target time window in time domain" includes the following meaning: the second information is used to explicitly indicate a duration of the target time window in time domain.

In one embodiment, the phrase of "the second information being used to determine a duration of the target time window in time domain" includes the following meaning: the second information is used to implicitly indicate a duration of the target time window in time domain.

In one embodiment, the phrase of "the second information being used to determine a duration of the target time window in time domain" includes the following meaning: X duration lengths respectively correspond to the X candidate measurement intervals, the second information is used to indicate a duration length corresponding to each of the X candidate measurement intervals, a duration length of the target time window in time domain is equal to one of the X duration lengths corresponding to the target measurement intervals.

In one embodiment, the phrase of "the second information being used to determine a duration of the target time window in time domain" includes the following meaning: the target time window is an RAR window, and the second information is used to indicate a length of an RAR window.

In one embodiment, the third information is transmitted via a higher-layer signaling.

In one embodiment, the third information is transmitted via a physical-layer signaling.

In one embodiment, the third information comprises all or part of a higher-layer signaling.

In one embodiment, the third information comprises all or part of a physical-layer signaling.

In one embodiment, the third information comprises all or partial IEs in an RRC signaling.

In one embodiment, the third information comprises all or partial fields in an Information Element (IE) in an RRC signaling.

In one embodiment, the third information comprises all or partial fields in a MAC layer signaling.

In one embodiment, the third information comprises all or part of an SIB.

In one embodiment, the third information comprises all or part of a MAC CE.

In one embodiment, the third information comprises all or part of a MAC header.

In one embodiment, the third information is transmitted through a DL-SCH.

In one embodiment, the third information is transmitted through a PDSCH.

In one embodiment, the third information is broadcast.

In one embodiment, the third information is cell-specific.

In one embodiment, the third information is UE-specific.

In one embodiment, the third information is UE group-specific.

In one embodiment, the third signal is geographic region-specific.

In one embodiment, the third information comprises all or partial fields of a DCI signaling.

In one embodiment, the above phrase of "the third information being used to determine a first time-domain resource set" includes the following meaning: the third information is used by the first communication node in the present disclosure to determine the first time-domain resource set.

In one embodiment, the above phrase of "the third information being used to determine a first time-domain resource set" includes the following meaning: the third information is used to directly indicate the first time-domain resource set.

In one embodiment, the above phrase of "the third information being used to determine a first time-domain resource set" includes the following meaning: the third information is used to indirectly indicate the first time-domain resource set.

In one embodiment, the above phrase of "the third information being used to determine a first time-domain resource set" includes the following meaning: the third information is used to explicitly indicate the first time-domain resource set.

In one embodiment, the above phrase of "the third information being used to determine a first time-domain resource set" includes the following meaning: the third information is used to implicitly indicate the first time-domain resource set.

Embodiment 5B

Figure 5B:
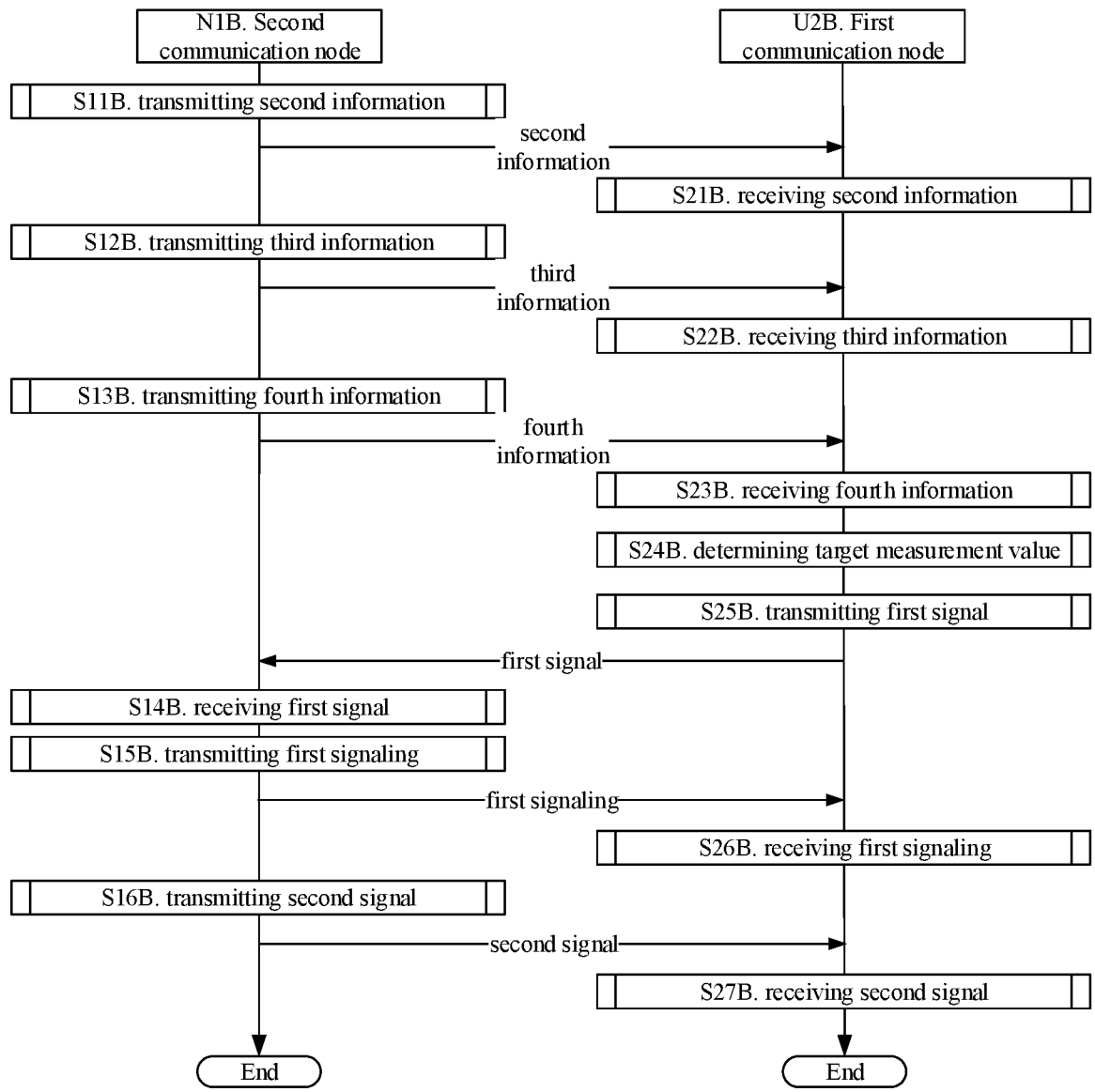
FIG. 5B illustrates a flowchart of signal transmission according to one embodiment of the present disclosure.

Embodiment 5B illustrates a flowchart of radio signal transmission according to one embodiment in the present disclosure, as shown in FIG. 5. In FIG. 5B, a second communication node NIB is a maintenance base station of a serving cell of a first communication node U2B. It is particularly underlined that the order illustrated in the embodiment does not put constraints over sequences of signal transmissions and implementations.

The second communication node NIB transmits second information in step S11B, transmits third information in step S12B, transmits fourth information in step S13B, receives a first signal in step S14B, transmits a first signaling in step S15B, and transmits a second signal in step S16B.

The first communication node U2B receives second information in step S21B, receives third information in step S22B, receives fourth information in step S23B, determines a target measurement value in step S24B, transmits a first signal in step S25B, receives a first signaling in step S26B, and receives a second signal in step S27B.

In embodiment 5B, the first signal in the present disclosure occupies a target time-frequency resource block in time-frequency domain; the first signaling in the present disclosure is used to determine time-frequency resources occupied by the second signal in the present disclosure; the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node; the second information is used to determine the W candidate sequences, and the first communication node randomly selects the first sequence out of the W candidate sequences; and the third information is used to determine that the second signal carries the first information; the target measurement value belongs to a target measurement interval, the target measurement interval is one of X candidate measurement intervals, and any two of the X candidate measurement intervals are different, X being a positive integer greater than 1; the fourth information is used to determine X candidate time-frequency resource pools, the X candidate time-frequency resource pools respectively correspond to the X candidate measurement intervals, the target time-frequency resource block belongs to a target time-frequency resource pool, and the target time-frequency resource pool is one of the X candidate time-frequency resource pool corresponding to the target measurement interval.

In one embodiment, the second information and the third information are two pieces of independent information.

In one embodiment, the second information and the third information are through joint coding.

In one embodiment, the second information and the third information are two pieces of sub-information in one piece of information.

In one embodiment, the second information and the third information are carried by a same signaling.

In one embodiment, the second information and the third information are carried by two different signalings.

In one embodiment, the second information is the third information.

In one embodiment, the second information and the third information are two different fields in a same signaling.

In one embodiment, the second information and the third information are two different IEs in a same signaling.

In one embodiment, the second information and the third information are carried through a PDSCH.

In one embodiment, the second information and the third information are carried through two different PDSCHs.

In one embodiment, the second information is transmitted via a higher-layer signaling.

In one embodiment, the second information is transmitted via a physical-layer signaling.

In one embodiment, the second information comprises all or part of a higher-layer signaling.

In one embodiment, the second information comprises all or part of a physical-layer signaling.

In one embodiment, the second information comprises all or partial IEs in an RRC signaling.

In one embodiment, the second information comprises all or partial fields in an IE in an RRC signaling.

In one embodiment, the second information comprises all or partial fields in a MAC layer signaling.

In one embodiment, the second information comprises all or part of an SIB.

In one embodiment, the second information comprises all or part of a MAC CE.

In one embodiment, the second information comprises all or part of a MAC header.

In one embodiment, the second information is transmitted through a DL-SCH.

In one embodiment, the second information is transmitted through a PDSCH.

In one embodiment, the second information is broadcast.

In one embodiment, the second information is cell-specific.

In one embodiment, the second information is UE-specific.

In one embodiment, the second information is UE group-specific.

In one embodiment, the second signal is geographic region-specific.

In one embodiment, the second information comprises all or partial fields of a DCI signaling.

In one embodiment, the third information is transmitted via a higher-layer signaling.

In one embodiment, the third information is transmitted via a physical-layer signaling.

In one embodiment, the third information comprises all or part of a higher-layer signaling.

In one embodiment, the third information comprises all or part of a physical-layer signaling.

In one embodiment, the third information comprises all or partial IEs in an RRC signaling.

In one embodiment, the third information comprises all or partial fields in an IE in an RRC signaling.

In one embodiment, the third information comprises all or partial fields in a MAC layer signaling.

In one embodiment, the third information comprises all or part of an SIB.

In one embodiment, the third information comprises all or part of a MAC CE.

In one embodiment, the third information comprises all or part of a MAC Header.

In one embodiment, the third information is transmitted through a DL-SCH.

In one embodiment, the third information is transmitted through a PDSCH.

In one embodiment, the third information is broadcast.

In one embodiment, the third information is cell-specific.

In one embodiment, the third information is UE-specific.

In one embodiment, the third information is UE group-specific.

In one embodiment, the third signal is geographic region-specific.

In one embodiment, the third information comprises all or partial fields of a DCI signaling.

In one embodiment, the phrase of "the second information being used to determine the W candidate sequences" includes the following meaning: the second information is used by the first communication node in the present disclosure to determine the W candidate sequences.

In one embodiment, the phrase of "the second information being used to determine the W candidate sequences" includes the following meaning: the second information is used to directly indicate the W candidate sequences.

In one embodiment, the phrase of "the second information being used to determine the W candidate sequences" includes the following meaning: the second information is used to indirectly indicate the W candidate sequences.

In one embodiment, the phrase of "the second information being used to determine the W candidate sequences" includes the following meaning: the second information is used to explicitly indicate the W candidate sequences.

In one embodiment, the phrase of "the second information being used to determine the W candidate sequences" includes the following meaning: the second information is used to implicitly indicate the W candidate sequences.

In one embodiment, the phrase of "the second information being used to determine the W candidate sequences" includes the following meaning: the second information indicates an index of a start sequence in the W candidate sequences.

In one embodiment, the phrase of "the first communication node randomly selects the first sequence out of the W candidate sequences" includes the following meaning: the first communication node randomly selects the first sequence out of the W candidate sequences with an intermediate probability.

In one embodiment, the phrase of "the first communication node randomly selects the first sequence out of the W candidate sequences" includes the following meaning: the first communication node randomly selects the first sequence out of the W candidate sequences according to a probability distribution.

Embodiment 6A

Figure 6A:
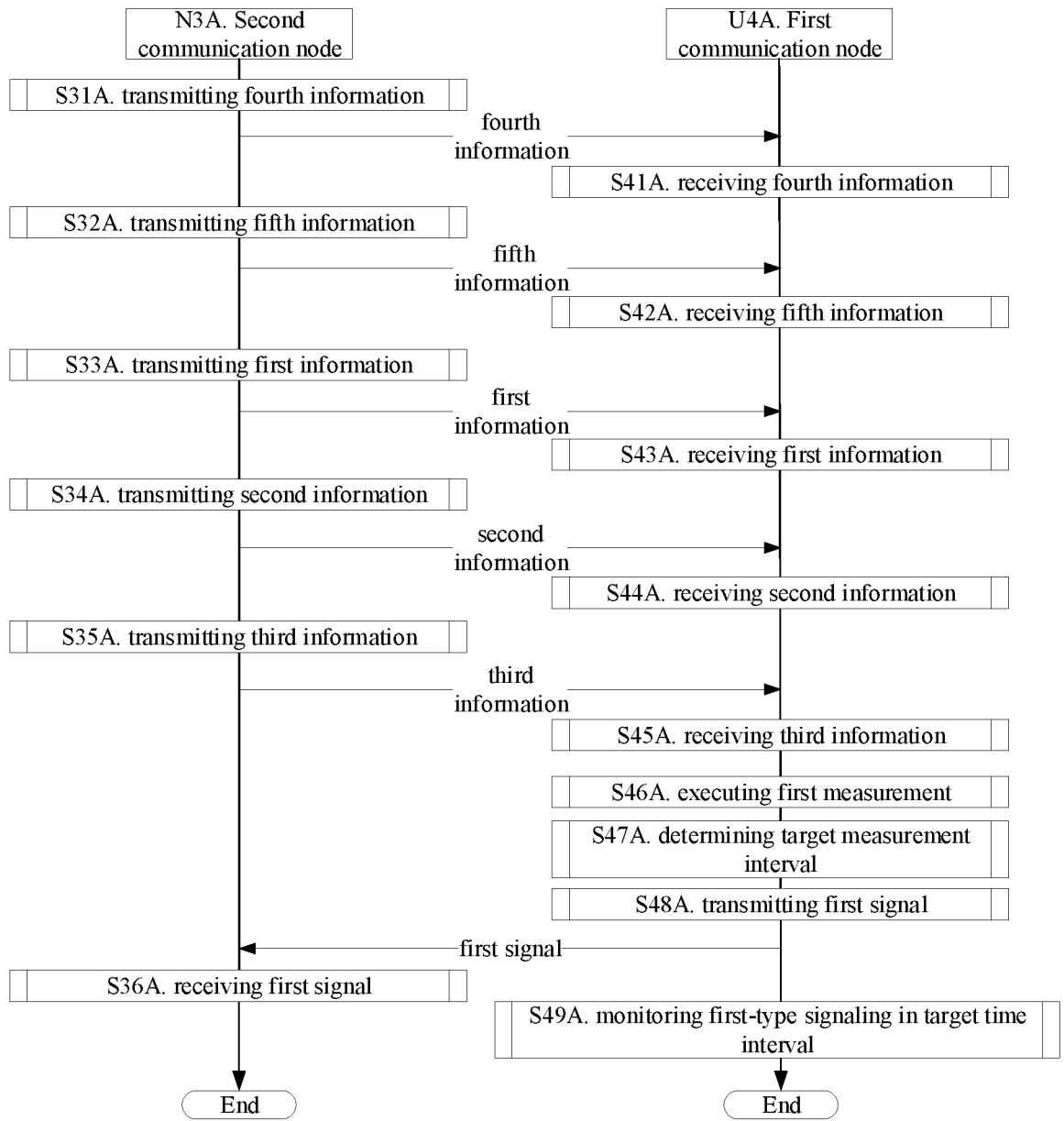
FIG. 6A illustrates a flowchart of signal transmission according to another embodiment of the present disclosure.

Embodiment 6A illustrates a flowchart of signal transmission according to another embodiment of the present disclosure, as shown in FIG. 6A. In FIG. 6A, a second communication node N3A is a maintenance base station of a serving cell of a first communication node U4A. It is particularly underlined that the order illustrated in the embodiment does not put constraints over sequences of signal transmissions and implementations.

The second communication node N3A transmits fourth information in step S31A, transmits fifth information in step S32A, transmits first information in step S33A, transmits second information in step S34A, transmits third information in step S35A, and receives a first signal in step S36A.

The first communication node U4A receives fourth information in step S41A, receives fifth information in step S42A, receives first information in step S43A, receives second information in step S44A, receives third information in step S45A, executes a first measurement in step S46A, determines a target measurement interval in step S47A, transmits a first signal in step S48A, and monitors a first-type signaling in a target time window in step S49A.

In embodiment 6A, the target measurement interval in the present disclosure is one of X candidate measurement intervals; a first sequence is used to generate the first signal in the present disclosure, and the first signal occupies a target time-frequency resource block in time-frequency domain; and any two of the X candidate measurement intervals are different, X being a positive integer greater than 1; the X candidate measurement intervals respectively correspond to X time interval lengths, and the first information in the present disclosure is used to determine a time interval length corresponding to each candidate measurement interval in the X candidate measurement intervals; a time interval length between a start time of the target time window in the present disclosure and a reference time is equal to a target time interval length, the target time interval length is a time interval length corresponding to the target measurement interval among the X time interval lengths, and a position of the target time-frequency resource block in time-frequency domain is used to determine the reference time; the first-type signaling in the present disclosure carries a target characteristic identity, and a position of the target time-frequency resource block in time-frequency domain is used to determine the target characteristic identity; the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain; the first measurement is used to determine a target measurement value, the target measurement value belongs to the target measurement interval, and the target measurement value comprises at least one of a first distance, a first delay or a first tilt angle; the first communication node assumes that the first distance is equal to a distance between the first communication node and a second communication node in the present disclosure, the first communication node assumes that the first delay is equal to a propagation delay between the first communication node and the second communication node in the present disclosure, and the first communication node assumes that the first tilt angle is equal to a tilt angle between the first communication node and the second communication node in the present disclosure; the fourth information is used to determine the X candidate measurement intervals; the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set.

In one embodiment, the fourth information is transmitted via a higher-layer signaling.

In one embodiment, the fourth information is transmitted via a physical-layer signaling.

In one embodiment, the fourth information comprises all or part of a higher-layer signaling.

In one embodiment, the fourth information comprises all or part of a physical-layer signaling.

In one embodiment, the fourth information comprises all or partial IEs in an RRC signaling.

In one embodiment, the fourth information comprises all or partial fields in an IE in an RRC signaling.

In one embodiment, the fourth information comprises all or partial fields in a MAC layer signaling.

In one embodiment, the fourth information comprises all or part of an SIB.

In one embodiment, the fourth information comprises all or part of a MAC CE.

In one embodiment, the fourth information comprises all or part of a MAC header.

In one embodiment, the fourth information is transmitted through a DL-SCH.

In one embodiment, the fourth information is transmitted through a PDSCH.

In one embodiment, the fourth information is broadcast.

In one embodiment, the fourth information is cell-specific.

In one embodiment, the fourth information is UE-specific.

In one embodiment, the fourth information is UE group-specific.

In one embodiment, the fourth signal is geographic region-specific.

In one embodiment, the fourth information is beam spot-specific.

In one embodiment, the fourth information comprises all or partial fields of a DCI signaling.

In one embodiment, the phrase of "the fourth information being used to determine the X candidate measurement intervals" includes the following meaning: the fourth information is used by the first communication node in the present disclosure to determine the X candidate measurement intervals.

In one embodiment, the phrase of "the fourth information being used to determine the X candidate measurement intervals" includes the following meaning: the fourth information is used to directly indicate the X candidate measurement intervals.

In one embodiment, the phrase of "the fourth information being used to determine the X candidate measurement intervals" includes the following meaning: the fourth information is used to indirectly indicate the X candidate measurement intervals.

In one embodiment, the phrase of "the fourth information being used to determine the X candidate measurement intervals" includes the following meaning: the fourth information is used to explicitly indicate the X candidate measurement intervals.

In one embodiment, the phrase of "the fourth information being used to determine the X candidate measurement intervals" includes the following meaning: the fourth information is used to implicitly indicate the X candidate measurement intervals.

In one embodiment, the phrase of "the fourth information being used to determine the X candidate measurement intervals" includes the following meaning: the fourth information is used to determine Y measurement threshold(s), the Y measurement threshold(s) is(are) used to determine the X candidate measurement intervals, Y is equal to X minus 1.

In one embodiment, the phrase of "the fourth information being used to determine the X candidate measurement intervals" includes the following meaning: the fourth information is used to determine Y measurement threshold(s), Y is equal to X minus 1, and the Y measurement threshold(s) is(are respectively) Y boundary value(s) of the X candidate measurement intervals.

In one embodiment, the phrase of "the fourth information being used to determine the X candidate measurement intervals" includes the following meaning: the fourth information is used to determine Y measurement thresholds, Y is equal to X minus 1, and Y is greater than 1; the Y measurement thresholds are arranged according to magnitude in a descending order, an interval between a lower limit that can be measured by the first measurement in the present disclosure and a minimum measurement threshold in the Y measurement thresholds is one of the X candidate measurement intervals, an interval between any two adjacent measurement thresholds of the Y measurement thresholds is one of the X candidate measurement intervals, and an interval between a maximum measurement threshold in the Y measurement thresholds and an upper limit that can be measured by the first measurement in the present disclosure is one of the X candidate measurement intervals.

In one embodiment, the phrase of "the fourth information being used to determine the X candidate measurement intervals" includes the following meaning: the fourth information is used to determine Y measurement thresholds, Y is equal to X minus 1, and Y is equal to 1; an interval between a lower limit that can be measured by the first measurement in the present disclosure and one of the Y measurement thresholds is one of the X candidate measurement intervals, and an interval between one of the Y measurement thresholds and an upper limit that can be measured by the first measurement in the present disclosure is one of the X candidate measurement intervals.

In one embodiment, the fifth information is transmitted via a higher-layer signaling.

In one embodiment, the fifth information is transmitted via a physical-layer signaling.

In one embodiment, the fifth information comprises all or part of a higher-layer signaling.

In one embodiment, the fifth information comprises all or part of a physical-layer signaling.

In one embodiment, the fifth information comprises all or partial IEs in an RRC signaling.

In one embodiment, the fifth information comprises all or partial fields in an IE in an RRC signaling.

In one embodiment, the fifth information comprises all or partial fields in a MAC layer signaling.

In one embodiment, the fifth information comprises all or part of an SIB.

In one embodiment, the fifth information comprises all or part of a MAC CE.

In one embodiment, the fifth information comprises all or part of a MAC header.

In one embodiment, the fifth information is transmitted through a DL-SCH.

In one embodiment, the fifth information is transmitted through a PDSCH.

In one embodiment, the fifth information is broadcast.

In one embodiment, the fifth information is cell-specific.

In one embodiment, the fifth information is UE-specific.

In one embodiment, the fifth information is UE group-specific.

In one embodiment, the fifth signal is geographic region-specific.

In one embodiment, the fifth information is beam spot-specific.

In one embodiment, the fifth information comprises all or partial fields of a DCI signaling.

In one embodiment, the above phrase of "the fifth information being used to determine at least one of the target time-frequency resource pool or the target sequence set" includes the following meaning: the fifth information is used by the first communication node in the present disclosure to determine at least one of the target time-frequency resource pool or the target sequence set.

In one embodiment, the above phrase of "the fifth information being used to determine at least one of the target time-frequency resource pool or the target sequence set" includes the following meaning: the fifth information is used to directly indicate at least one of the target time-frequency resource pool or the target sequence set.

In one embodiment, the above phrase of "the fifth information being used to determine at least one of the target time-frequency resource pool or the target sequence set" includes the following meaning: the fifth information is used to indirectly indicate at least one of the target time-frequency resource pool or the target sequence set.

In one embodiment, the above phrase of "the fifth information being used to determine at least one of the target time-frequency resource pool or the target sequence set" includes the following meaning: the fifth information is used to explicitly indicate at least one of the target time-frequency resource pool or the target sequence set.

In one embodiment, the above phrase of "the fifth information being used to determine at least one of the target time-frequency resource pool or the target sequence set" includes the following meaning: the fifth information is used to implicitly indicate at least one of the target time-frequency resource pool or the target sequence set.

In one embodiment, the above phrase of "the fifth information being used to determine at least one of the target time-frequency resource pool or the target sequence set" includes the following meaning: the fifth information is used to determine the target time-frequency resource pool and the target sequence set.

In one embodiment, the above phrase of "the fifth information being used to determine at least one of the target time-frequency resource pool or the target sequence set" includes the following meaning: the fifth information is used to determine the target time-frequency resource pool.

In one embodiment, the above phrase of "the fifth information being used to determine at least one of the target time-frequency resource pool or the target sequence set" includes the following meaning: the fifth information is used to determine the target sequence set.

In one embodiment, the above phrase of "the fifth information being used to determine at least one of the target time-frequency resource pool or the target sequence set" includes the following meaning: X candidate time-frequency resource pools respectively correspond to the X candidate measurement intervals, the fifth information is used to determine a candidate time-frequency resource pool corresponding to each of the X candidate measurement intervals, and the target time-frequency resource pool is one of the X candidate time-frequency resource pools corresponding to the target measurement interval.

In one embodiment, the above phrase of "the fifth information being used to determine at least one of the target time-frequency resource pool or the target sequence set" includes the following meaning: X candidate sequence sets respectively correspond to the X candidate measurement intervals, the fifth information is used to determine a candidate sequence set corresponding to each of the X candidate measurement intervals, and the target sequence set is one of the X candidate sequence set corresponding to the target measurement interval.

In one embodiment, the above phrase of "the fifth information being used to determine at least one of the target time-frequency resource pool or the target sequence set" includes the following meaning: X candidate time-frequency resource pools respectively correspond to the X candidate measurement intervals, and X candidate sequence sets respectively correspond to the X candidate measurement intervals; the fifth information is used to determine a candidate time-frequency resource pool corresponding to each of the X candidate measurement intervals, and the fifth information is used to determine a candidate sequence set corresponding to each of the X candidate measurement intervals; the target time-frequency resource pool is one of the X candidate time-frequency resource pools corresponding to the target measurement intervals, and the target sequence set is one of the X candidate sequence sets corresponding to the target measurement intervals.

Embodiment 6B

Figure 6B:
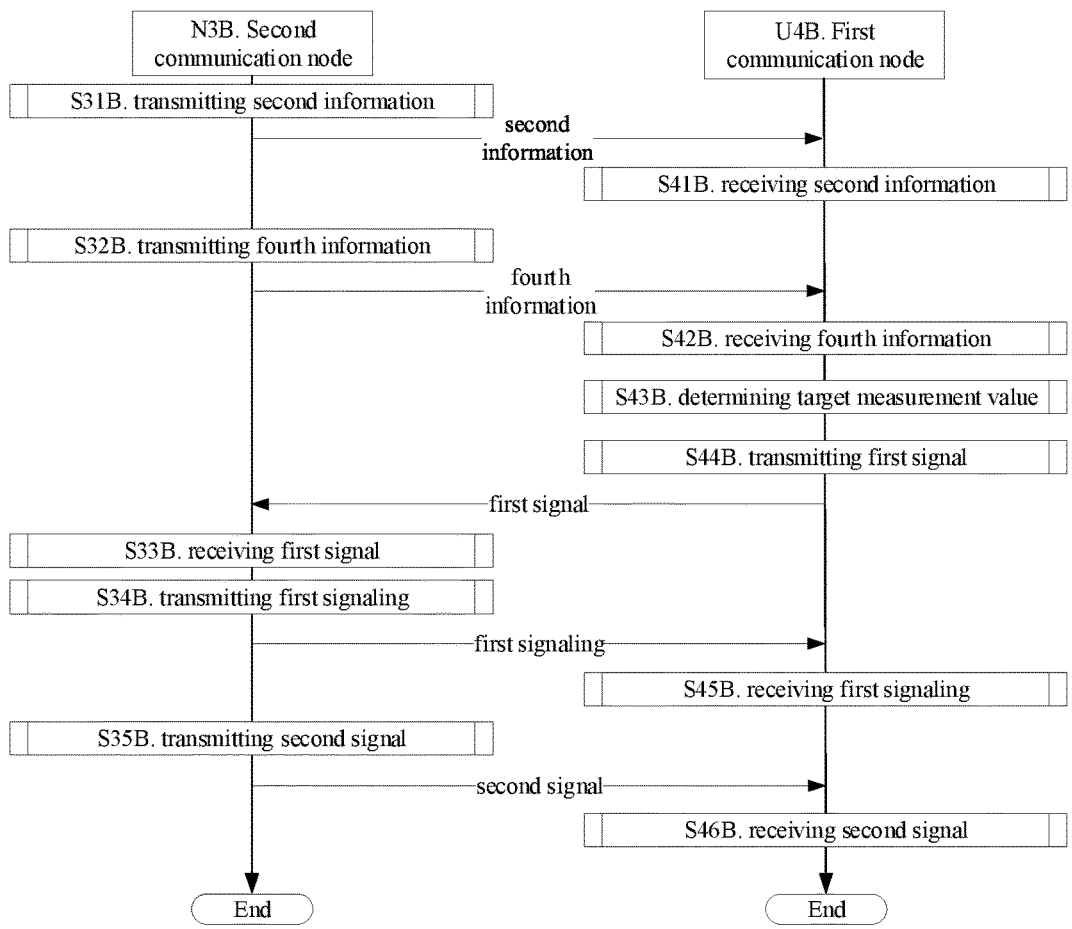
FIG. 6B illustrates a flowchart of signal transmission according to another embodiment of the present disclosure.

Embodiment 6B illustrates a flowchart of signal transmission according to another embodiment of the present disclosure, as shown in FIG. 6B. In FIG. 6B, a second communication node N3B is a maintenance base station of a serving cell of a first communication node U4B. It is particularly underlined that the order illustrated in the embodiment does not put constraints over sequences of signal transmissions and implementations.

The second communication node N3B transmits second information in step S31B, transmits fourth information in step S32B, receives a first signal in step S33B, transmits a first signaling in step S34B, and transmits a second signal in step S35B.

The first communication node U4B receives second information in step S41B, receives fourth information in step S42B, determines a target measurement value in step S43B, transmits a first signal in step S44B, receives a first signaling in step S45B, and receives a second signal in step S46B.

In embodiment 6B, the first signal in the present disclosure occupies a target time-frequency resource block in time-frequency domain; the first signaling in the present disclosure is used to determine time-frequency resources occupied by the second signal in the present disclosure; the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node; the second information is used to determine the W candidate sequences, and the first communication node randomly selects the first sequence out of the W candidate sequences; the target measurement value belongs to a target measurement interval, the target measurement interval is one of X candidate measurement intervals, and any two of the X candidate measurement intervals are different, X being a positive integer greater than 1; the fourth information is used to determine X candidate time-frequency resource pools, the X candidate time-frequency resource pools respectively correspond to the X candidate measurement intervals, the target time-frequency resource block belongs to a target time-frequency resource pool, and the target time-frequency resource pool is one of the X candidate time-frequency resource pool corresponding to the target measurement interval.

In one embodiment, the fourth information is transmitted via a higher-layer signaling.

In one embodiment, the fourth information is transmitted via a physical-layer signaling.

In one embodiment, the fourth information comprises all or part of a higher-layer signaling.

In one embodiment, the fourth information comprises all or part of a physical-layer signaling.

In one embodiment, the fourth information comprises all or partial IEs in an RRC signaling.

In one embodiment, the fourth information comprises all or partial fields in an IE in an RRC signaling.

In one embodiment, the fourth information comprises all or partial fields in a MAC layer signaling.

In one embodiment, the fourth information comprises all or part of an SIB.

In one embodiment, the fourth information comprises all or part of a MAC CE.

In one embodiment, the fourth information comprises all or part of a MAC Header.

In one embodiment, the fourth information is transmitted through a DL-SCH.

In one embodiment, the fourth information is transmitted through a PDSCH.

In one embodiment, the fourth information is broadcast.

In one embodiment, the fourth information is cell-specific.

In one embodiment, the fourth information is UE-specific.

In one embodiment, the fourth information is UE group-specific.

In one embodiment, the fourth signal is geographic region-specific.

In one embodiment, the fourth information comprises all or partial fields of a DCI signaling.

In one embodiment, the above phrase of "the fourth information being used to determine X candidate time-frequency resource pools" includes the following meaning: the fourth information is used by the first communication node in the present disclosure to determine the X candidate time-frequency resource pools.

In one embodiment, the above phrase of "the fourth information being used to determine X candidate time-frequency resource pools" includes the following meaning: the fourth information is used to directly indicate the X candidate time-frequency resource pools.

In one embodiment, the above phrase of "the fourth information being used to determine X candidate time-frequency resource pools" includes the following meaning: the fourth information is used to indirectly indicate the X candidate time-frequency resource pools.

In one embodiment, the above phrase of "the fourth information being used to determine X candidate time-frequency resource pools" includes the following meaning: the fourth information is used to explicitly indicate the X candidate time-frequency resource pools.

In one embodiment, the above phrase of "the fourth information being used to determine X candidate time-frequency resource pools" includes the following meaning: the fourth information is used to implicitly indicate the X candidate time-frequency resource pools.

In one embodiment, the fourth information indicates a corresponding candidate time-frequency resource pool in the X candidate time-frequency resource pools for each of the X candidate measurement intervals.

Embodiment 7

Figure 7:
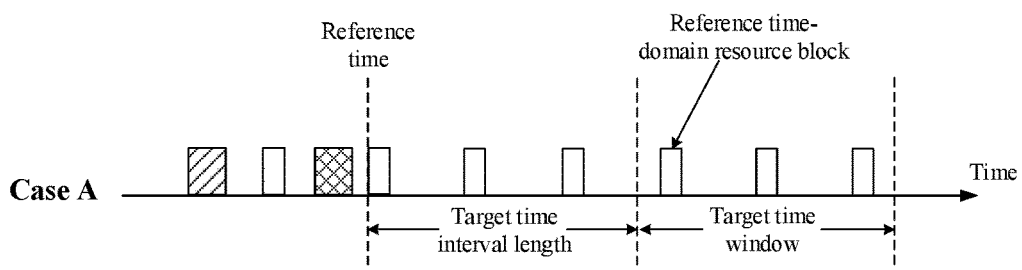
FIG. 7 illustrates a schematic diagram of a reference time according to one embodiment of the present disclosure.
Figure 7:
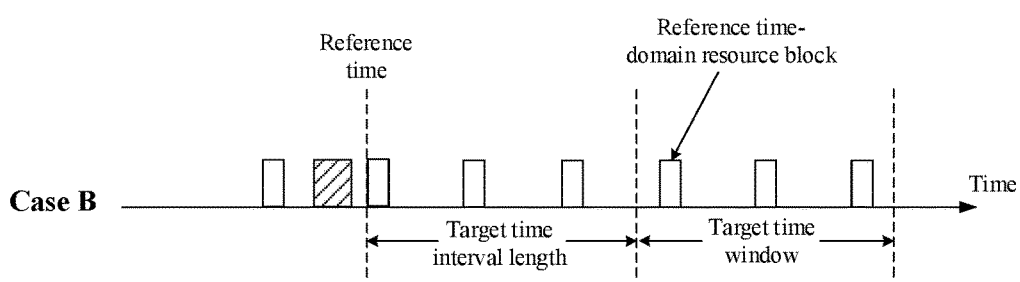

Embodiment 7 illustrates a schematic diagram of a reference time according to one embodiment of the present disclosure, as shown in FIG. 7. In FIG. 7, the horizontal axis represents time, the slash-filled rectangle represents time-domain resources occupied by a target time-frequency resource block, each unfilled rectangle represents a time-domain resource block in a first time-domain resource set, and the cross-line filled rectangle represents time-domain resources occupied by a characteristic time-frequency resource block; in case A, a target time-frequency resource block and a characteristic time-frequency resource block occupy different resources in time domain; and in case B, a target time-frequency resource block is the same as a characteristic time-frequency resource block.

In embodiment 7, the second information in the present disclosure is used to determine a duration length of the target time window in the present disclosure in time domain; the third information in the present disclosure is used to determine a first time-domain resource set, and the first time-domain resource set comprises more than one time-domain resource blocks; the reference time in the present disclosure is a start time of a reference time-domain resource block, and the reference time-domain resource block is a time-domain resource block in the first time-domain resource set; at least one of a position of the target time-frequency resource block in the present disclosure in time-frequency domain or the first sequence in the present disclosure is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

In one embodiment, each time-frequency resource block in the first time-domain resource set comprises at least one OFDM symbol.

In one embodiment, each time-frequency resource block in the first time-domain resource set comprises at least one consecutive OFDM symbol in time domain.

In one embodiment, each time-domain resource block in the first time-domain resource set is a PDCCH occasion.

In one embodiment, each time-domain resource block in the first time-domain resource set is a PDCCH occasion in Type 1 PDCCH CSS set.

In one embodiment, each time-domain resource block in the first time-domain resource set is a PDCCH occasion identified by an RA-RNTI.

In one embodiment, each time-domain resource block in the first time-domain resource set is a PDCCH occasion identified by a MsgB-RNTI.

In one embodiment, each time-domain resource block in the first time-domain resource set is a PDCCH occasion used to schedule an RAR.

In one embodiment, each time-domain resource block in the first time-domain resource set is a PDCCH occasion used to schedule a MsgB.

In one embodiment, there exist numbers of OFDM symbols comprised in two time-domain resource blocks in the first time-domain resource set being unequal.

In one embodiment, numbers of OFDM symbols comprised in any two time-domain resource blocks in the first time-domain resource set are equal.

In one embodiment, the target time window comprises at least one PDCCH occasion used to schedule an RAR.

In one embodiment, the target time window comprises at least one PDCCH occasion used to schedule a MsgB.

In one embodiment, the reference time is later than an end time of the characteristic time-frequency resource block in time domain.

In one embodiment, the reference time is equal to an end time of the characteristic time-frequency resource block in time domain.

In one embodiment, the above phrase of "there does not exist a start time of a time-domain resource block other than the reference time-domain resource block in the first time-domain resource set being located between the reference time and an end time of the characteristic time-frequency resource block in time domain" includes the following meaning: the reference time-domain resource block is an earliest time-domain resource block in the first time-domain resource set whose start time is not earlier than an end time of the characteristic time-frequency resource block in time domain.

In one embodiment, the above phrase of "there does not exist a start time of a time-domain resource block other than the reference time-domain resource block in the first time-domain resource set being located between the reference time and an end time of the characteristic time-frequency resource block in time domain" includes the following meaning: there does not exist a start time of a time-domain resource block other than the reference time-domain resource block in the first time-domain resource set being earlier than the reference time and not earlier than an end time of the characteristic time-frequency resource block in time domain.

In one embodiment, the characteristic time-frequency resource block is the same as the target time-frequency resource block.

In one embodiment, the characteristic time-frequency resource block is different from the target time-frequency resource block.

In one embodiment, when the first sequence is used for 4-step random access, the characteristic time-frequency resource block is the same as the target time-frequency resource block.

In one embodiment, when the first sequence is used for 2-step random access, a start time of the characteristic time-frequency resource block in time domain is not earlier than an end time of the target time-frequency resource block in time domain.

In one embodiment, the characteristic time-frequency resource block is time-frequency resources occupied by a data channel in MsgA in 2-step random access.

In one embodiment, the characteristic time-frequency resource block is time-frequency resources occupied by a Physical Uplink Shared Channel (PUSCH) in MsgA in 2-step random access.

In one embodiment, the characteristic time-frequency resource block is time-frequency resources occupied by an Uplink Shared Channel in MsgA in 2-step random access.

In one embodiment, the characteristic time-frequency resource block is time-frequency resources occupied by a PRACH in 4-step random access.

In one embodiment, the above phrase of "at least one of a position of the target time-frequency resource block in time-frequency domain or the first sequence is used to determine the characteristic time-frequency resource block" includes the following meaning: at least one of an index of a slot occupied by the target time-frequency resource block in time domain, an index of a PRB occupied by the target time-frequency resource block in frequency domain or an index of the first sequence is used to determine the characteristic time-frequency resource block.

In one embodiment, a position of the target time-frequency resource block in time-frequency domain comprises an index of a slot occupied by the target time-frequency resource block in time domain.

In one embodiment, a position of the target time-frequency resource block in time-frequency domain comprises an index of a PRB occupied by the target time-frequency resource block in frequency domain.

In one embodiment, the above phrase of "at least one of a position of the target time-frequency resource block in time-frequency domain or the first sequence is used to determine the characteristic time-frequency resource block" includes the following meaning: a position of the target time-frequency resource block in time-frequency domain and the first sequence are both used to determine the characteristic time-frequency resource block.

In one embodiment, the above phrase of "at least one of a position of the target time-frequency resource block in time-frequency domain or the first sequence is used to determine the characteristic time-frequency resource block" includes the following meaning: a position of the target time-frequency resource block in time-frequency domain is used to determine the characteristic time-frequency resource block.

In one embodiment, the above phrase of "at least one of a position of the target time-frequency resource block in time-frequency domain or the first sequence is used to determine the characteristic time-frequency resource block" includes the following meaning: the first sequence is used to determine the characteristic time-frequency resource block.

In one embodiment, the above phrase of "at least one of a position of the target time-frequency resource block in time-frequency domain or the first sequence is used to determine the characteristic time-frequency resource block" includes the following meaning: the characteristic time-frequency resource block is the same as the target time-frequency resource block.

In one embodiment, the above phrase of "at least one of a position of the target time-frequency resource block in time-frequency domain or the first sequence is used to determine the characteristic time-frequency resource block" includes the following meaning: at least one of a position of the target time-frequency resource block in time-frequency domain or the first sequence is used to determine a position of the characteristic time-frequency resource block in time-frequency domain.

In one embodiment, the above phrase of "at least one of a position of the target time-frequency resource block in time-frequency domain or the first sequence is used to determine the characteristic time-frequency resource block" includes the following meaning: at least one of a position of the target time-frequency resource block in time-frequency domain or the first sequence is used to determine a number of REs comprised in the characteristic time-frequency resource block.

In one embodiment, the above phrase of "at least one of a position of the target time-frequency resource block in time-frequency domain or the first sequence is used to determine the characteristic time-frequency resource block" includes the following meaning: at least one of a position of the target time-frequency resource block in time-frequency domain or the first sequence is used to determine a number of REs comprised in the characteristic time-frequency resource block and a position of the characteristic time-frequency resource block in time-frequency domain.

In one embodiment, the above phrase of "at least one of a position of the target time-frequency resource block in time-frequency domain or the first sequence is used to determine the characteristic time-frequency resource block" includes the following meaning: at least one of a position of the target time-frequency resource block in time-frequency domain or the first sequence is used by the first communication node in the present disclosure to determine the characteristic time-frequency resource block.

In one embodiment, the above phrase of "at least one of a position of the target time-frequency resource block in time-frequency domain or the first sequence is used to determine the characteristic time-frequency resource block" includes the following meaning: at least one of a position of the target time-frequency resource block in time-frequency domain or the first sequence is used to determine the characteristic time-frequency resource block according to a mapping relation.

In one embodiment, the above phrase of "at least one of a position of the target time-frequency resource block in time-frequency domain or the first sequence is used to determine the characteristic time-frequency resource block" includes the following meaning: at least one of a position of the target time-frequency resource block in time-frequency domain or the first sequence is used to determine the characteristic time-frequency resource block according to a mapping criteria.

Embodiment 8A

Figure 8A:
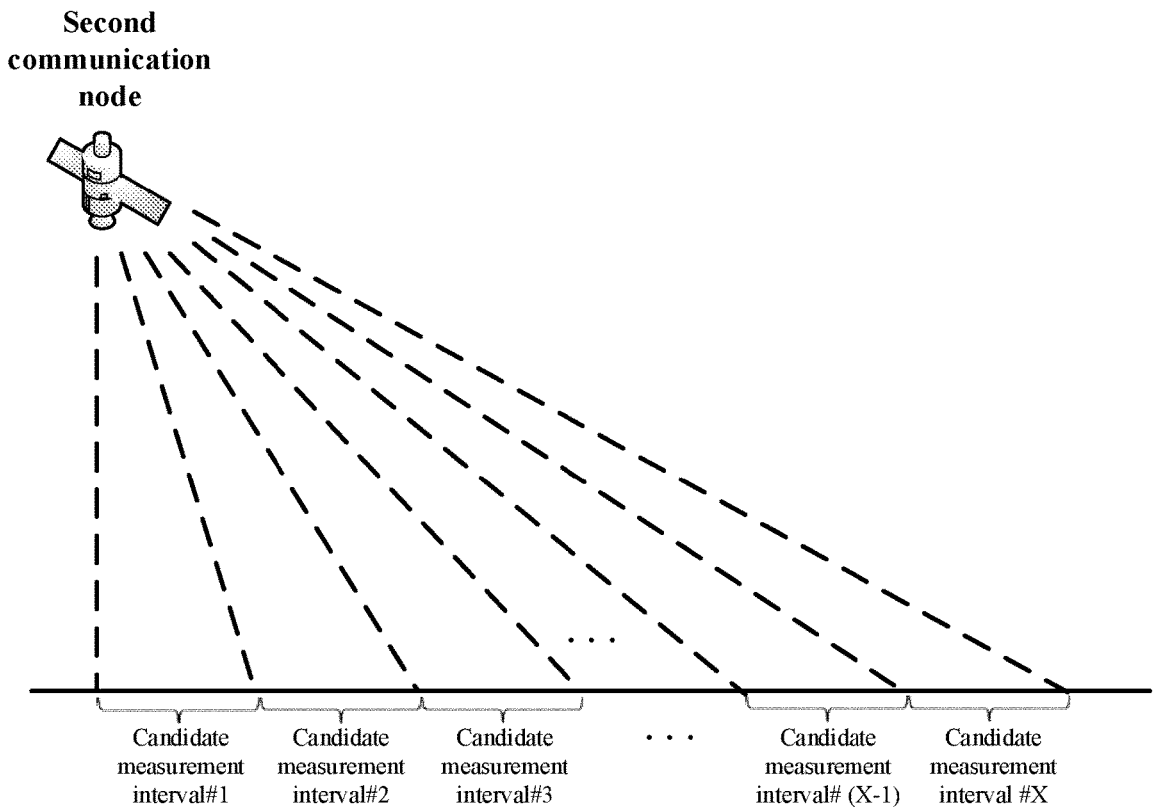
FIG. 8A illustrates a schematic diagram of X candidate measurement intervals according to one embodiment of the present disclosure.

Embodiment 8A illustrates a schematic diagram of X candidate measurement intervals according to one embodiment of the present disclosure, as shown in FIG. 8A.

In embodiment 8A, the first measurement in the present disclosure is used to determine a target measurement value, the target measurement value belongs to a target measurement interval, and the target measurement value comprises at least one of a first distance, a first delay or a first tilt angle; the first communication node assumes that the first distance is equal to a distance between the first communication node and a second communication node in the present disclosure, the first communication node assumes that the first delay is equal to a propagation delay between the first communication node and the second communication node in the present disclosure, and the first communication node assumes that the first tilt angle is equal to a tilt angle between the first communication node and the second communication node in the present disclosure; the target measurement interval is one of X candidate measurement intervals; any two of the X candidate measurement intervals are different, X being a positive integer greater than 1.

In one embodiment, the first measurement is a measurement performed on the target measurement value.

In one embodiment, the first measurement is realized by measuring a reference signal.

In one embodiment, the first measurement is realized by a measurement other than a measurement performed on a reference signal.

In one embodiment, the first measurement comprises a measurement performed on a Reference Signal Received Power (RSRP).

In one embodiment, the first measurement comprises a measurement performed on a Reference Signal Received Quality (RSRQ).

In one embodiment, the first measurement comprises a measurement performed on a reference signal-signal to noise and interference ratio (RS-SINR).

In one embodiment, the first measurement comprises a measurement performed on a Received Signal Strength indicator (RSSI).

In one embodiment, the first measurement comprises a measurement performed by the first communication node in the present disclosure on its own geographical position.

In one embodiment, the first measurement comprises a measurement performed by the first communication node in the present disclosure on its own coordinate position.

In one embodiment, the first measurement comprises a measurement performed on a propagation delay between the first communication node in the present disclosure and the second communication node.

In one embodiment, the first measurement comprises a measurement performed on a tilt angle between the first communication node in the present disclosure and the second communication node.

In one embodiment, the first measurement comprises a measurement performed by the first communication node in the present disclosure on position of the second communication node.

In one embodiment, the first measurement comprises a measurement performed by the first communication node in the present disclosure on track of the second communication node.

In one embodiment, the first measurement comprises a measurement performed by the first communication node in the present disclosure on ephemeris of the second communication node.

In one embodiment, the first measurement comprises a measurement performed by the first communication node in the present disclosure on altitude of the second communication node.

In one embodiment, the first measurement comprises a measurement performed on Angle of Departure (AoD) when the first communication node in the present disclosure transmits a signal to a second communication node in the present disclosure.

In one embodiment, the first measurement comprises a measurement performed on an Angle of Arrival (AoA) when the first communication node in the present disclosure receives a signal transmitted by a second communication node in the present disclosure.

In one embodiment, the above phrase of "the target measurement value comprises at least one of a first distance, a first delay or a first tilt angle" includes the following meaning: the target measurement value comprises the first distance, the first delay or the first tilt angle.

In one embodiment, the above phrase of "the target measurement value comprises at least one of a first distance, a first delay or a first tilt angle" includes the following meaning: the target measurement value comprises the first distance and the first delay.

In one embodiment, the above phrase of "the target measurement value comprises at least one of a first distance, a first delay or a first tilt angle" includes the following meaning: the target measurement value comprises the first distance and the first tilt angle.

In one embodiment, the above phrase of "the target measurement value comprises at least one of a first distance, a first delay or a first tilt angle" includes the following meaning: the target measurement value comprises the first delay and the first tilt angle.

In one embodiment, the above phrase of "the target measurement value comprises at least one of a first distance, a first delay or a first tilt angle" includes the following meaning: the target measurement value comprises the first distance.

In one embodiment, the above phrase of "the target measurement value comprises at least one of a first distance, a first delay or a first tilt angle" includes the following meaning: the target measurement value comprises the first delay.

In one embodiment, the above phrase of "the target measurement value comprises at least one of a first distance, a first delay or a first tilt angle" includes the following meaning: the target measurement value comprises the first tilt angle.

In one embodiment, the first distance is equal to an actual distance between the first communication node and the second communication node in the present disclosure.

In one embodiment, the first distance is equal to a distance measured by the first communication node between the first communication node and the second communication node in the present disclosure.

In one embodiment, the first distance is equal to a measurement value of a distance between the first communication node and the second communication node.

In one embodiment, the first delay is equal to an actual propagation delay between the first communication node and the second communication node in the present disclosure.

In one embodiment, the first delay is equal to a propagation delay measured by the first communication node between the first communication node and the second communication node in the present disclosure.

In one embodiment, the first delay is equal to a measurement value of a propagation delay between the first communication node and the second communication node in the present disclosure.

In one embodiment, the first delay is equal to a propagation delay of a transmission path measured by the first communication node between the first communication node and the second communication node in the present disclosure.

In one embodiment, the first delay is equal to a propagation delay of a Line of Sight (LoS) measured by the first communication node between the first communication node and the second communication node in the present disclosure.

In one embodiment, the first delay is equal to an average value of a propagation delay of a plurality paths measured by the first communication node between the first communication node and the second communication node in the present disclosure.

In one embodiment, the first tilt angle is equal to an actual tilt angle between the first communication node and the second communication node in the present disclosure.

In one embodiment, the first tilt angle is equal to a tilt angle measured by the first communication node between the first communication node and the second communication node in the present disclosure.

In one embodiment, the first tilt angle is equal to a measurement value of a tilt angle between the first communication node and the second communication node in the present disclosure.

In one embodiment, the tilt angle information between the first communication node and a second communication node in the present disclosure includes: information of AoD when the first communication node in the present disclosure transmits a signal to a second communication node in the present disclosure.

In one embodiment, the tilt angle information between the first communication node and a second communication node in the present disclosure includes: information of AoA when the first communication node in the present disclosure receives a signal transmitted by a second communication node in the present disclosure.

In one embodiment, the target measurement value comprises which of a first distance, a first delay or a first tilt is(are) related to a positioning capacity of the first communication node.

In one embodiment, the target measurement value comprises which of a first distance, a first delay or a first tilt is(are) related to whether the first communication node supports a Global Navigation Satellite System (GNSS).

In one embodiment, the target measurement value comprises which of a first distance, a first delay or a first tilt angle is related to whether the first communication node supports GNSS and a positioning accuracy when GNSS is supported.

In one embodiment, in FIG. 8A, each geographic position interval represents one of the X candidate measurement intervals.

In embodiment 8A, the target measurement value in the present disclosure belongs to a target measurement interval, the target measurement interval is one of X candidate measurement intervals, any two of the X candidate measurement intervals are different, X being a positive integer greater than 1.

In one embodiment, any of the X candidate measurement intervals is a value range.

In one embodiment, any of the X candidate measurement intervals is a possible value range of the target measurement value.

In one embodiment, the target measurement value is a measurement value of a distance between the first communication node in the present disclosure and the second communication node.

In one embodiment, the target measurement value is a measurement value performed by the first communication node in the present disclosure on its own geographical position.

In one embodiment, the target measurement value is a measurement value performed by the first communication node in the present disclosure on its own coordination position.

In one embodiment, the target measurement value is a measurement value of propagation delay between the first communication node in the present disclosure and the second communication node.

In one embodiment, the target measurement value comprises Reference Signal Received Power (RSRP).

In one embodiment, the target measurement value comprises Reference Signal Received Quality (RSRQ).

In one embodiment, the target measurement value comprises a reference signal-signal to noise and interference ratio (RS-SINR).

In one embodiment, the target measurement value comprises a Received Signal Strength Indicator (RSSI).

In one embodiment, the first receiver receives fifth information, and the fifth information is used to determine the X candidate measurement intervals.

In one embodiment, the X candidate measurement intervals are predefined.

In one embodiment, for a given type of the second communication node in the present disclosure, the X candidate measurement intervals are predefined.

In one embodiment, for a given altitude of the second communication node in the present disclosure, the X candidate measurement intervals are predefined.

In one embodiment, any two of the X candidate measurement intervals are non-overlapped.

In one embodiment, there does not exist an overlapped part in any two of the X candidate measurement intervals.

In one embodiment, there exists an overlapped part in two of the X candidate measurement intervals.

Embodiment 8B

Figure 8B:
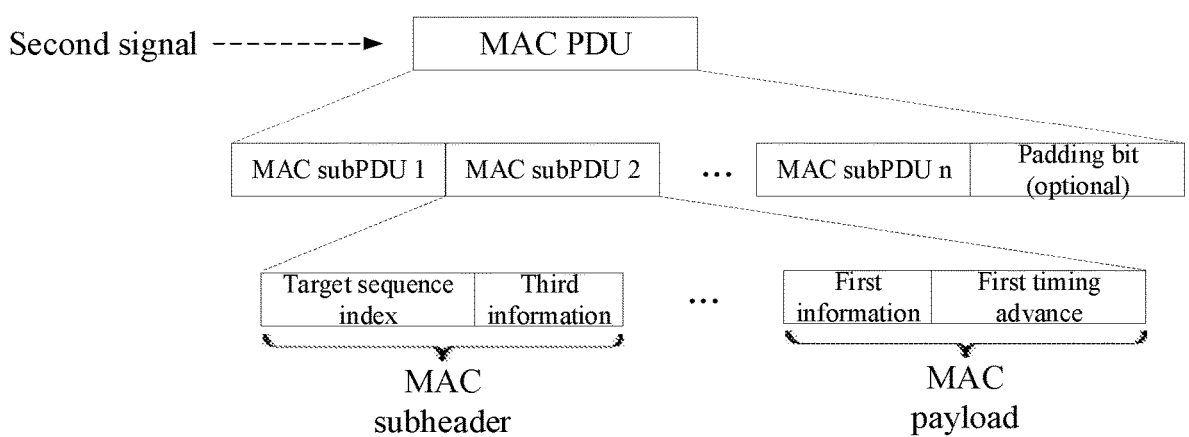
FIG. 8B illustrates a schematic diagram of relations among third information, first information and a first TA according to one embodiment of the present disclosure.

Embodiment 8B illustrates a schematic diagram of relations among third information, first information and a first timing adjustment according to one embodiment of the present disclosure, as shown in FIG. 8B. In FIG. 8B, a second signal carries a MAC PDU, the MAC PDU is divided into one or a plurality of MAC subPDUs, each MAC subPDU comprises one or a plurality of fields, and all of third information, first information and a first timing adjustment belong to a same MAC subPCU.

In embodiment 8B, the third information in the present disclosure is used to determine that the second signal in the present disclosure carries the first information.

In one embodiment, the target sequence index, the first information, the first TA and the third information are transmitted through a same MAC subPDU.

In one embodiment, the third information is transmitted through a MAC subheader in a target MAC subPDU, and the target sequence index, the first information and the first TA are all transmitted through the target MAC subPDU.

In one embodiment, the third information is transmitted through a reserved bit in a MAC subheader in a target MAC subPDU, and the target sequence index, the first information and the first TA are all transmitted through the target MAC subPDU.

In one embodiment, the third information is transmitted through a Format (F) field in a MAC subheader in a target MAC subPDU, and the target sequence index, the first information and the first TA are all transmitted through the target MAC subPDU.

In one embodiment, the third information is transmitted through a Length (L) field in a MAC subheader in a target MAC subPDU, and the target sequence index, the first information and the first TA are all transmitted through the target MAC subPDU.

In one embodiment, the above phrase of "the third information being used to determine that the second signal carries the first information" includes the following meaning: the third information is used to determine whether the second signal carries the first information.

In one embodiment, the above phrase of "the third information being used to determine that the second signal carries the first information" includes the following meaning: the third information is used by the first communication node in the present disclosure to determine that the second signal carries the first information.

In one embodiment, the above phrase of "the third information being used to determine that the second signal carries the first information" includes the following meaning: the third information is used to directly indicate that the second signal carries the first information.

In one embodiment, the above phrase of "the third information being used to determine that the second signal carries the first information" includes the following meaning: the third information is used to indirectly indicate that the second signal carries the first information.

In one embodiment, the above phrase of "the third information being used to determine that the second signal carries the first information" includes the following meaning: the third information is used to explicitly indicate that the second signal carries the first information.

In one embodiment, the above phrase of "the third information being used to determine that the second signal carries the first information" includes the following meaning: the third information is used to implicitly indicate that the second signal carries the first information.

In one embodiment, the third information is used to indicate whether the second signal carries the first information, and the second signal carries the first information.

Embodiment 9A

Figure 9A:
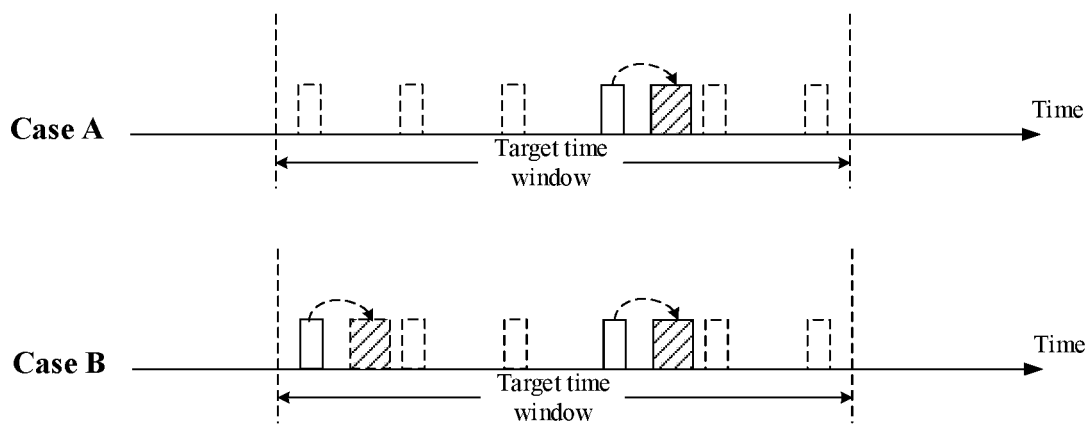
FIG. 9A illustrates a schematic diagram of a first-type signaling according to one embodiment of the present disclosure.

Embodiment 9A illustrates a schematic diagram of a first-type signaling according to one embodiment of the present disclosure, as shown in FIG. 9A. In FIG. 9A, the horizontal axis represents time, each unfilled solid-line-framed rectangle represents a first-type signaling detected in a target time window, each unfilled dotted-line-framed rectangle represents a possible first-type signaling in a target time window, and the slash-filled solid-line-framed rectangle represents a signal carrying an identity of a first sequence scheduled by a detected first-type signaling, the slash-filled dotted-line-framed rectangle represents a signal carrying an identity other than an identity of a first sequence scheduled by a detected first-type signaling; in case A, only one first-type signaling in a target time window is detected; and in case B, there exist two first-type signalings in a target time window being detected.

In embodiment 9A, the first communication node in the present disclosure assumes that there at most exists one first-type signaling being detected in the target time window in the present disclosure; or when there exist two first-type signalings being detected by the first communication node in the target time window and the two first-type signalings are used to schedule two different signals respectively, the first communication node assumes that only one of the two different signals carries an identity of the first sequence in the present disclosure.

In one embodiment, when there exist two first-type signalings of the first communication node in the target time window being detected, only the two first-type signalings of the first communication node are detected in the target time window.

In one embodiment, when there exist two first-type signalings of the first communication node in the target time window being detected, there exists a first-type signaling other than the two first-type signalings of the first communication node being detected in the target time window.

In one embodiment, the above phrase of "the first communication node assumes that there only exists one first-type signaling being detected in the target time window" includes the following meaning: for the first communication node, when there exists more than one first-type signaling being detected in the target time window, the first communication node assumes that it is an error.

In one embodiment, the above phrase of "the first communication node assumes that there only exists one first-type signaling being detected in the target time window" includes the following meaning: for the first communication node, when there exists more than one first-type signaling being detected in the target time window, the first communication node assumes each detected first-type signaling is not for itself.

In one embodiment, the above phrase of "the first communication node assumes that there only exists one first-type signaling being detected in the target time window" includes the following meaning: for the first communication node, when a first-type signaling is detected in the target time window, the first communication node stops a monitoring performed on a first-type signaling in the target time window.

In one embodiment, the above phrase of "the first communication node assumes that there only exists one first-type signaling being detected in the target time window" includes the following meaning: for the first communication node, when there exists more than one first-type signaling being detected in the target time window, the first communication node assumes that only one detected first-type signaling is for itself.

In one embodiment, the above phrase of "the first communication node assumes that there only exists one first-type signaling being detected in the target time window" includes the following meaning: the first communication node assumes that there does not exist more than one first-type signaling being detected in the target time window.

In one embodiment, the above phrase of "the first communication node assumes that there only exists one first-type signaling being detected in the target time window" includes the following meaning: the first communication node assumes that the second communication node in the present disclosure only transmits a first-type signaling for the first communication in the target time window.

In one embodiment, the above phrase of "the first communication node assumes that only one of the two different signals carries an identity of the first sequence" includes the following meaning: when the two different signals both carry the identity of the first sequence, the first communication node assumes that it is an error.

In one embodiment, the above phrase of "the first communication node assumes that only one of the two different signals carries an identity of the first sequence" includes the following meaning: when the two different signals both carry the identity of the first sequence, the first communication node assumes that the two different signals are not for itself.

In one embodiment, the above phrase of "the first communication node assumes that only one of the two different signals carries an identity of the first sequence" includes the following meaning: when the first communication node detects a first-type signaling in the target time window, and a signal scheduled by the detected first-type signaling carries the identity of the first sequence, the first communication node stops a monitoring performed on a first-type signaling in the target time window.

In one embodiment, the above phrase of "the first communication node assumes that only one of the two different signals carries an identity of the first sequence" includes the following meaning: the first communication node assumes that only one of the two different signals is for itself.

In one embodiment, the above phrase of "the first communication node assumes that only one of the two different signals carries an identity of the first sequence" includes the following meaning: the first communication node assumes that there does not exist each of the two different signals carrying the identity of the first sequence.

In one embodiment, the above phrase of "the first communication node assumes that only one of the two different signals carries an identity of the first sequence" includes the following meaning: the first communication node assumes that the second communication node in the present disclosure only transmits one of the two different signals for the first communication node.

In one embodiment, one of the two different signals is the second signal in the present disclosure.

In one embodiment, any of the two different signals is a signal other than the second signal in the present disclosure.

In one embodiment, any of the two different signals are transmitted through a PDSCH.

In one embodiment, any of the two different signals carries an RAR.

In one embodiment, any of the two different signals carries Msg2.

In one embodiment, any of the two different signals carries MsgB.

In one embodiment, an identity of the first sequence is an index of the first sequence.

In one embodiment, an identity of the first sequence is an index of the first sequence in the target sequence set in the present disclosure.

In one embodiment, an identity of the first sequence is an ID of the first sequence.

In one embodiment, an identity of the first sequence is a Random Access Preamble ID (RAPID) corresponding to the first sequence.

In one embodiment, a first-type signaling being detected refers to: a Cyclic Redundancy Check (CRC) of a first-type signaling after through channel decoding is passed.

In one embodiment, a first-type signaling being detected refers to: a CRC check scrambled by a CRC of a first-type signaling after through channel decoding by using a characteristic identity of a target receiver of a first-type signaling is passed.

In one embodiment, a first-type signaling being detected refers to: a CRC check scrambled by a CRC of a first-type signaling after through channel decoding by using the target characteristic identity in the present disclosure is passed.

In one embodiment, a first-type signaling being detected refers to: a CRC check scrambled by a CRC of a first-type signaling after through channel decoding by using an ID of the first communication node in the present disclosure is passed.

Embodiment 9B

Figure 9B:
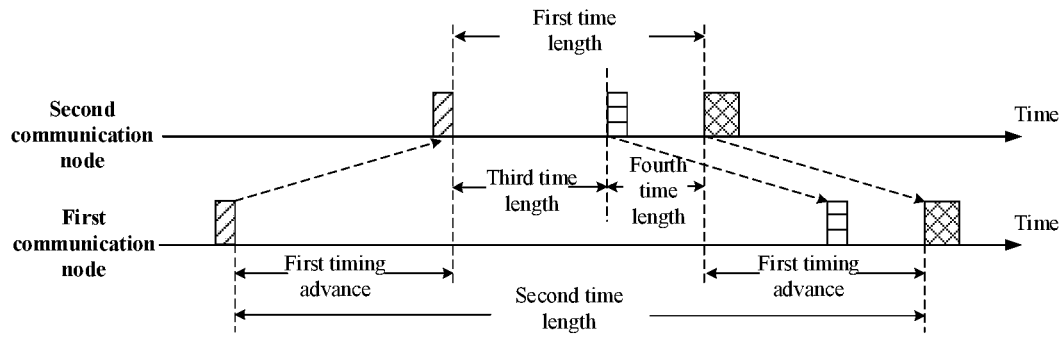
FIG. 9B illustrates a schematic diagram of relations among a first time length, a second time length and a first TA according to one embodiment of the present disclosure.

Embodiment 9B illustrates a schematic diagram of relations among a first time length, a second time length and a first TA according to one embodiment of the present disclosure, as shown in FIG. 9B. In FIG. 9B, the horizontal axis represents time, the upper part represents a signal on a second communication node side, the lower part represents a signal on a first communication node side, the slash-filled rectangle represents a first signal, the horizontal-line-filled rectangle represents a first signaling, and the cross-line-filled rectangle represents a second signal.

In embodiment 9B, the first information in the present disclosure is used to determine a first time length, and a time interval length between a time for transmitting the first signal in the present disclosure and a time for receiving the second signal in the present disclosure is equal to a second time length; a sum of the first time length and twice the first TA is equal to a target time length, a relation between the second time length and the target time length is used to determine whether the first TA in the present disclosure is used to determine a transmission timing of the first communication node in the present disclosure.

In one embodiment, the first time length is measured by s.

In one embodiment, the first time length is measured by ms.

In one embodiment, in the case of a given SCS, the first time length is equal to a time length of at least one slot.

In one embodiment, in the case of a given SCS, the first time length is equal to a time length of at least one OFDM symbol.

In one embodiment, the first time length is a time interval length assumed by the first communication node in the present disclosure from an end time for receiving the first signal to a start time for transmitting the second signal.

In one embodiment, the first time length is a time interval length assumed by the first communication node in the present disclosure from a start time for receiving the first signal to an end time for transmitting the second signal.

In one embodiment, the first time length is a time interval length assumed by the first communication node in the present disclosure from a start time for receiving the first signal to a start time for transmitting the second signal.

In one embodiment, the first time length is a time interval length assumed by the first communication node in the present disclosure from an end time for receiving the first signal to an end time for transmitting the second signal.

In one embodiment, the above phrase of "the first information being used to determine a first time length" includes the following meaning: the first information is used by the first communication node in the present disclosure to determine the first time length.

In one embodiment, the above phrase of "the first information being used to determine a first time length" includes the following meaning: the first information is used to directly indicate the first time length.

In one embodiment, the above phrase of "the first information being used to determine a first time length" includes the following meaning: the first information is used to indirectly indicate the first time length.

In one embodiment, the above phrase of "the first information being used to determine a first time length" includes the following meaning: the first information is used to explicitly indicate the first time length.

In one embodiment, the above phrase of "the first information being used to determine a first time length" includes the following meaning: the first information is used to implicitly indicate the first time length.

In one embodiment, the above phrase of "the first information being used to determine a first time length" includes the following meaning: the first information is used to indicate the third time length, the first signaling is used to indicate a fourth time length, and the first time length is equal to a sum of the third time length and the fourth time sub-length.

In one embodiment, the above phrase of "the first information being used to determine a first time length" includes the following meaning: the first information is used to indicate the third time length, the first signaling is used to indicate a fourth time length, and the first time length is equal to a sum of the third time length and the fourth time sub-length; the fourth time length is equal to a time interval length between a start time for receiving the first signaling and a start time for receiving the second signal.

In one embodiment, the second time length is measured by s.

In one embodiment, the second time length is measured by ms.

In one embodiment, in the case of a given SCS, the second time length is equal to a time length of at least one slot.

In one embodiment, in the case of a given SCS, the second time length is equal to a time length of at least one OFDM symbol.

In one embodiment, the above phrase of "a time interval length between a time for transmitting the first signal and a time for receiving the second signal is equal to a second time length" includes the following meaning: a time interval length between a start time for transmitting the first signal and a start time for receiving the second signal is equal to the second time length.

In one embodiment, the above phrase of "a time interval length between a time for transmitting the first signal and a time for receiving the second signal is equal to a second time length" includes the following meaning: a time interval length between a start time for transmitting the first signal and an end time for receiving the second signal is equal to the second time length.

In one embodiment, the above phrase of "a time interval length between a time for transmitting the first signal and a time for receiving the second signal is equal to a second time length" includes the following meaning: a time interval length between an end time for transmitting the first signal and a start time for receiving the second signal is equal to the second time length.

In one embodiment, the above phrase of "a time interval length between a time for transmitting the first signal and a time for receiving the second signal is equal to a second time length" includes the following meaning: a time interval length between an end time for transmitting the first signal and an end time for receiving the second signal is equal to the second time length.

In one embodiment, the above phrase of "a relation between the second time length and the target time length is used to determine whether the first TA can be used to determine a transmission timing of the first communication node" includes the following meaning: a magnitude relation between the second time length and the target time length is used to determine whether the first TA can be used to determine a transmission timing of the first communication node.

In one embodiment, the above phrase of "a relation between the second time length and the target time length is used to determine whether the first TA can be used to determine a transmission timing of the first communication node" includes the following meaning: whether the second time length is equal to the target time length is used to determine whether the first TA can be used to determine a transmission timing of the first communication node.

In one embodiment, the above phrase of "a relation between the second time length and the target time length is used to determine whether the first TA can be used to determine a transmission timing of the first communication node" includes the following meaning: a mathematic relation between the second time length and the target time length is used to determine whether the first TA can be used to determine a transmission timing of the first communication node.

In one embodiment, the above phrase of "a relation between the second time length and the target time length is used to determine whether the first TA can be used to determine a transmission timing of the first communication node" includes the following meaning: a magnitude relation between the second time length and the target time length is used to determine whether the first TA can be used to determine a transmission timing of the first communication node.

In one embodiment, the above phrase of "a relation between the first time length and the target time length is used to determine whether the first TA can be used to determine a transmission timing of the first communication node" includes the following meaning: when the first time length is equal to the target time length, the first TA is used to determine a transmission timing of the first communication node; and when the first time length is not equal to the target time length, the first TA is not used to determine a transmission timing of the first communication node.

In one embodiment, the above phrase of "a relation between the second time length and the target time length is used to determine whether the first TA can be used to determine a transmission timing of the first communication node" includes the following meaning: a time interval length between a start time for transmitting the first signal and a start time for receiving the second signal is equal to the second time length, and whether the second time length is equal to the target time length and a time length (including GP) occupied by the first signal in time domain are used to determine whether the first TA can be used to determine a transmission timing of the first communication node.

In one embodiment, the above phrase of "a relation between the second time length and the target time length is used to determine whether the first TA can be used to determine a transmission timing of the first communication node" includes the following meaning: a time interval length between a start time for transmitting the first signal and an end time for receiving the second signal is equal to the second time length, whether the second time length is equal to the target time length, a time length (including GP) occupied by the first signal in time domain, and a sum of time lengths occupied by the second signal in time domain are used to whether the first TA can be used to determine a transmission timing of the first communication node.

In one embodiment, the above phrase of "a relation between the second time length and the target time length is used to determine whether the first TA can be used to determine a transmission timing of the first communication node" includes the following meaning: a time interval length between an end time for transmitting the first signal (including GP) and an end time for receiving the second signal is equal to the second time length, and whether the second time length is equal to the target time length and a sum of time lengths occupied by the second signal in time domain are used to determine whether the first TA can be used to determine a transmission timing of the first communication node.

Embodiment 10

Figure 10:
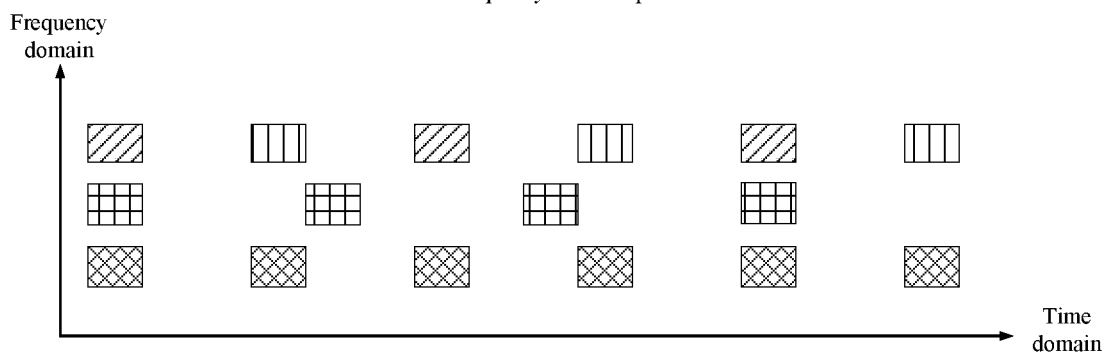
FIG. 10 illustrates a schematic diagram of a target time-frequency resource pool according to one embodiment of the present disclosure.

Embodiment 10 illustrates a schematic diagram of a target time-frequency resource pool according to one embodiment of the present disclosure, as shown in FIG. 10. In FIG. 10, the horizontal axis represents time domain and the vertical axis represents frequency domain, each reticle-filled rectangle represents a time-frequency resource block in a target time-frequency resource pool, and other rectangles represent time-frequency resource blocks in a time-frequency resource pool other than a target time-frequency resource pool, and time-frequency resource blocks represented by rectangles with same padding belong to a same time-frequency resource pool.

In embodiment 10, the target time-frequency resource block in the present disclosure belongs to a target time-frequency resource pool, the first sequence in the present disclosure belongs to a target sequence set, the fifth information in the present disclosure is used to determine at least one of the target time-frequency resource pool or the target sequence set; the first communication node in the present disclosure selects the target time-frequency resource block out of the target time-frequency resource pool, and the first communication node selects the first sequence out of the target sequence set.

In one embodiment, the target time-frequency resource pool comprises more than one time-frequency resource block.

In one embodiment, the target time-frequency resource pool comprises more than one time-frequency resource block, each time-frequency resource block in the target time-frequency resource pool in time domain is a time-frequency resource block occupied by a PRACH Occasion.

In one embodiment, the target time-frequency resource pool comprises more than one time-frequency resource block occurring periodically in time domain.

In one embodiment, the target time-frequency resource block is a time-frequency resource block occupied by a PRACH Occasion.

In one embodiment, the target sequence set comprises more than one sequence.

In one embodiment, the target sequence set comprises 64 sequences.

In one embodiment, the target sequence set comprises 32 sequences.

In one embodiment, the target sequence set comprises more than one sequence, and each sequence in the target sequence set is a Random Access Preamble.

In one embodiment, the above phrase of "the first communication node selecting the target time-frequency resource block out of the target time-frequency resource pool" includes: the first communication node selects the target time-frequency resource block by itself out of the target time-frequency resource pool.

In one embodiment, the above phrase of "the first communication node selecting the target time-frequency resource block out of the target time-frequency resource pool" includes: the first communication node randomly selects the target time-frequency resource block out of the target time-frequency resource pool.

In one embodiment, the above phrase of "the first communication node selecting the target time-frequency resource block out of the target time-frequency resource pool" includes: the first communication node randomly selects the target time-frequency resource block out of the target time-frequency resource pool with a medium probability.

In one embodiment, the above phrase of "the first communication node selecting the target time-frequency resource block out of the target time-frequency resource pool" includes: the first communication node randomly selects a time-frequency resource block occupied by a PRACH occasion with an intermediate probability out of PRACH occasions corresponding to selected Synchronization Signal Blocks (SSBs) in the target time-frequency resource pool as the target time-frequency resource block.

In one embodiment, the above phrase of "the first communication node selecting the target time-frequency resource block out of the target time-frequency resource pool" includes: the first communication node randomly selects a time-frequency resource block occupied by a PRACH occasion with an intermediate probability out of PRACH occasions corresponding to selected SS/PBCH Block in the target time-frequency resource pool as the target time-frequency resource block.

In one embodiment, the phrase of "the first communication node selecting the first sequence in the target sequence set" includes: the first communication node selects the first sequence out of the target sequence set by itself.

In one embodiment, the phrase of "the first communication node selecting the first sequence in the target sequence set" includes: the first communication node randomly selects the first sequence in the target sequence set.

In one embodiment, the phrase of "the first communication node selecting the first sequence in the target sequence set" includes: the first communication node randomly selects the first sequence out of the target sequence set with an intermediate probability.

In embodiment 10, the fourth information in the present disclosure is used to determine X candidate time-frequency resource pools, the X candidate time-frequency resource pools respectively correspond to the X candidate measurement intervals in the present disclosure, the target time-frequency resource block in the present disclosure belongs to a target time-frequency resource pool, and the target time-frequency resource pool is one of the X candidate time-frequency resource pool corresponding to the target measurement interval.

In one embodiment, the fourth information is also used to determine X candidate sequence sets, the X candidate sequence sets respectively correspond to the X candidate measurement intervals, the W candidate sequences belong to one of the X candidate sequence sets, and a candidate sequence set to which the W candidate sequences belong is one of the X candidate sequence set corresponding to the target measurement interval.

In one embodiment, each time-frequency resource pool in the X candidate time-frequency resource pools comprises more than one time-frequency resource block, and each time-frequency resource block comprised in the X candidate time-frequency resource pools is a time-frequency resource block occupied by a PRACH Occasion.

In one embodiment, each time-frequency resource pool in the X candidate time-frequency resource pools comprises more than one time-frequency resource block occurring periodically in time domain, and each time-frequency resource block comprised in the X candidate time-frequency resource pools is a time-frequency resource block occupied by a PRACH Occasion.

In one embodiment, the target time-frequency resource block is a time-frequency resource block occupied by a PRACH Occasion.

In one embodiment, there exist two of the X candidate time-frequency resource pools being non-orthogonal.

In one embodiment, there exists an RE belonging to two of the X candidate time-frequency resource pools at the same time.

In one embodiment, there does not exist an RE belonging to two of the X candidate time-frequency resource pools at the same time.

In one embodiment, any two of the X candidate time-frequency resource pools being orthogonal.

In one embodiment, any two of the X candidate time-frequency resource pools being different.

In one embodiment, there exist two of the X candidate time-frequency resource pools being the same.

In one embodiment, the first communication node selects the target time-frequency resource block by itself out of the target time-frequency resource pool.

In one embodiment, the first communication node randomly selects the target time-frequency resource block out of the target time-frequency resource pool.

In one embodiment, the first communication node randomly selects a time-frequency resource block occupied by a PRACH occasion with an intermediate probability out of PRACH occasions corresponding to selected Synchronization Signal Blocks (SSBs) in the target time-frequency resource pool as the target time-frequency resource block.

In one embodiment, the first communication node randomly selects a time-frequency resource block occupied by a PRACH occasion with an intermediate probability out of PRACH occasions corresponding to selected SS/PBCH Blocks in the target time-frequency resource pool as the target time-frequency resource block.

Embodiment 11

Figure 11:
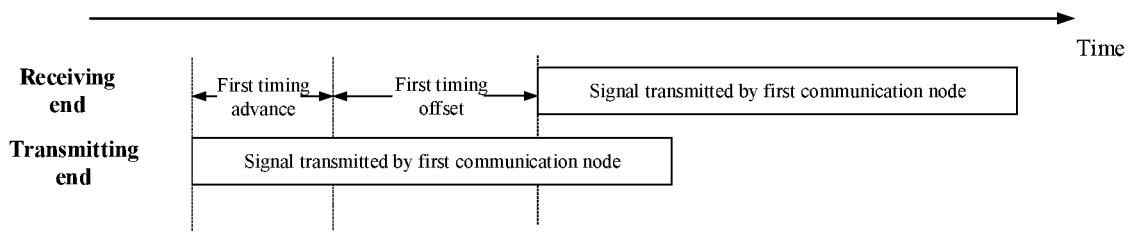
FIG. 11 illustrates a schematic diagram of a first TA according to one embodiment of the present disclosure.

Embodiment 11 illustrates a schematic diagram of a first TA according to one embodiment of the present disclosure, as shown in FIG. 11. In FIG. 11, the horizontal axis represents time, and the two rectangles respectively represent a signal transmitted by a first communication node at the receiving end and a signal transmitted by a first communication node at the transmitting end (i.e., a first communication node).

In embodiment 11, a first-type signaling detected in the target time window in the present disclosure is used to determine time-frequency resources occupied by the second signal in the present disclosure; the second signal carries a target sequence index and a first TA, when the target sequence index corresponds to an index of the first sequence in the present disclosure in the target sequence set, the first TA is used to determine a transmission timing of the first communication node in the present disclosure.

In one embodiment, the second signal is a baseband signal.

In one embodiment, the second signal is a radio-frequency signal.

In one embodiment, the second information is transmitted via an air interface.

In one embodiment, the second signal is transmitted via a radio interface.

In one embodiment, the second signal is used for random access.

In one embodiment, the second signal carries Msg2 (random access information 2).

In one embodiment, the second signal carries MsgB (random access information B).

In one embodiment, the second signal carries an RAR.

In one embodiment, the second signal is transmitted through a DL-SCH.

In one embodiment, the second signal is transmitted through a PDSCH.

In one embodiment, the above phrase of "a first-type signaling detected in the target time window being used to determine time-frequency resources occupied by the second signal" includes the following meaning: a first-type signaling detected in the target time window is used by the first communication node in the present disclosure to determine time-frequency resources occupied by the second signal.

In one embodiment, the above phrase of "a first-type signaling detected in the target time window being used to determine time-frequency resources occupied by the second signal" includes the following meaning: a first-type signaling detected in the target time window is used to directly indicate time-frequency resources occupied by the second signal.

In one embodiment, the above phrase of "a first-type signaling detected in the target time window being used to determine time-frequency resources occupied by the second signal" includes the following meaning: a first-type signaling detected in the target time window is used to indirectly indicate time-frequency resources occupied by the second signal.

In one embodiment, the above phrase of "a first-type signaling detected in the target time window being used to determine time-frequency resources occupied by the second signal" includes the following meaning: a first-type signaling detected in the target time window is used to explicitly indicate time-frequency resources occupied by the second signal.

In one embodiment, the above phrase of "a first-type signaling detected in the target time window being used to determine time-frequency resources occupied by the second signal" includes the following meaning: a first-type signaling detected in the target time window is used to implicitly indicate time-frequency resources occupied by the second signal.

In one embodiment, the target sequence index is a Random Access Preamble Identity (RAPID).

In one embodiment, the target sequence index is a "ra-PreambleIndex".

In one embodiment, the target sequence index is a "PREAMBLE_INDEX".

In one embodiment, the target sequence index is an index represented by 6 bits.

In one embodiment, the target sequence index is a non-negative integer less than 64.

In one embodiment, the above phrase of "the second signal carrying a target sequence index" includes the following meaning: a MAC subheader in a MAC subPDU in a MAC PDU carried by the second signal comprises the target sequence index.

In one embodiment, the above phrase of "the second signal carrying a target sequence index" includes the following meaning: a MAC header in a MAC PDU carried by the second signal comprises the target sequence index.

In one embodiment, the above phrase of "the second signal carrying a target sequence index" includes the following meaning: a MAC CE in a MAC subPDU in a MAC PDU carried by the second signal comprises the target sequence index.

In one embodiment, the above phrase of "the second signal carrying a target sequence index" includes the following meaning: a MAC payload in a MAC subPDU in a MAC PDU carried by the second signal comprises the target sequence index.

In one embodiment, the first TA belongs to higher-layer information.

In one embodiment, the first TA belongs to all or part of MAC layer information.

In one embodiment, the first TA belongs to all or part of a field in a MAC header.

In one embodiment, the first TA belongs to all or part of a field in a MAC subheader.

In one embodiment, the first TA belongs to all or part of a field in a MAC CE.

In one embodiment, the first TA belongs to all or part of a field in a MAC Payload.

In one embodiment, the first TA is a non-negative real number.

In one embodiment, the first TA is measured by µs.

In one embodiment, the first TA is measured by s.

In one embodiment, the above phrase of "the first TA being used to determine a transmission timing of the first communication node" includes the following meaning: the first TA is equal to a TA value of a signal transmitted later than the first signal by the first communication node.

In one embodiment, the above phrase of "the first TA being used to determine a transmission timing of the first communication node" includes the following meaning: the first TA is equal to a TA of a start time that the first communication node transmits a signal later than the first signal relative to a downlink slot boundary.

In one embodiment, the above phrase of "the first TA being used to determine a transmission timing of the first communication node" includes the following meaning: a sum of the first TA and a first timing offset is equal to a TA of the first communication node during transmission, and the first timing offset is configurable.

In one embodiment, the above phrase of "the first TA being used to determine a transmission timing of the first communication node" includes the following meaning: the first communication node receives sixth information; the sixth information is used to determine a first timing offset, and a sum of the first TA and the first timing offset is equal to a TA of the first communication node during transmission.

In one embodiment, the first TA is equal to a non-negative integer number of Tc.

In one embodiment, the first TA is greater than 0, and the first TA is related to a type of the second communication node in the present disclosure.

In one embodiment, the first TA is greater than 0, and the first TA is related to an altitude of the second communication node in the present disclosure.

In one embodiment, the first TA is greater than 0, and the first TA is related to a type of a satellite to which the second communication node in the present disclosure belongs.

In one embodiment, the above phrase of "the second signal carrying a first TA" includes the following meaning: a MAC subheader in a MAC subPDU in a MAC PDU carried by the second signal comprises the first TA.

In one embodiment, the above phrase of "the second signal carrying a first TA" includes the following meaning: a MAC header in a MAC PDU carried by the second signal comprises the first TA.

In one embodiment, the above phrase of "the second signal carrying a first TA" includes the following meaning: a MAC CE in a MAC subPDU in a MAC PDU carried by the second signal comprises the first TA.

In one embodiment, the above phrase of "the second signal carrying a first TA" includes the following meaning: a MAC payload in a MAC subPDU in a MAC PDU carried by the second signal comprises the first TA.

In one embodiment, the above phrase of "the target sequence index corresponding to an index of the first sequence in the target sequence set" includes the following meaning: the target sequence index is equal to an index of the first sequence in the target sequence set.

In one embodiment, the above phrase of "the target sequence index corresponding to an index of the first sequence in the target sequence set" includes the following meaning: the target sequence index is the same as an index of the first sequence in the target sequence set.

In one embodiment, the above phrase of "the target sequence index corresponding to an index of the first sequence in the target sequence set" includes the following meaning: a sequence identified by the target sequence index is the same as the first sequence.

In one embodiment, the above phrase of "the target sequence index corresponding to an index of the first sequence in the target sequence set" includes the following meaning: the target sequence index and an index of the first sequence in the target sequence set have a unique corresponding relation.

In embodiment 11A, a first TA in the present disclosure and a first timing offset are used together to determine a TA value of a signal transmitted by a first communication node in the present disclosure.

In one embodiment, when the first TA is used to determine a transmission timing of the first communication node, a sum of the first TA and a first timing offset is equal to a TA of the first communication node during transmission, and the first timing offset is configurable.

In one embodiment, also comprising:
receiving sixth information;
herein, the sixth information is used to determine a first TA, when the first TA is used to determine a transmission timing of the first communication node, a sum of the first TA and the first timing offset is equal to a TA of the first communication node during transmission.

In one embodiment, when the first TA is used to determine a transmission timing of the first communication node, a sum of the first TA and a first timing offset is equal to a TA of the first communication node during transmission, and the first timing offset is related to an altitude of the second communication node in the present disclosure.

In one embodiment, when the first TA is used to determine a transmission timing of the first communication node, a sum of the first TA and a first timing offset is equal to a TA of the first communication node during transmission, and the first timing offset is related to a type (geostationary satellite, low earth orbit satellite, medium earth orbit satellite, flight platform, etc.) of the second communication node in the present disclosure.

Embodiment 12A

Figure 12A:
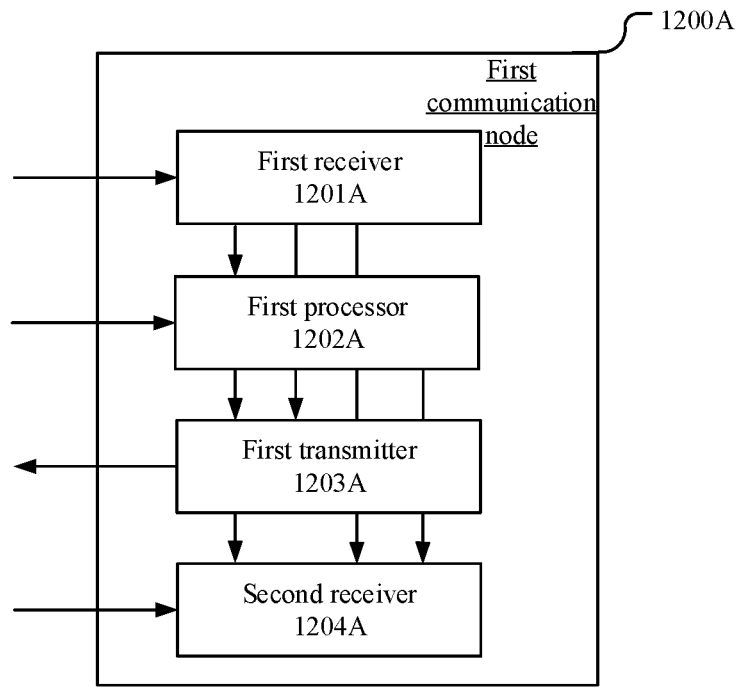
FIG. 12A illustrates a structure block diagram of a processing device in a first communication node according to one embodiment of the present disclosure.

Embodiment 12A illustrates a structure diagram of a processing device in a first communication node, as shown in FIG. 12A. In FIG. 12A, a processing device 1200A in a first communication node comprises a first receiver 1201A, a first processor 1202A, a first transmitter 1203A and a second receiver 1204A. The first receiver 1201A comprises the transmitter/receiver 456 (including the antenna 460), the receiving processor 452 and the controller/processor 490 in FIG. 4 of the present disclosure; the first processor 1202 comprises the transmitter/receiver 456 (including the antenna 460), the receiving processor 452 and the controller/processor 490 in FIG. 4 of the present disclosure; the first transmitter 1203A comprises the transmitter/receiver 456 (including the antenna 460), the transmitting processor 455 and the controller/processor 490 in FIG. 4 of the present disclosure; and the second receiver 1204A comprises the transmitter/receiver 456 (including the antenna 460), the receiving processor 452 and the controller/processor 490 in FIG. 4 of the present disclosure.

In embodiment 12A, the first receiver 1201A receives first information; the first processor 1202A determines a target measurement interval, the target measurement interval is one of X candidate measurement intervals; the first transmitter 1203A transmits a first signal, a first sequence is used to generate the first signal, and the first signal occupies a target time-frequency resource block in time-frequency domain; and the second receiver 1204A monitors a first-type signaling in a target time window; any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

In one embodiment, the first receiver 1201A receives second information and third information; herein, the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

In one embodiment, the first receiver 1202A executes a first measurement; herein, the first measurement is used to determine a target measurement value, the target measurement value belongs to the target measurement interval, and the target measurement value comprises at least one of a first distance, a first delay or a first tilt angle; the first communication node assumes that the first distance is equal to a distance between the first communication node and a second communication node in the present disclosure, the first communication node assumes that the first delay is equal to a propagation delay between the first communication node and the second communication node in the present disclosure, and the first communication node assumes that the first tilt angle is equal to a tilt angle between the first communication node and the second communication node in the present disclosure.

In one embodiment, the first receiver 1201A receives fourth information; herein, the fourth information is used to determine the X candidate measurement intervals.

In one embodiment, the first communication node assumes that there at most exists one first-type signaling being detected in the target time window; or when there exist two first-type signalings being detected by the first communication node in the target time window and the two first-type signalings are used to schedule two different signals respectively, the first communication node assumes that only one of the two different signals carries an identity of the first sequence.

In one embodiment, the first receiver 1201A receives fifth information; herein, the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set.

In one embodiment, the first receiver 1201A receives fifth information; herein, the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set; when there exists a first-type signaling being detected in the target time window, the second receiver 1204A receives a second signal; a first-type signaling detected in the target time window is used to determine time-frequency resources occupied by the second signal; the second signal carries a target sequence index and a first TA, when the target sequence index corresponds to an index of the first sequence in the target sequence set, the first TA is used to determine a transmission timing of the first communication node.

Embodiment 12B

Figure 12B:
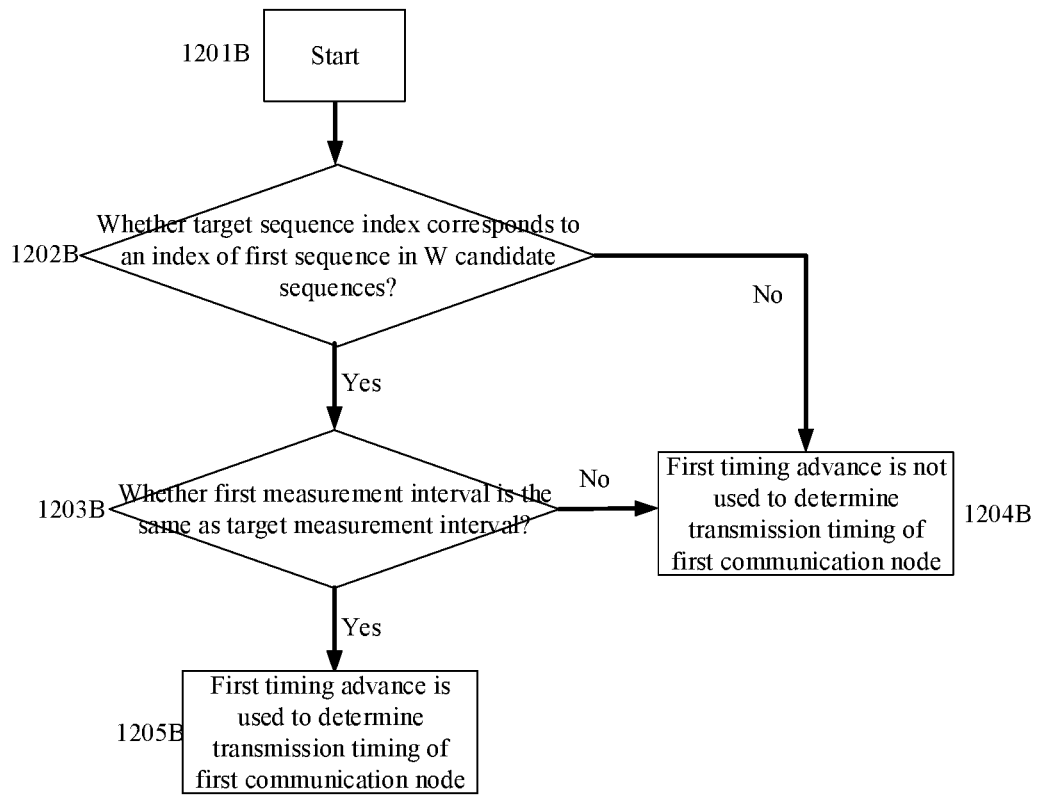
FIG. 12B illustrates a schematic diagram of a relation between a first measurement interval and a target measurement interval according to one embodiment of the present disclosure.

Embodiment 12B illustrates a schematic diagram of a relation between a first measurement interval and a target measurement interval according to one embodiment of the present disclosure, as shown in FIG. 12B. In FIG. 12B, each rectangle represents an operation, and each diamond represents a judgment. In FIG. 12B, start from 1201B, judge whether a target sequence corresponds to an index of a first sequence in W candidate sequences in 1202B, judge whether a first measurement interval is the same as a target measurement interval in 1203B, a first TA is not used to determine a transmission timing of a first communication node in 1204B, and a first TA is used to determine a transmission timing of a first communication node in 1205B.

In embodiment 12B, the first information in the present disclosure is used to determine a first measurement interval, and the first measurement interval is one of the X candidate measurement intervals in the present disclosure; whether the first measurement interval is the same as the target measurement interval in the present disclosure is used to determine whether the first TA in the present disclosure can be used to determine a transmission timing of the first communication node in the present disclosure.

In one embodiment, the above phrase of "the first information being used to determine a first measurement interval" includes: the first information is used by the first communication node in the present disclosure to determine the first measurement interval.

In one embodiment, the above phrase of "the first information being used to determine a first measurement interval" includes: the first information is used to directly indicate the first measurement interval.

In one embodiment, the above phrase of "the first information being used to determine a first measurement interval" includes: the first information is used to indirectly indicate the first measurement interval.

In one embodiment, the above phrase of "the first information being used to determine a first measurement interval" includes: the first information is used to explicitly indicate the first measurement interval.

In one embodiment, the above phrase of "the first information being used to determine a first measurement interval" includes: the first information is used to implicitly indicate the first measurement interval.

In one embodiment, the above phrase of "the first information being used to determine a first measurement interval" includes: the first information is used to indicate an index of the first measurement interval in the X candidate measurement intervals.

In one embodiment, the above phrase of "the first information being used to determine a first measurement interval" includes: the first information is used to indicate a sequence of the first measurement interval in the X candidate measurement intervals.

In one embodiment, the above phrase of "the first information being used to determine a first measurement interval" includes: the first information is used to indicate an identity of the first measurement interval in the X candidate measurement intervals.

In one embodiment, the above phrase of "whether the first measurement interval being the same as the target measurement interval being used to determine whether the first TA can be used to determine a transmission timing of the first communication node" includes: whether the first measurement interval is the same as the target measurement interval is used by the first communication node in the present disclosure to determine whether the first TA can be used to determine a transmission timing of the first communication node.

In one embodiment, the above phrase of "whether the first measurement interval being the same as the target measurement interval being used to determine whether the first TA can be used to determine a transmission timing of the first communication node" includes: when the first measurement interval is the same as the target measurement interval, the first TA is used to determine a transmission timing of the first communication node; and when the first measurement interval and the target measurement interval are different, the first TA is not used to determine a transmission timing of the first communication node.

In one embodiment, the first measurement interval is the same as the target measurement interval.

In one embodiment, the first measurement interval and the target measurement interval are different.

Embodiment 13A

Figure 13A:
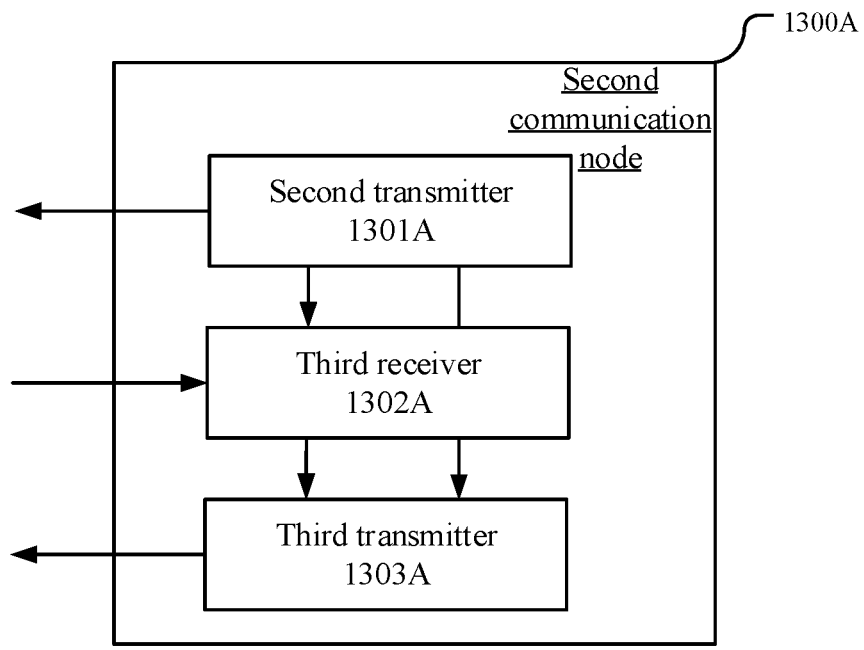
FIG. 13A illustrates a structure block diagram of a processing device in a second communication node according to one embodiment of the present disclosure.

Embodiment 13A illustrates a structure block diagram of a processing device in a second communication node, as shown in FIG. 13A. In FIG. 13A, a processing device 1300A in a second communication node comprises a second transmitter 1301A, a third receiver 1302A and a third transmitter 1303A. The second transmitter 1301A comprises the transmitter/receiver 416 (including the antenna 420), the transmitting processor 415 and the controller/processor 440 in FIG. 4 of the present disclosure; the third receiver 1302A comprises the transmitter/receiver 416 (including the antenna 420), the receiving processor 412 and the controller/processor 440 in FIG. 4 of the present disclosure; the third transmitter 1303A comprises the transmitter/receiver 416 (including the antenna 420), the transmitting processor 415 and the controller/processor 440 in FIG. 4 of the present disclosure.

In embodiment 13A, the second transmitter 1301A transmits first information; the third receiver 1302A receives a first signal, a first sequence is used to generate the first signal, and the first signal occupies a target time-frequency resource block in time-frequency domain; and the third transmitter 1303A transmits a first-type signaling in a target time window; any two of X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to a target measurement interval among the X time interval lengths, and a position of the target time-frequency resource block in time-frequency domain is used to determine the reference time; the target measurement interval is one of X candidate measurement intervals; the first-type signaling carries a target characteristic identity, and a position of the target time-frequency resource block in time-frequency domain is used to determine the target characteristic identity.

In one embodiment, the second transmitter 1301A transmits second information and third information; herein, the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

In one embodiment, the target measurement value belongs to the target measurement interval, and the target measurement value comprises at least one of a first distance, a first delay or a first tilt angle; the first communication node in the present disclosure assumes that the first distance is equal to a distance between the first communication node and a second communication node in the present disclosure, the first communication node in the present disclosure assumes that the first delay is equal to a propagation delay between the first communication node and the second communication node in the present disclosure, and the first communication node in the present disclosure assumes that the first tilt angle is equal to a tilt angle between the first communication node and the second communication node in the present disclosure.

In one embodiment, the second transmitter 1301A transmits fourth information; herein, the fourth information is used to determine the X candidate measurement intervals.

In one embodiment, there at most exists one first-type signaling being transmitted in the target time window; or when there exist two first-type signalings in the target time window being transmitted and the two first-type signalings are used to schedule two different signals respectively, only one of the two different signals carries an identity of the first sequence.

In one embodiment, the second transmitter 1301A transmits fifth information; herein, the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set.

In one embodiment, the second transmitter 1301A transmits fifth information; herein, the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set; the third transmitter 1303A transmits a second signal; herein, a first-type signaling transmitted in the target time window is used to determine time-frequency resources occupied by the second signal; the second signal carries a target sequence index and a first TA, when the target sequence index corresponds to an index of the first sequence in the target sequence set, the first TA is used to indicate a transmission timing of the first communication node.

Embodiment 13B

Figure 13B:
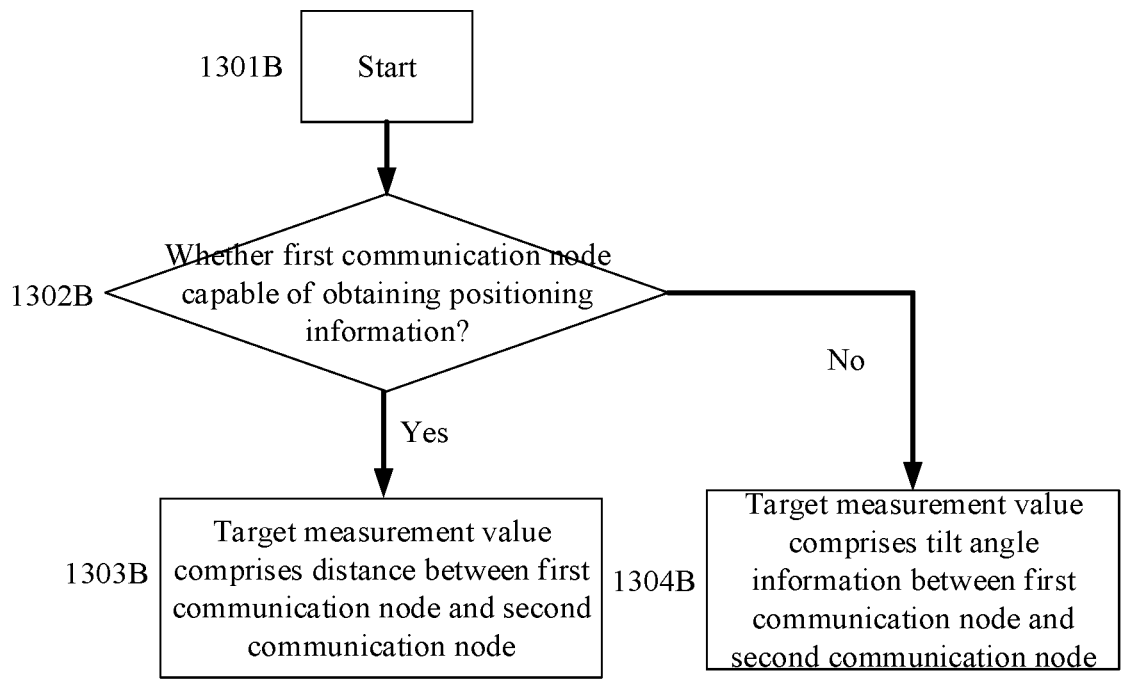
FIG. 13B illustrates a schematic diagram of a target measurement value according to one embodiment of the present disclosure.

Embodiment 13B illustrates a schematic diagram of a target measurement value according to one embodiment of the present disclosure, as shown in FIG. 13B. In FIG. 13B, each rectangle represents an operation, and each diamond represents a judgment. In FIG. 13B, start from 1301B, judge whether a first communication node can obtain positioning information in 1302B, a target measurement value comprises a distance between a first communication node and a second communication node in 1303B, and a target measurement value comprises tilt angle information between a first communication node and a second communication node in 1304B.

In embodiment 13B, when the first communication node in the present disclosure can acquire positioning information of the first communication node, the target measurement value in the present disclosure comprises a distance between the first communication node and the second communication node in the present disclosure; otherwise, the target measurement value comprises tilt angle information between the first communication node and the second communication node in the present disclosure.

In one embodiment, the positioning information of the first communication node comprises positioning capability information of the first communication node.

In one embodiment, the positioning information of the first communication node comprises whether the first communication node can calculate a distance between the first communication node and the second communication node in the present disclosure through its own geographical position.

In one embodiment, the positioning information of the first communication node comprises whether the first communication node can calculate a distance between the first communication node and the second communication node in the present disclosure and an accuracy of the obtained distance through its own geographical position.

In one embodiment, the positioning information of the first communication node comprises whether the first communication node can calculate a propagation delay between the first communication node and the second communication node in the present disclosure through its own geographical position.

In one embodiment, the positioning information of the first communication node comprises whether the first communication node can calculate a propagation delay between the first communication node and the second communication node in the present disclosure and an accuracy of the obtained propagation delay through its own geographical position.

In one embodiment, the positioning information of the first communication node comprises a positioning method of the first communication node.

In one embodiment, the positioning information of the first communication node comprises whether the first communication node supports a Global Navigation Satellite System (GNSS).

In one embodiment, the positioning information of the first communication node comprises whether the first communication node supports a Global Navigation Satellite System (GNSS) and a positioning accuracy when the GNSS is supported.

In one embodiment, the positioning information of the first communication node comprises a positioning accuracy of the first communication node.

In one embodiment, the positioning information of the first communication node comprises whether the first communication node supports a GNSS and a GNSS type when the GNSS is supported.

In one embodiment, the tilt angle information between the first communication node and a second communication node in the present disclosure includes: information of AoD when the first communication node in the present disclosure transmits a signal to a second communication node in the present disclosure.

In one embodiment, the tilt angle information between the first communication node and a second communication node in the present disclosure includes: information of AoA when the first communication node in the present disclosure receives a signal transmitted by a second communication node in the present disclosure.

Embodiment 14

Figure 14:
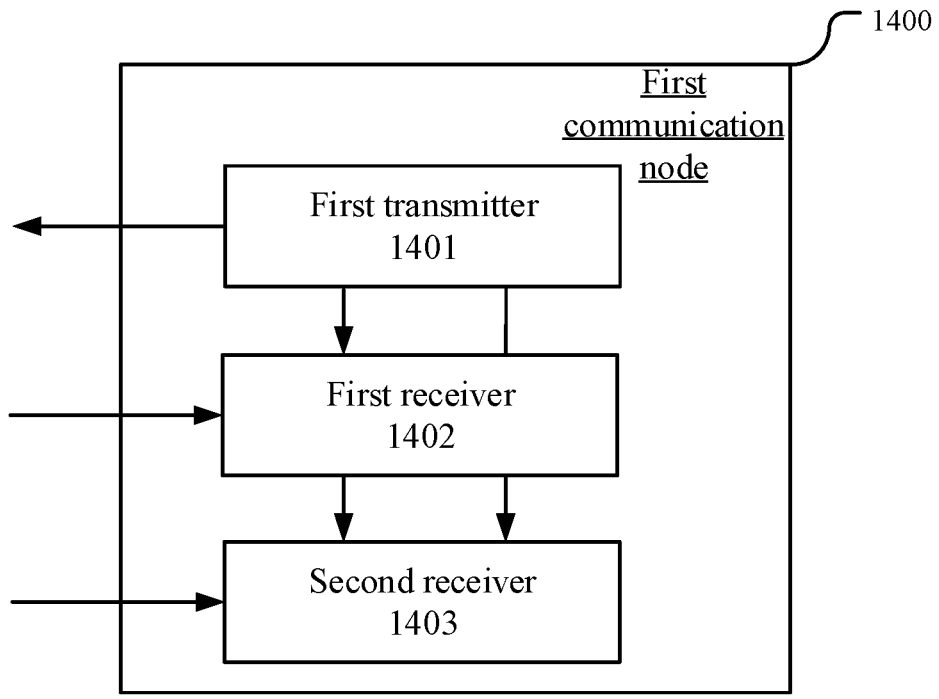
FIG. 14 illustrates a structure block diagram of a processing device in a first communication node according to one embodiment of the present disclosure.

Embodiment 14 illustrates a structure diagram of a processing device in a first communication node, as shown in FIG. 14. In FIG. 14, a processing device 1400 of a first communication node comprises a first transmitter 1401, a first receiver 1402 and a second receiver 1403. The first transmitter 1401 comprises the transmitter/receiver 456 (including the antenna 460), the transmitting processor 455 and the controller/processor 490 in FIG. 4 of the present disclosure; the first receiver 1402 comprises the transmitter/receiver 456 (including the antenna 460), the receiving processor 452 and the controller/processor 490 in FIG. 4 of the present disclosure; the second receiver 1403 comprises the transmitter/receiver 456 (including the antenna 460), the receiving processor 452 and the controller/processor 490 in FIG. 4 of the present disclosure.

In embodiment 14, the first transmitter 1401 transmits a first signal, the first signal occupies a target time-frequency resource block in time-frequency domain; the first receiver 1402 receives a first signaling; the second receiver 1403 receives a second signal, and the first signaling is used to determine time-frequency resources occupied by the second signal; the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to determine whether the first TA is used to determine a transmission timing of the first communication node.

In one embodiment, the first receiver 1402 receives second information and third information, herein, the second information is used to determine the W candidate sequences, and the first communication node randomly selects the first sequence out of the W candidate sequences; and the third information is used to determine that the second signal carries the first information.

In one embodiment, the first information is used to determine a first time length, and a time interval length between a time for transmitting the first signal and a time for receiving the second signal is equal to a second time length; a sum of the first time length and twice the first TA is equal to a target time length, a relation between the second time length and the target time length is used to determine whether the first TA is used to determine a transmission timing of the first communication node.

In one embodiment, the second receiver 1403 determines a target measurement value; herein, the target measurement value belongs to a target measurement interval, the target measurement interval is one of X candidate measurement intervals, and any two of the X candidate measurement intervals are different, X being a positive integer greater than 1.

In one embodiment, the second receiver 1403 determines a target measurement value; the target measurement value belongs to a target measurement interval, the target measurement interval is one of X candidate measurement intervals, and any two of the X candidate measurement intervals are different, X being a positive integer greater than 1; the first receiver 1402 receives fourth information; the fourth information is used to determine X candidate time-frequency resource pools, the X candidate time-frequency resource pools respectively correspond to the X candidate measurement intervals, the target time-frequency resource block belongs to a target time-frequency resource pool, and the target time-frequency resource pool is one of the X candidate time-frequency resource pool corresponding to the target measurement interval.

In one embodiment, the second receiver 1403 determines a target measurement value; herein, the target measurement value belongs to a target measurement interval, the target measurement interval is one of X candidate measurement intervals, and any two of the X candidate measurement intervals are different, X being a positive integer greater than 1; the first information is used to determine a first measurement interval, and the first measurement interval is one of the X candidate measurement intervals; whether the first measurement interval is the same as the target measurement interval is used to determine whether the first TA can be used to determine a transmission timing of the first communication node.

In one embodiment, the second receiver 1403 determines a target measurement value; herein, the target measurement value belongs to a target measurement interval, the target measurement interval is one of X candidate measurement intervals, and any two of the X candidate measurement intervals are different, X being a positive integer greater than 1; when the first communication node can acquire positioning information of the first communication node, the target measurement value comprises a distance between the first communication node and the second communication node in the present disclosure; otherwise, the target measurement value comprises tilt angle information between the first communication node and the second communication node in the present disclosure.

Embodiment 15

Figure 15:
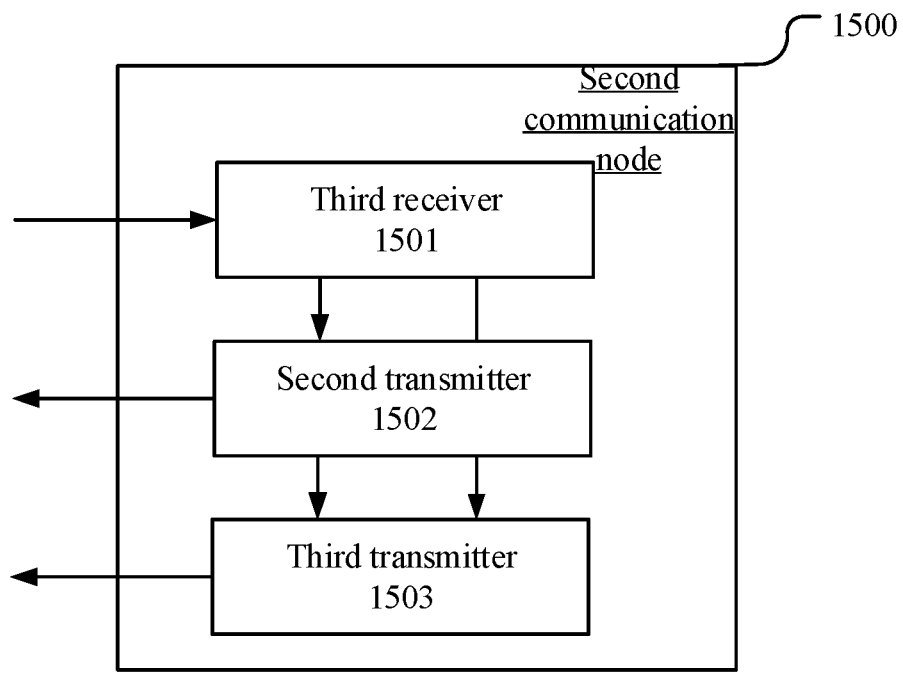
FIG. 15 illustrates a structure block diagram of a processing device in a second communication node according to one embodiment of the present disclosure.

Embodiment 15 illustrates a structure diagram of a processing device in a second communication node, as shown in FIG. 15. In FIG. 15, a processing device 1500 of a second communication node comprises a third receiver 1501, a second transmitter 1502 and a third transmitter 1503. The third receiver 1501 comprises the transmitter/receiver 416 (including the antenna 420), the receiving processor 412 and the controller/processor 440 in FIG. 4 of the present disclosure; the second transmitter 1502 comprises the transmitter/receiver 416 (including the antenna 420), the transmitting processor 415 and the controller/processor 440 in FIG. 4 of the present disclosure; the third transmitter 1503 comprises the transmitter/receiver 416 (including the antenna 420), the transmitting processor 415 and the controller/processor 440 in FIG. 4 of the present disclosure.

In embodiment 15, the third receiver 1501 receives a first signal, and the first signal occupies a target time-frequency resource block in time-frequency domain; the second transmitter 1502 transmits a first signaling; a third transmitter 1503 transmits a second signal, and the first signaling is used to determine time-frequency resources occupied by the second signal; the first signaling carries a target characteristic identity, and a position of the target time-frequency resource block in time-frequency domain is used to determine the target characteristic identity; a first sequence is used to generate the first signal, the first sequence is one of W candidate sequences, W being a positive integer greater than 1; the second signal carries a target sequence index, first information and a first TA; when the target sequence index corresponds to an index of the first sequence in the W candidate sequences, the first information is used to indicate whether the first TA is used to determine a transmission timing of a transmitter of the first signal.

In one embodiment, the second transmitter 1502 transmits second information and third information; the second information is used to determine the W candidate sequences, and the first communication node randomly selects the first sequence out of the W candidate sequences; and the third information is used to determine that the second signal carries the first information.

In one embodiment, the first information is used to determine a first time length, and a time interval length between a time for transmitting the first signal and a time for receiving the second signal is equal to a second time length; a sum of the first time length and twice the first TA is equal to a target time length, a relation between the second time length and the target time length is used to determine whether the first TA is used to determine a transmission timing of a transmitter of the first signal.

In one embodiment, the second transmitter 1502 transmits fourth information; herein, the fourth information is used to determine X candidate time-frequency resource pools, the X candidate time-frequency resource pools respectively correspond to X candidate measurement intervals, and any two of the X candidate measurement intervals are different, X being a positive integer greater than 1; and the target time-frequency resource block belongs to a target time-frequency resource pool.

In one embodiment, the second transmitter 1502 transmits fourth information; the fourth information is used to determine X candidate time-frequency resource pools, the X candidate time-frequency resource pools respectively correspond to X candidate measurement intervals, and any two of the X candidate measurement intervals are different, X being a positive integer greater than 1; the target time-frequency resource block belongs to a target time-frequency resource pool; the first information is used to determine a first measurement interval, and the first measurement interval is one of the X candidate measurement intervals.

In one embodiment, the second transmitter 1502 transmits fourth information; the fourth information is used to determine X candidate time-frequency resource pools, the X candidate time-frequency resource pools respectively correspond to X candidate measurement intervals, and any two of the X candidate measurement intervals are different, X being a positive integer greater than 1; the target time-frequency resource block belongs to a target time-frequency resource pool; when a transmitter of the first node can acquire positioning information of a transmitter of the first signal, one of the X candidate measurement intervals comprises a distance between a transmitter of the first signal and a receiver of the first signal; otherwise, one of the X candidate measurement intervals comprises tilt angle information between a transmitter of the first signal and a receiver of the first signal.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but is not limited to mobile phones, tablet computers, laptops, network cards, low-power devices, eMTC devices, NB-IOT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmitting and Receiving Point (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first communication node for wireless communications, comprising:
   a first receiver, receiving first information;
   a first processor, determining a target measurement interval, the target measurement interval being one of X candidate measurement intervals;
   a first transmitter, transmitting a first signal, a first sequence being used to generate the first signal, and the first signal occupying a target time-frequency resource block in time-frequency domain; and
   a second receiver, monitoring a first-type signaling in a target time window;
   wherein any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

2. The first communication node according to claim 1, wherein the first receiver receives second information and third information; wherein the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

3. The first communication node according to claim 1, wherein the first processor executes a first measurement; wherein the first measurement is used to determine a target measurement value, the target measurement value belongs to the target measurement interval, and the target measurement value comprises at least one of a first distance, a first delay or a first tilt angle; the first communication node assumes that the first distance is equal to a distance between the first communication node and a transmitter of the first information, the first communication node assumes that the first delay is equal to a propagation delay between the first communication node and a transmitter of the first information, and the first communication node assumes that the first tilt angle is equal to a tilt angle between the first communication node and a transmitter of the first information.

4. The first communication node according to claim 1, wherein the first receiver receives fourth information; wherein the fourth information is used to determine the X candidate measurement intervals.

5. The first communication node according to claim 1, wherein the first communication node assumes that there at most exists one first-type signaling being detected in the target time window; or when there exist two first-type signalings being detected by the first communication node in the target time window and the two first-type signalings are used to schedule two different signals respectively, the first communication node assumes that only one of the two different signals carries an identity of the first sequence.

6. The first communication node according to claim 1, wherein the first receiver receives fifth information; wherein the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set.

7. The first communication node according to claim 6, wherein when there exists a first-type signaling being detected in the target time window, the second receiver receives a second signal; wherein a first-type signaling detected in the target time window is used to determine time-frequency resources occupied by the second signal; the second signal carries a target sequence index and a first Timing Advance (TA), when the target sequence index corresponds to an index of the first sequence in the target sequence set, the first TA is used to determine a transmission timing of the first communication node.

8. A second communication node for wireless communications, comprising:
   a second transmitter, transmitting first information;
   a third receiver, receiving a first signal, a first sequence being used to generate the first signal, and the first signal occupying a target time-frequency resource block in time-frequency domain; and
   a third transmitter, transmitting a first-type signaling in a target time window;
   wherein any two of X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to a target measurement interval among the X time interval lengths, and a position of the target time-frequency resource block in time-frequency domain is used to determine the reference time; the target measurement interval is one of X candidate measurement intervals; the first-type signaling carries a target characteristic identity, and a position of the target time-frequency resource block in time-frequency domain is used to determine the target characteristic identity.

9. The second communication node according to claim 8, wherein a second transmitter transmits second information and third information; wherein the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

10. The second communication node according to claim 8, wherein a target measurement value belongs to the target measurement interval, and the target measurement value comprises at least one of a first distance, a first delay or a first tilt angle; a transmitter of the first signal assumes that the first distance is equal to a distance between a transmitter of the first signal and the second communication node, a transmitter of the first signal assumes that the first delay is equal to a propagation delay between a transmitter of the first signal and the second communication node, and a transmitter of the first signal assumes that the first tilt angle is equal to a tilt angle between a transmitter of the first signal and the second communication node.

11. The second communication node according to claim 8, wherein the second transmitter transmits fourth information; wherein the fourth information is used to determine the X candidate measurement intervals.

12. The second communication node according to claim 8, wherein there at most exists one first-type signaling being transmitted in the target time window; or when there exist two first-type signalings in the target time window being transmitted and the two first-type signalings are used to schedule two different signals respectively, only one of the two different signals carries an identity of the first sequence.

13. The second communication node according to claim 8, wherein the second transmitter transmits fifth information; wherein the target time-frequency resource block belongs to a target time-frequency resource pool, the first sequence belongs to a target sequence set, the fifth information is used to determine at least one of the target time-frequency resource pool or the target sequence set; a transmitter of the first signal selects the target time-frequency resource block out of the target time-frequency resource pool, and a transmitter of the first signal selects the first sequence out of the target sequence set; a third transmitter transmits a second signal; wherein a first-type signaling transmitted in the target time window is used to determine time-frequency resources occupied by the second signal; the second signal carries a target sequence index and a first TA, when the target sequence index corresponds to an index of the first sequence in the target sequence set, the first TA is used to indicate a transmission timing of a transmitter of the first signal.

14. A method in a first communication node for wireless communications, comprising:
receiving first information;
determining a target measurement interval, the target measurement interval being one of X candidate measurement intervals;
transmitting a first signal, a first sequence being used to generate the first signal, and the first signal occupying a target time-frequency resource block in time-frequency domain; and
monitoring a first-type signaling in a target time window;
wherein any two of the X candidate measurement intervals are different, X being a positive integer greater than 1; the X candidate measurement intervals respectively correspond to X time interval lengths, and the first information is used to determine a corresponding time interval length for each of the X candidate measurement intervals; a length of a time interval between a start time of the target time window and a reference time is equal to a target time interval length, the target time interval length is a time interval length corresponding to the target measurement interval among the X time interval lengths, and a position of the target time-frequency resource block in time-frequency domain is used to determine the reference time; the first-type signaling carries a target characteristic identity, and a position of the target time-frequency resource block in time-frequency domain is used to determine the target characteristic identity.

15. The method according to claim 14, comprising:
receiving second information and third information;
wherein the second information is used to determine a duration length of the target time window in time domain; the third information is used to determine a first time-domain resource set, and the first time-domain resource set comprises more than one time-domain resource blocks; the reference time is a start time of a reference time-domain resource block, and the reference time-domain resource block is a time-domain resource block in the first time-domain resource set; at least one of a position of the target time-frequency resource block in time-frequency domain or the first sequence is used to determine a characteristic time-frequency resource block, the reference time is not earlier than an end time of the characteristic time-frequency resource block in time domain, and there does not exist a time-domain resource block other than the reference time-domain resource block in the first time-domain resource set in time domain with a start time being located between the reference time and an end time of the characteristic time-frequency resource block in time domain.

16. The method according to claim 14, comprising:
executing a first measurement;
wherein the first measurement is used to determine a target measurement value, the target measurement value belongs to the target measurement interval, and the target measurement value comprises at least one of a first distance, a first delay or a first tilt angle; the first communication node assumes that the first distance is equal to a distance between the first communication node and a transmitter of the first information, the first communication node assumes that the first delay is equal to a propagation delay between the first communication node and a transmitter of the first information, and the first communication node assumes that the first tilt angle is equal to a tilt angle between the first communication node and a transmitter of the first information.

17. The method according to claim 14, comprising:
receiving fourth information;
wherein the fourth information is used to determine the X candidate measurement intervals.

18. The method according to claim 14, wherein the first communication node assumes that there at most exists one first-type signaling being detected in the target time window; or when there exist two first-type signalings being detected by the first communication node in the target time window and the two first-type signalings are used to schedule two different signals respectively, the first communication node assumes that only one of the two different signals carries an identity of the first sequence.

19. The method according to claim 14, comprising:
receiving fifth information;
wherein the target time-frequency resource block belongs to a target time-frequency resource pool, the first sequence belongs to a target sequence set, the fifth information is used to determine at least one of the target time-frequency resource pool or the target sequence set; the first communication node selects the target time-frequency resource block out of the target time-frequency resource pool, and the first communication node selects the first sequence out of the target sequence set.

20. The method according to claim 19, wherein when there exists a first-type signaling being detected in the target time window, comprising:
receiving a second signal;
wherein a first-type signaling detected in the target time window is used to determine time-frequency resources occupied by the second signal; the second signal carries a target sequence index and a first TA, when the target sequence index corresponds to an index of the first sequence in the target sequence set, the first TA is used to determine a transmission timing of the first communication node.

\* \* \* \* \*